(12) United States Patent
Mizukami et al.

(10) Patent No.: US 12,429,424 B2
(45) Date of Patent: Sep. 30, 2025

(54) MEASUREMENT APPARATUS AND ANALYSIS METHOD

(71) Applicant: SYSMEX CORPORATION, Kobe (JP)

(72) Inventors: Toshihiro Mizukami, Kobe (JP); Konobu Kimura, Kobe (JP); Yuuichi Hamada, Kobe (JP); Yuji Toya, Kobe (JP); Noriyuki Nakanishi, Kobe (JP); Takaaki Nagai, Kobe (JP); Masato Kuze, Kobe (JP); Hironori Tanaka, Kobe (JP)

(73) Assignee: Sysmex Corporation, Hyogo (JP)

( * ) Notice: Subject to any disclaimer, the term of this patent is extended or adjusted under 35 U.S.C. 154(b) by 119 days.

(21) Appl. No.: 18/182,951

(22) Filed: Mar. 13, 2023

(65) Prior Publication Data

US 2023/0296522 A1    Sep. 21, 2023

(30) Foreign Application Priority Data

Mar. 17, 2022 (JP) .................. 2022-043093
Mar. 17, 2022 (JP) .................. 2022-043198

(51) Int. Cl.
  *G01N 21/64*   (2006.01)
  *G01N 1/30*    (2006.01)
  (Continued)

(52) U.S. Cl.
  CPC ........... *G01N 21/6486* (2013.01); *G01N 1/30* (2013.01); *G01N 15/1434* (2013.01);
  (Continued)

(58) Field of Classification Search
  CPC .............. G01N 21/64; G01N 21/6486; G01N 21/6428; G01N 2021/6421;
  (Continued)

(56) References Cited

U.S. PATENT DOCUMENTS 5,555,198 A    9/1996  Asano
6,004,816 A   12/1999  Mizukami et al.
(Continued)

FOREIGN PATENT DOCUMENTS

CN    103987834 A    8/2014
CN    105388100 A    3/2016
(Continued)

OTHER PUBLICATIONS

Beckman Coulter Ireland Inc. and Beckman Coulter, Inc.: "AQUIOS Tetra Software System Guide", Apr. 2015, 158 pages in total, Retrieved from https://www.beckmancoulter.com/wsrportal/techdocs?docname=B26364AB.pdf; Cited in the Specification.
(Continued)

*Primary Examiner* — Dominic J Bologna
*Assistant Examiner* — Jonathon Cook
(74) *Attorney, Agent, or Firm* — Crowell & Moring LLP

(57) ABSTRACT

Disclosed is a measurement apparatus for analyzing a cell contained in a specimen, comprising: a chamber for preparing a measurement sample in which the cell is stained with first and second fluorescent dyes contained in a reagent supplied from at least one reagent container; a liquid feeding section for feeding the reagent from the reagent container to the chamber via a liquid feeding tube provided between the reagent container and the chamber; and a detection section that acquires first and second signals each corresponding to fluorescence of a first wavelength and fluorescence of a second wavelength emitted from the cell stained with the first and second fluorescent dyes in response to irradiation of the measurement sample flowing in a flow cell with light; and an analysis section that analyzes the cell on the basis of the first and second signals.

22 Claims, 63 Drawing Sheets

(51) Int. Cl.
G01N 15/14 (2006.01)
G01N 15/1434 (2024.01)
G01N 35/10 (2006.01)
G01N 15/01 (2024.01)
G01N 15/10 (2006.01)
G01N 21/75 (2006.01)
G01N 35/00 (2006.01)

(52) U.S. Cl.
CPC ..... G01N 15/1459 (2013.01); G01N 35/1002 (2013.01); G01N 2015/016 (2024.01); G01N 2015/1006 (2013.01); G01N 2015/1402 (2013.01); G01N 2021/6439 (2013.01); G01N 2021/754 (2013.01); G01N 2035/00306 (2013.01)

(58) Field of Classification Search
CPC ... G01N 2021/6439; G01N 2021/6441; G01N 2021/6482; G01N 2021/754; G01N 1/30; G01N 1/31; G01N 15/1434; G01N 15/1436; G01N 2015/016; G01N 2015/1006; G01N 35/1002; G01N 35/1009
See application file for complete search history.

(56) References Cited

U.S. PATENT DOCUMENTS

| | | | |
|---|---|---|---|
| 8,367,358 B2 | 2/2013 | Ting et al. | |
| 9,528,978 B2 | 12/2016 | Yamada | |
| 9,568,428 B2 | 2/2017 | Thomas et al. | |
| 11,060,134 B2* | 7/2021 | Takahashi | G01N 21/6428 |
| 12,020,492 B2* | 6/2024 | Imakubo | G06F 18/285 |
| 2010/0151509 A1 | 6/2010 | Ting et al. | |
| 2010/0330565 A1 | 12/2010 | Narikawa et al. | |
| 2014/0051071 A1* | 2/2014 | Yoshida | G01N 15/1459 435/6.1 |
| 2016/0266161 A1* | 9/2016 | Nagai | G01N 35/0099 |
| 2018/0340953 A1* | 11/2018 | Hamada | G01N 1/31 |
| 2018/0372767 A1* | 12/2018 | Takeuchi | G01N 35/08 |
| 2021/0164883 A1* | 6/2021 | Imakubo | G06V 20/69 |
| 2022/0003745 A1* | 1/2022 | Kimura | G06N 3/08 |
| 2022/0146540 A1* | 5/2022 | Noda | G01N 35/00594 |
| 2023/0250418 A1* | 8/2023 | Wang Keng Meng | G01N 35/0098 506/26 |
| 2023/0333020 A1* | 10/2023 | Jing | G01N 15/1433 |
| 2024/0029409 A1* | 1/2024 | Aidt | G06V 10/22 |
| 2024/0053269 A1* | 2/2024 | Herzog | G01N 21/94 |

FOREIGN PATENT DOCUMENTS

| | | |
|---|---|---|
| CN | 113670800 A | 11/2021 |
| EP | 1710558 A2 | 10/2006 |
| EP | 1953527 A2 | 8/2008 |
| EP | 3413046 A1 | 12/2018 |
| EP | 3495799 A2 | 6/2019 |
| JP | H4-43942 A | 2/1992 |
| JP | H10-319010 A | 12/1998 |
| JP | 3783808 B2 | 6/2006 |
| JP | WO2007/129485 A1 | 9/2009 |
| JP | 2012-215593 A | 11/2012 |
| JP | 2012-233754 A | 11/2012 |
| JP | 5422390 B2 | 2/2014 |
| JP | 2020-153946 A | 9/2020 |
| JP | 2022-8643 A | 1/2022 |
| JP | 2022-017705 A | 1/2022 |
| JP | 2022-128210 A | 9/2022 |
| WO | 2009/041626 A1 | 4/2009 |
| WO | 2011/140387 A1 | 11/2011 |

OTHER PUBLICATIONS

Beckman Coulter Ireland Inc. and Beckman Coulter, Inc.: "Brochure for AQUIOS Tetra-1 Panel and AQUIOS Tetra-2+ Panel", 2021, 5 pages in total, Retrieved from https://www.beckman.jp/techdocs/B25337AG/wsr-161331; Cited in the Specification.
The extended European search report ("EESR") issued on Jul. 27, 2023 in a counterpart European patent application No. 23161446.2.
The extended European search report ("EESR") issued on Jul. 27, 2023 in a related European patent application No. 23161442.1.

* cited by examiner

FIG. 41

| CELL TYPE | LABEL VALUE |
|---|---|
| NOT APPLICABLE (NONE) | 0 |
| NEUTROPHIL (NEUT) | 1 |
| LYMPHOCYTE (LYMPH) | 2 |
| MONOCYTE (MONO) | 3 |
| EOSINOPHIL (EO) | 4 |
| BASOPHIL (BASO) | 5 |
| IMMATURE GRANULOCYTE (IG) | 6 |
| ABNORMAL CELL (BLOOD-DERIVED CELL EXCEPT FOR FIVE CLASSIFICATIONS) | 7 |

FIG. 50

MATRIX PRODUCT CALCULATION

$$c_{ij} = \sum_{k=1}^{n} a_{ik} \times b_{kj}$$

```
for(int i=0; i<n; i++) {
  for(int j=0; j<n; j++) {
    for(int k=0; k<n; k++) {
      c[i][j] += a[i][k]*b[k][j]
    }
  }
}
```

CALCULATION PROCESSING BY PARALLEL PROCESSING PROCESSOR

```
for(int k=0; k<n; k++) {
  c[0][0] += a[0][k]*b[k][0] }
```

```
for(int k=0; k<n; k++) {
  c[1][0] += a[1][k]*b[k][0] }
```

```
for(int k=0; k<n; k++) {
  c[0][1] += a[0][k]*b[k][1] }
```

```
for(int k=0; k<n; k++) {
  c[1][1] += a[1][k]*b[k][1] }
```

...

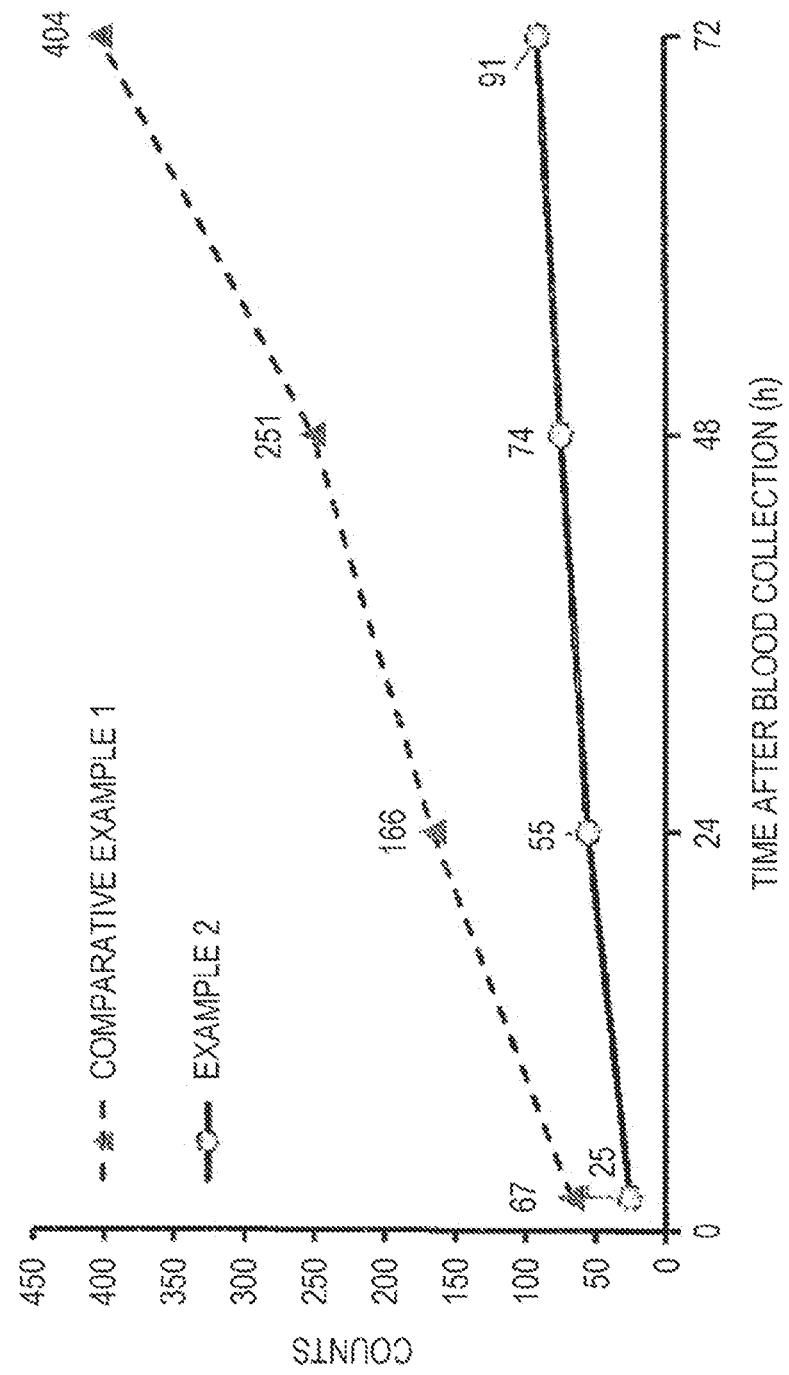

MEASUREMENT APPARATUS AND ANALYSIS METHOD

RELATED APPLICATIONS

This application claims priority from Japanese Patent Application No. 2022-043093, filed on Mar. 17, 2022, and Japanese Patent Application No. 2022-043198, filed on Mar. 17, 2022, the entire contents of both applications are hereby incorporated by reference.

BACKGROUND OF THE INVENTION

1. Field of the Invention

The present invention relates to a measurement apparatus and an analysis method.

2. Description of the Related Art

Literature 1: (AQUIOS Tetra System Guide https://www.beckman coulter.com/wsrportal/techdocs?docname=B26364AB.pdf) discloses a flow cytometer that analyzes signals emitted from a plurality of fluorescent dyes having different wavelength bands of fluorescence. In measurement by the flow cytometer disclosed in Literature 1, a reagent that stains a sample with the plurality of fluorescent dyes having different wavelength bands (see Literature 2: AQUIOS Tetra-1 Panel and AQUIOS Tetra-2+ Panel https://www.beckman.jp/techdocs/B25337AG/wsr-161331) is used. Each fluorescent dye is added to an antibody, and each antibody binds to an object to be measured in a specimen to stain the specimen. The flow cytometer sucks an antibody reagent from a reagent container using a dispensing probe and a mechanism for moving the dispensing probe, and discharges the antibody reagent into a reaction container in which a specimen having the object to be measured is contained. The flow cytometer measures the object to be measured that is mixed with and stained with the antibody reagent in the reaction container.

SUMMARY OF THE INVENTION

The scope of the present invention is defined solely by the appended claims, and is not affected to any degree by the statements within this summary.

The flow cytometer disclosed in Literature 1 sucks the reagent from the reagent container with a nozzle, moves the nozzle sucking the reagent to a disposition place of the reaction container, and discharges the reagent into the reaction container for preparation of a measurement sample. In this case, since a process for sucking and discharging the reagent is required, it takes time to prepare the measurement sample (Literature 1 describes that measurement throughput is 25 specimens per hour).

An object of the present invention is to provide a measurement apparatus and an analysis method capable of realizing measurement using a plurality of fluorescent dyes with high processing capacity.

A measurement apparatus of the present invention is a measurement apparatus for analyzing a cell contained in a specimen, including: a chamber for preparing a measurement sample in which the cell is stained with first and second fluorescent dyes contained in a reagent supplied from at least one reagent container; a liquid feeding section for feeding the reagent from the reagent container to the chamber via a liquid feeding tube provided between the reagent container and the chamber; and a detection section that acquires first and second signals each corresponding to fluorescence of a first wavelength and fluorescence of a second wavelength emitted from the cell stained with the first and second fluorescent dyes in response to irradiation of the measurement sample flowing in a flow cell with light; and an analysis section that analyzes the cell on the basis of the first and second signals.

An analysis method of the present invention is an analysis method for analyzing a cell contained in a specimen, including: feeding a reagent from a reagent container containing the reagent to a chamber for mixing the specimen and the reagent to prepare a measurement sample, through a liquid feeding tube provided between the reagent container and the chamber; preparing the measurement sample in which the cell is stained with first and second fluorescent dyes contained in the reagent supplied from at least one of the reagent containers; irradiating the measurement sample flowing in a flow cell with light; acquiring first and second fluorescence signals each corresponding to fluorescence of a first wavelength and fluorescence of a second wavelength emitted from the cell stained with the first and second fluorescent dyes in response to the irradiation of light; and analyzing the cell based on the first and second fluorescence signals.

According to the present invention, it is possible to provide an analyzer capable of realizing measurement using a plurality of fluorescent dyes with high processing capacity.

BRIEF DESCRIPTION OF THE DRAWINGS

FIG. 35 is a longitudinal sectional view of a reagent container holder 250a;

FIG. 41 is a diagram showing an example of label values in the analysis method according to the fourth embodiment;

FIG. 50 is a second diagram following FIG. 49;

FIG. 61 is a graph showing a change in the number of basophils due to the lapse of time after blood collection.

DETAILED DESCRIPTION OF THE PREFERRED EMBODIMENTS

Hereinafter, the present invention will be described in more detail with reference to the drawings. The following description is illustrative in all respects and should not be construed as limiting the present invention.

First Embodiment

Figure 1:
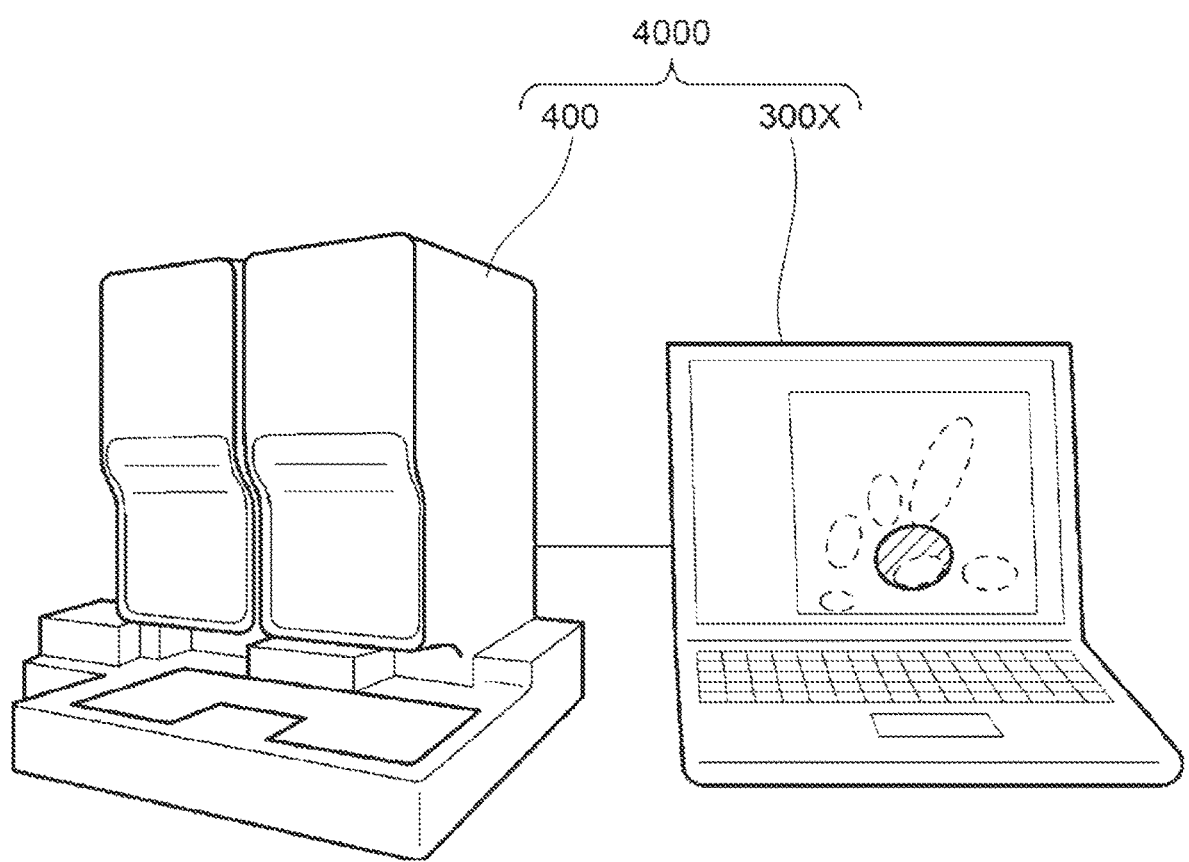
FIG. 1 is a perspective view showing an analysis system according to a first embodiment of the present invention.

FIG. 1 is a perspective view showing an analysis system according to a first embodiment of the present invention. As shown in FIG. 1, an analysis system 4000 according to the first embodiment individually includes a measurement apparatus (hereinafter, referred to as a measurement unit) 400 and an analyzer (hereinafter, referred to as an analysis unit) 300X. In the present embodiment, the analysis unit 300X is, for example, a personal computer (PC) in which software for analyzing a specimen to be measured is incorporated.

The measurement unit 400 is a unit for measuring a specimen. The measurement unit 400 includes a flow cytometer. In the measurement unit 400, a specimen and a reagent are mixed to prepare a measurement sample. In the preparation of the measurement sample, a reagent containing a plurality of fluorescent dyes each corresponding to a plurality of wavelengths is used. Each of the plurality of cells in the measurement sample is stained with a plurality of fluorescent dyes. In the analysis of cell contained in the specimen by this analysis system, a cell that can be stained with a plurality of fluorescent dyes is analyzed. That is, the preparation of the measurement sample in the present embodiment is intended to stain one cell with a plurality of fluorescent dyes, and the cell to be measured is, for example, lymphocyte, monocyte, eosinophil, neutrophil, basophil, or the like.

The prepared measurement sample is measured by a flow cytometer. Optical signals corresponding to each of the plurality of fluorescent dyes, and a plurality of signals related to forward scattered light and side scattered light are acquired from cells in the measurement sample irradiated with light. Each of the acquired optical signals is A/D converted to acquire digital data. The analysis unit 300X analyzes the digital data acquired by the measurement unit 400. In the analysis unit 300X, at least one of classification and counting of cells in the specimen is performed using a plurality of digital data each corresponding to at least side scattered light and fluorescence of a plurality of wavelengths. The analysis unit 300X also performs operation control of the measurement unit 400.

Figure 2:
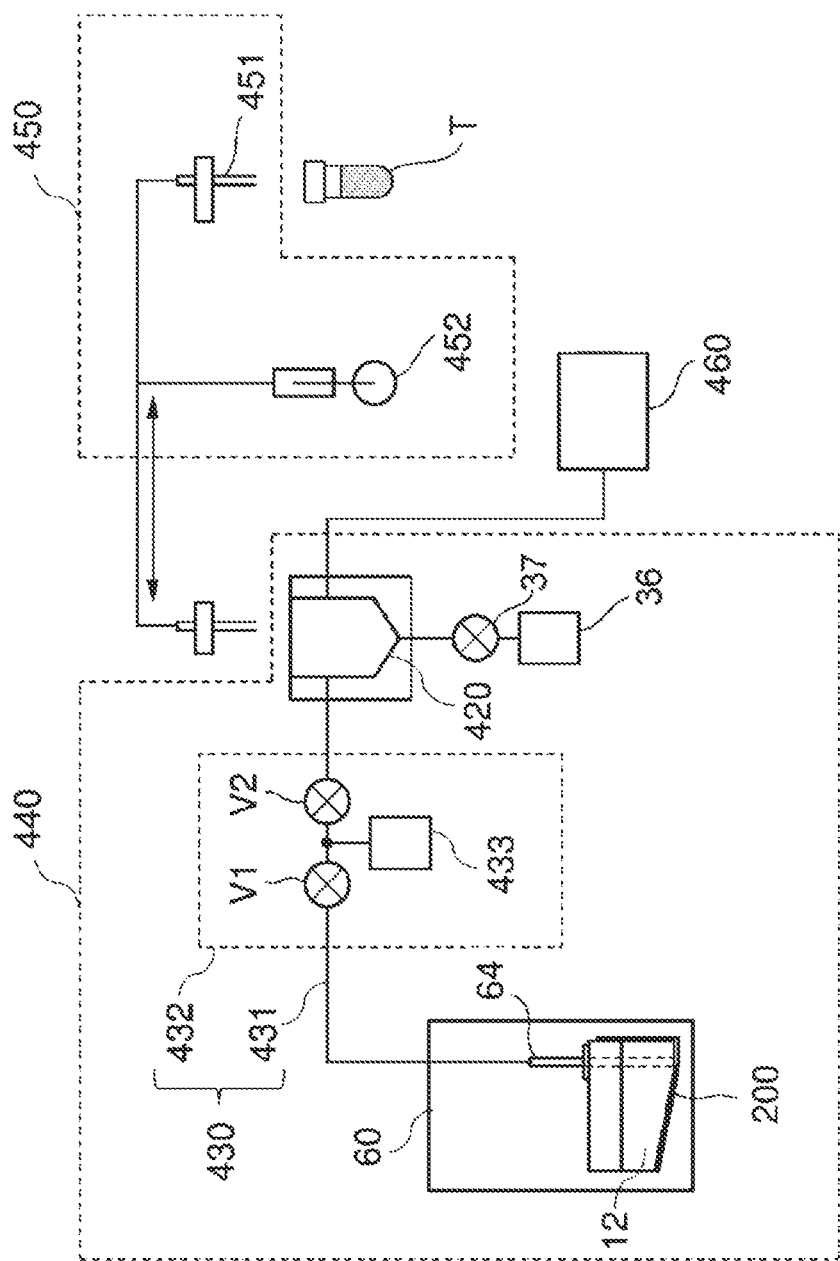
FIG. 2 is a schematic diagram showing a configuration of a measurement unit of the first embodiment of the present invention.

FIG. 2 is a schematic diagram showing a configuration of a measurement unit of the first embodiment of the present invention. As shown in FIGS. 1 and 2, the measurement unit 400 includes a sample preparation section 440 having a chamber 420 and a liquid feeding mechanism 430, a specimen suction mechanism 450, and a flow cytometer detection section (FCM detection section) 460 as a detection section that acquires a signal emitted from a cell.

The specimen suction section 450 is a mechanism that sucks a specimen in specimen container T. The specimen suction section 450 includes a specimen suction nozzle 451. The specimen suction nozzle 451 can penetrate the specimen container sealed with a lid. The specimen suction mechanism 450 can move the specimen suction nozzle 451 in order to insert the specimen suction nozzle 451 into the specimen container. The specimen suction mechanism 450 can move in XY directions so as to move the specimen suction nozzle 451 to the upper position of the chamber 420. The specimen suction mechanism 450 has a metering section 452 (for example, a syringe pump) for sucking and discharging a specimen by the specimen suction nozzle 451.

The liquid feeding mechanism 430 includes a liquid feeding tube 431 and a liquid feeding section 432 for injecting a reagent 12 from the reagent container 200 into the chamber 420 via the liquid feeding tube 431. The liquid feeding mechanism 430 is a mechanism that feeds a reagent from the reagent container 200 attached to a reagent container holder 60 (see FIGS. 13 to 15) described later to the chamber 420 via the liquid feeding tube 431 provided between the reagent container 200 and the chamber 420. The reagent container holder 60 is mounted with the reagent container 200 in which the reagent 12 containing both the first fluorescent dye and the second fluorescent dye is contained. The liquid feeding mechanism 430 feeds the reagent from the reagent container 200 to the chamber 420. The cell is stained with a first compound constituting the first fluorescent dye and a second compound constituting the second fluorescent dye.

A suction tube 64 constituting one end of the liquid feeding tube 431 is inserted into the reagent container 200. The other end of the liquid feeding tube 431 is connected to the chamber 420. The suction tube 64 may have a sharply formed tip so as to be able to penetrate a sealing film (also referred to as a seal member) of the reagent container 200 attached to the reagent container holder 60.

The liquid feeding section 432 of the liquid feeding mechanism 430 includes a pump 433 as a metering section that generates a negative pressure for drawing the reagent 12 from the reagent container 200 to the liquid feeding tube 431 and a positive pressure for supplying the drawn reagent to the chamber 420. The pump 433 can be, for example, a syringe pump or a diaphragm pump. The liquid feeding mechanism 430 may include a plurality of valves V1 and V2. For example, when the metering section 433 including a syringe pump or a diaphragm pump sucks the reagent from the reagent container, the valve V1 is opened and the valve V2 is closed. The metering section 433 generates a negative pressure, whereby a flow path between the valve V1, the valve V2, and the metering section 433 is filled with the reagent. When the filled reagent is supplied to the chamber 420, the valve V1 is closed, the valve V2 is opened, and the metering section 433 generates a positive pressure. As a result, the reagent in the reagent container 200 is supplied to the chamber 420.

The chamber 420 is a container in which a reagent and a specimen are mixed to prepare a measurement sample. The chamber 420 mixes one reagent 12 containing both the first and second fluorescent dyes with the specimen to prepare a measurement sample in which a cell is stained with the first and second fluorescent dyes. In the measurement unit 400, one or more chambers 420 are provided. The chamber 420 is connected to a waste liquid chamber 36 via a valve 37. After the measurement by an FCM detection section 460 is completed, the measurement sample remaining in the chamber 420 is discarded in the waste liquid chamber 36. The chamber 420 is cleaned by a cleaning mechanism (not shown) before the next measurement sample is prepared, and the cleaned liquid is discarded in the waste liquid chamber.

In the measurement unit 400, one or more reagent container holders 60 are provided. The reagent container holder 60 is mounted with the reagent container 200 containing a reagent containing both the first fluorescent dye that is excited by light and emits fluorescence of a first wavelength and the second fluorescent dye that is excited by light and emits fluorescence of a second wavelength. In the example shown in FIG. 2, the reagent containing the first fluorescent dye and the second fluorescent dye is contained in one reagent container 200.

The reagent container 200 is a container in which a reagent is stored. The reagent container 200 has an opening into which a piercer (suction tube) 64 connected to the first end of the liquid feeding tube 431 of the liquid feeding mechanism 430 is inserted. In a state before the reagent container 200 is attached to the reagent container holder 60, for example, the opening is covered with a sealing film. The piercer 64 is inserted into an opening of the reagent container 200 attached to the reagent container holder 60. The inserted piercer 64 is fixed at a predetermined position in the reagent container 200. The piercer 64 inserted into the reagent container 200 is fixed at the predetermined position, for example, while the reagent container 200 is attached to the reagent container holder 60. At least while a plurality of different specimens are measured (that is, while a plurality of different measurement samples are prepared), the specimen is fixed at the predetermined position.

The FCM detection section 460 acquires first and second signals each corresponding to fluorescence of the first and second wavelengths emitted from a cell stained with the first and second fluorescent dyes. The FCM detection section 460 irradiates the measurement sample flowing in a flow cell with light. The FCM detection section 460 may include, for example, a plurality of light sources each corresponding to each wavelength, or the FCM detection section 460 may be configured to emit light of a single wavelength and detect fluorescence from a plurality of fluorescent dyes excited from the light of a single wavelength. When the measurement sample is irradiated with light, optical signals each corresponding to the first fluorescent dye and the second fluorescent dye are detected. Each optical signal is A/D converted to acquire digital data. The acquired digital data is analyzed by the analysis unit 300X (see FIG. 1).

In the first embodiment, the liquid feeding tube 431 is provided between the reagent container 200 and the chamber 420, and the liquid feeding section 432 feeds the reagent in the reagent container 410 to the chamber 420 via the liquid feeding tube 431. Accordingly, in the first embodiment, a process of sucking the reagent from the reagent container with a nozzle, moving the nozzle sucking the reagent to a disposition place of the chamber, and discharging the reagent into the chamber (see, for example, Literature 1.) is unnecessary.

The analysis unit 300X (see FIG. 1) performs at least one of cell classification and counting based on the first and second signals each corresponding to the fluorescence of the first and second wavelengths emitted from the cell stained with the first and second fluorescent dyes.

Figure 3:
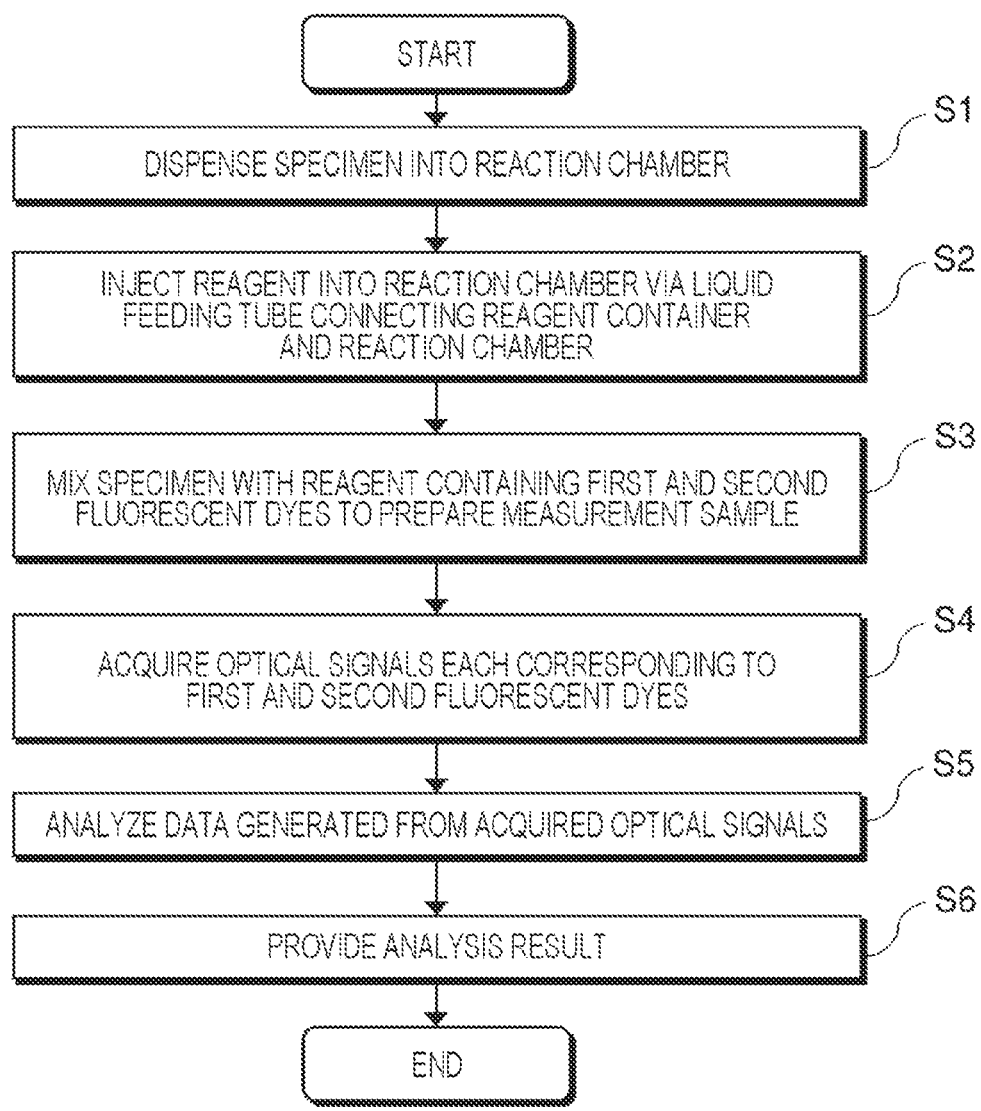
FIG. 3 is a flowchart showing a procedure of measurement sample preparation processing by the analysis system of the first embodiment of the present invention.

FIG. 3 is a flowchart showing a procedure of measurement sample preparation processing by the analysis system of the first embodiment. The measurement sample preparation processing by the analysis system 4000 will be described with reference to FIGS. 1, 2, and 3. In the measurement sample preparation processing by the analysis system 4000, first, a specimen is dispensed into the chamber 420 in the measurement unit 400 (step S1). Next, the reagent is injected into the chamber 420 via the liquid feeding tube 431 connecting the reagent container 410 and the chamber 420 (step S2). Next, in the chamber 420, the specimen and the reagent containing the first and second fluorescent dyes are mixed to prepare a measurement sample (step S3). Next, the measurement sample prepared in the chamber 420 is fed to the FCM detection section 460, and the measurement sample is irradiated with light to acquire optical signals each corresponding to the side scattered light and the first and second fluorescent dyes (step S4). Next, data generated from the acquired optical signal is analyzed by the analysis unit 300X (step S5). Then, the analysis unit 300X provides an analysis result (step S6).

According to the first embodiment, supply of the first and second fluorescent dyes to the chamber 420 for reacting the first and second fluorescent dyes with the specimen can be carried out through the liquid feeding tube 431. The liquid feeding tube 431 is a dedicated flow path that supplies only the reagent 12 containing the first and second fluorescent dyes to the chamber 420. Since the inside of the liquid feeding tube 431 can always be maintained in a state of being filled with the reagent 12, the processing speed is increased in that quantitative determination by the metering section (pump) 433 can be performed quickly. Since the liquid feeding tube 431 is the dedicated flow path for supplying the reagent 12, it is not necessary to prevent contamination between different reagents, and cleaning is unnecessary. The fact that cleaning is unnecessary also contributes to an improvement in processing speed.

The advantages according to the first embodiment are more apparent, for example, in comparison with Literature 1. For example, in the flow cytometer described in Literature 1, a 96-well plate is used as a reaction container. The 96-well plate is a consumable item. The 96-well plate is taken out from the flow cytometer and discarded after use. Therefore, the flow cytometer described in Literature 1 has a configuration in which a reagent container and the reaction container are connected by a liquid feeding tube, and a process for sucking and discharging a reagent cannot be excluded.

For the measurement by the flow cytometer described in Literature 1, a reagent containing four kinds of fluorescent dyes corresponding to four markers (CD45, CD3, CD4, CD8) in cells in a blood specimen (AQUIOS Tetra-1 Panel) is used. Each of these fluorescent dyes is attached to an antibody corresponding to each of the markers described above. That is, the reagent of Literature 2 stains the cells in a blood specimen by an antibody-antigen reaction. In the case of such a reagent, since the reaction takes time, it takes time to measure one specimen. Specifically, Literature 1 describes that it takes about 20 minutes to measure one specimen including preparation of a measurement sample. In the technique of Literature 1, since the measurement time (in particular, the time required for the antibody-antigen reaction) per specimen is long, the preparation of measurement samples of a plurality of specimens is performed in parallel in a plurality of wells of a 96-well plate of consumables to shorten total processing time per specimen. In other words, processing capacity (throughput) per unit time is improved. On the other hand, in the first embodiment, a reagent containing the first and second fluorescent dyes in which a compound itself stains cytoplasm, nucleic acid, and DNA of the cell is used as the reagent 12. Such a fluorescent dye reacts faster for staining than an antibody reagent, and for example, the time required for preparing a measurement sample of one specimen is less than 1 minute. Therefore, according to the first embodiment, it is possible to provide an analyzer capable of realizing measurement using a plurality of fluorescent labels with high processing capacity.

Second Embodiment

Figure 4:
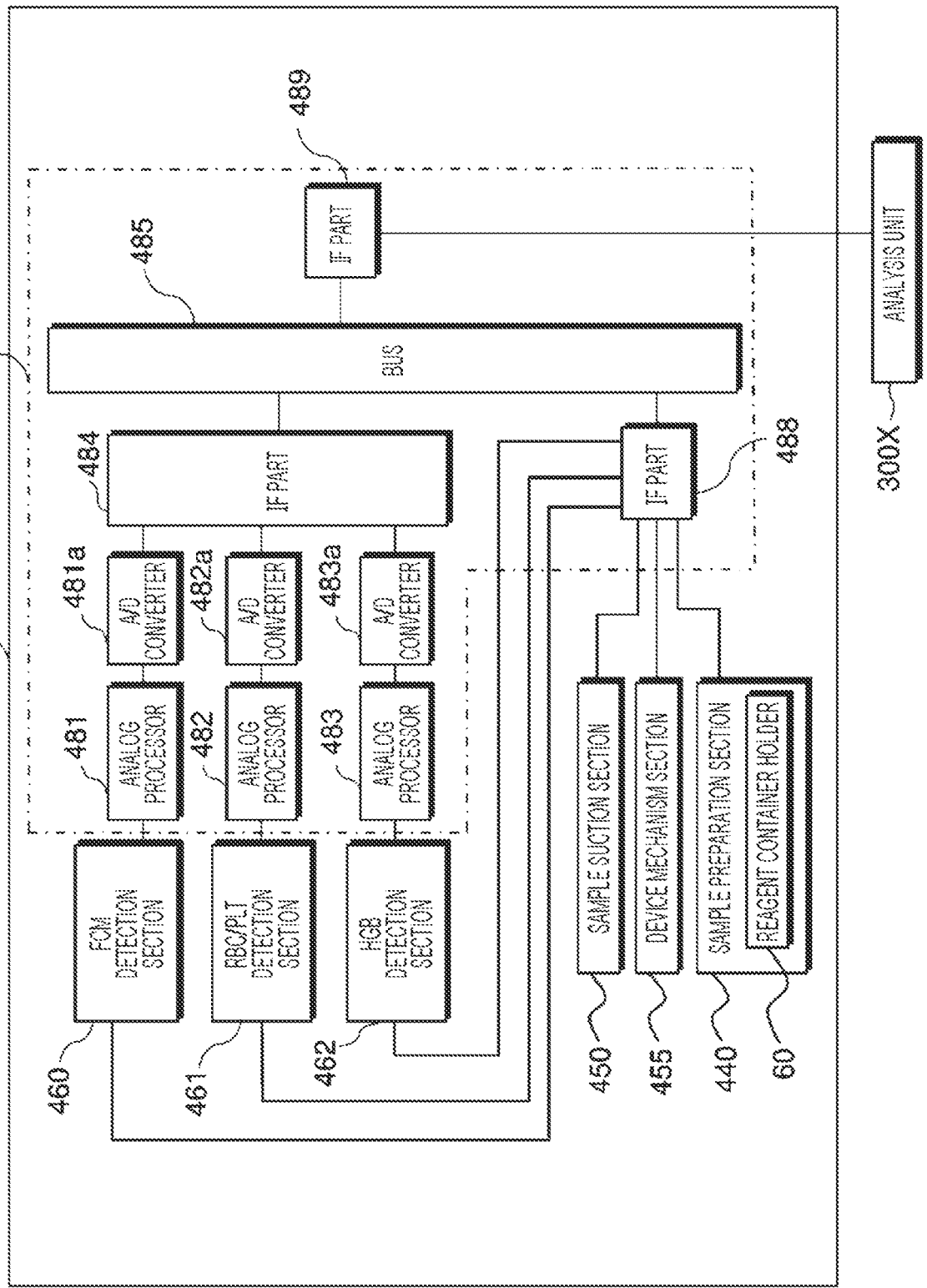
FIG. 4 is a block diagram showing a configuration of a measurement unit of an analysis system according to a second embodiment of the present invention.

An analysis system 4000 of the second embodiment is a multi-item automatic blood cell analyzer that executes at least one of counting and analysis of cells in a blood specimen. FIG. 4 is a block diagram showing a configuration of a measurement unit 400 of the analysis system 4000 (see FIG. 1) of the second embodiment. The measurement unit 400 includes a sample preparation section 440, a device mechanism section 455, a specimen suction mechanism 450, an FCM detection section 460, an RBC/PLT detection section 461, an HGB detection section 462, and a measurement unit control section 480. The RBC/PLT detection section 461 is an electric resistance type detection section that introduces a measurement sample prepared by blood and a diluent into an aperture and counts red blood cells (RBC) and platelets (PLT) by detecting a change in electric resistance generated when a cell passes through the aperture. The HGB detection section 462 measures hemoglobin concentration in the blood by an SLS hemoglobin method. The HGB detection section 462 measures the hemoglobin concentration in the blood by irradiating the measurement sample prepared from the blood and an SLS hemolytic agent with light having a wavelength of 555 nm, which is the absorption wavelength of the SLS hemoglobin, and measuring absorbance. Hereinafter, the FCM detection section 460, the RBC/PLT detection section 461, and the HGB detection section 462 may be collectively referred to as "detection sections 460 to 462".

The specimen suction mechanism 450 sucks a specimen from the specimen container. The specimen suction mechanism 450 discharges the sucked specimen to a chamber of the sample preparation section 440. The sample preparation section 440 includes a chamber for mixing a specimen and a reagent, and a reagent container holder 60 in which a reagent container is installed. The sample preparation section 440 feeds a reagent from a reagent container set in the reagent container holder 60 to a chamber via a liquid feeding tube described later. The specimen and the reagent are mixed in the chamber to prepare a measurement sample.

The device mechanism section 455 includes a motor and an actuator that move each section of the measurement unit 400. The device mechanism section 455 includes, for example, a mechanism that moves a blood collection tube T (see FIG. 5) described later in the vertical direction.

The measurement unit control section 480 includes an analog processor 481 that processes an analog signal output from the FCM detection section 460, an A/D converter 481a that converts an analog signal output from the analog processor 481 into a digital signal, an analog processor 482 that processes an analog signal output from the RBC/PLT detection section 461, an A/D converter 482a that converts an analog signal output from the analog processor 482 into a digital signal, an analog processor 483 that processes an analog signal output from the HGB detection section 462, an A/D converter 483a that converts an analog signal output from the analog processor 483 into a digital signal, and an IF part (interface part) 484 electrically connected to each of the A/D converters 481a, 482a, and 483a. The measurement unit control section 480 further includes an interface (IF) part 488 electrically connected to the sample preparation section 440, the device mechanism section 455, the specimen suction mechanism 450, the FCM detection section 460, the RBC/PLT detection section 461, and the HGB detection section 462, a bus 485 electrically connected to the IF parts 484 and 488, and an IF part 489 electrically connecting the bus 485 and the analysis unit 302X.

Figure 5:
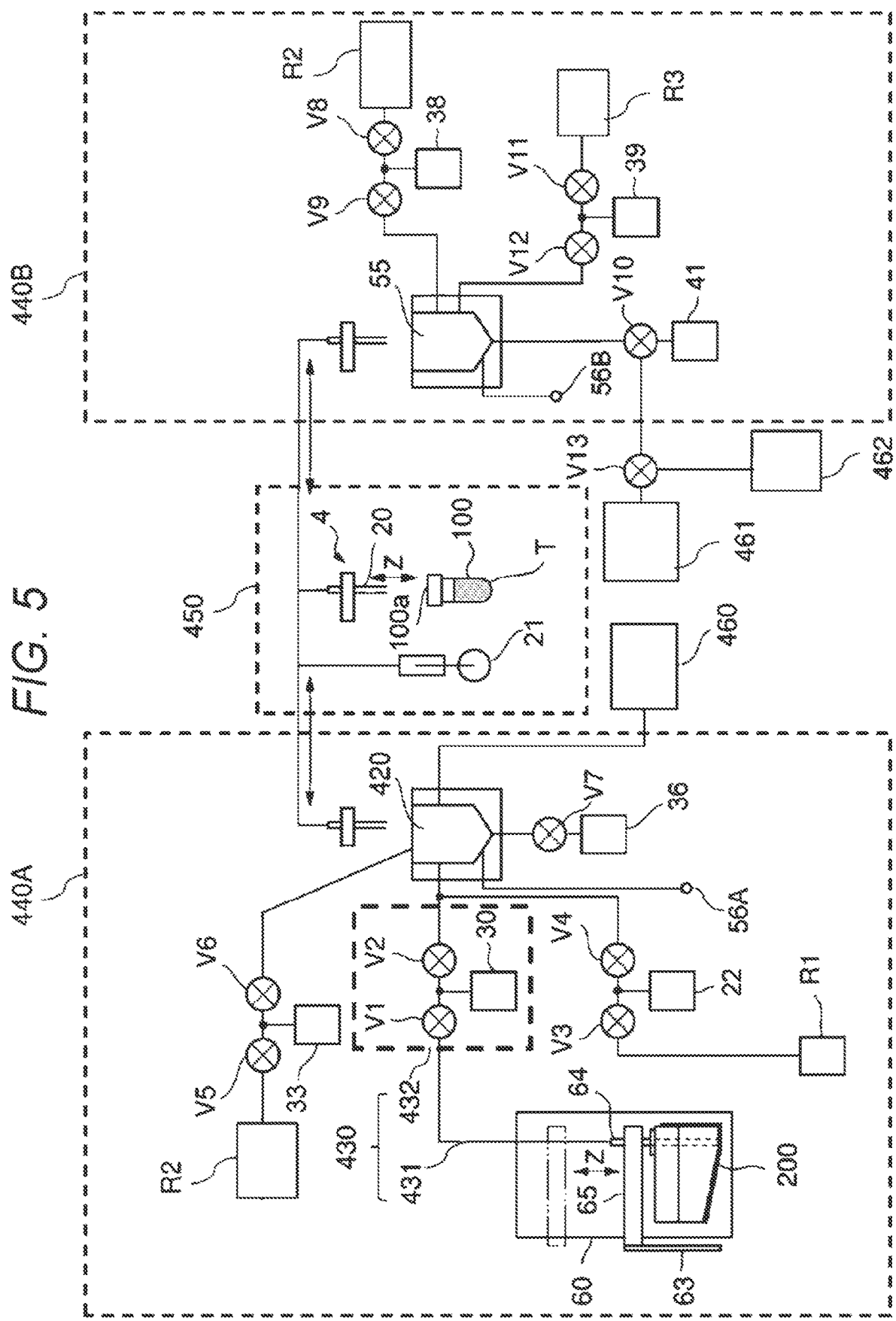
FIG. 5 is a diagram showing a fluid circuit including a specimen suction section, a sample preparation section, and a detection section in the second embodiment of the present invention.

FIG. 5 shows a fluid circuit including the specimen suction mechanism 450, the sample preparation section 440, and the detection sections 460 to 462. The sample preparation section 440 shown in FIG. 4 includes a first sample preparation section 440A for preparing a first measurement sample for optical measurement by the FCM detection section 460, and a second sample preparation section 440B for preparing a second measurement sample for electrical resistance measurement by the RBC/PLT detection section and a third measurement sample for hemoglobin measurement by the HGB detection section 462 (see FIG. 5).

The first sample preparation section 440A includes a first chamber 420. The first chamber 420 is connected to reagent containers R1 and R2. The reagent container R1 contains a hemolytic agent that contracts red blood cells. The reagent container 200 contains a white blood cell staining reagent containing a fluorescent dye. The reagent container R2 contains a diluent. The reagent container R2 will be described later.

The white blood cell staining reagent contained in the reagent container 200 contains a first fluorescent dye and a second fluorescent dye. The first fluorescent dye and the second fluorescent dye will be described later.

The second sample preparation section 400B has a second chamber 55. The second chamber 55 is connected to the reagent container R2 and a reagent container R3. The reagent container R2 is provided in common with the first sample preparation section 440A. The reagent container R3 contains an SLS hemolytic agent for hemolyzing red blood cells and preparing a sample for measurement by the SLS hemoglobin method.

The reagent container 200 containing the white blood cell staining reagent is held by the reagent container holder 60. The reagent container holder 60 is provided with a suction tube 64 for sucking the nucleic acid staining reagent in the reagent container 200, and a suction tube lifting mechanism 65 for lifting and lowering the suction tube 64. The tip of the suction tube 64 can penetrate (puncture) a sealing material of the reagent container 200. A cover 63 is connected to the suction tube lifting mechanism 65. In a state where the suction tube lifting mechanism 65 is lowered and the suction tube 64 penetrates (punctures) the sealing material of the reagent container 200, the cover 63 is also lowered and the cover 63 covers the reagent container 200. When the suction tube lifting mechanism 65 is lifted, the cover 63 is also lifted, and the reagent container 200 becomes detachable from the outside.

A liquid feeding mechanism 430 is provided between the suction tube 64 and the first chamber 420. The liquid feeding mechanism 430 includes a liquid feeding tube 431 and a metering block 432. One end of the liquid feeding tube 431 is configured by the suction tube 64, and the other end is connected to the first chamber 420. The metering block 432 includes a metering section 30 and electromagnetic valves V1 and V2. As the metering section 30, a syringe pump is used. Instead of the syringe pump, for example, a diaphragm pump can also be used. The electromagnetic valves V1 and V2 open and close a flow path. When feeding the white blood cell staining reagent in the reagent container 200 to the chamber 420, the metering section 30 applies a negative pressure to the liquid feeding tube 431 in a state where the electromagnetic valve V1 is opened and the electromagnetic valve V2 is closed. As a result, the white blood cell staining reagent is sucked into the liquid feeding tube 431 from the tip of the suction tube 64, and a certain amount of the white blood cell staining reagent is filled in the flow path between the electromagnetic valves V1 and V2 and the metering section 30. Next, in a state where the electromagnetic valve V1 is closed and the electromagnetic valve V2 is opened, the metering section 30 applies a positive pressure to the liquid feeding tube 431. As a result, a certain amount of the white blood cell staining reagent filled in the flow path between the electromagnetic valves V1 and V2 and the metering section 30 is pushed out, and the white blood cell staining reagent is supplied to the chamber 420 through the liquid feeding tube 431.

A flow path between the reagent container R1 containing the hemolytic agent and the first chamber 420 is provided with a metering section 22 and electromagnetic valves V3 and V4. As the metering section 22, a syringe pump is used. Instead of the syringe pump, for example, a diaphragm pump can also be used. The electromagnetic valves V3 and V4 open and close the flow path. The metering section 22 and the electromagnetic valves V3 and V4 quantitatively send the hemolytic agent in the reagent container R1 to the first chamber 420, similarly to the above-described electromagnetic valves V1 and V2 and metering section 30.

A flow path between the reagent container R2 containing the diluent and the first chamber 420 is provided with a metering section 33 and electromagnetic valves V5 and V6. As the metering section 33, a syringe pump is used. Instead of the syringe pump, for example, a diaphragm pump can also be used. The electromagnetic valves V5 and V6 open and close the flow path. The metering section 33 and the electromagnetic valves V5 and V6 quantitatively feed the diluent in the reagent container R2 into the first chamber 420.

The first chamber 420 is connected to a waste liquid chamber 36 containing an unnecessary solution. An electromagnetic valve V7 that opens and closes the flow path is provided between the first chamber 420 and the waste liquid chamber 36.

The first chamber 420 is connected to a pump 56A that supplies air into the first chamber 420 in order to stir the liquid in the first chamber 420.

A flow path between the reagent container R2 containing the diluent and the second chamber 55 is provided with a metering section 38 and electromagnetic valves V8 and V9. As the metering section 38, a syringe pump is used. Instead of the syringe pump, for example, a diaphragm pump can also be used. The electromagnetic valves V8 and V9 open and close the flow path. The metering section 38 and the electromagnetic valves V8 and V9 quantitatively feed the diluent in the reagent container R2 into the second chamber 55. The second chamber 55 is connected to a waste liquid chamber 41 containing an unnecessary solution. An electromagnetic valve V10 is provided between the second chamber 55 and the waste liquid chamber 41 to switch the flow path between a flow path leading from the second chamber 55 to the waste liquid chamber 41 and a flow path leading from the second chamber 55 to the RBC/PLT detection section 461 and the HGB detection section 462. The electromagnetic valve V10 will be described later.

A flow path between the reagent container R3 containing the SLS hemolytic agent and the second chamber 55 is provided with a metering section 39 and electromagnetic valves V11 and V12. As the metering section 39, a syringe pump is used. Instead of the syringe pump, for example, a diaphragm pump can also be used. The electromagnetic valves V11 and V12 open and close the flow path. The metering section 39 and the electromagnetic valves V11 and V12 quantitatively feed the SLS hemolytic agent in the reagent container R3 into the second chamber 55.

The second chamber 55 is connected to a pump 56B that supplies air into the second chamber 55 in order to stir the liquid in the second chamber 55.

The specimen suction mechanism 450 includes a suction tube 20 and a metering section 21. The suction tube 20 has a sharply formed tip. The specimen suction mechanism 450 lowers a blood collection tube 100, whereby the suction tube 20 punctures a lid 100a that closes the blood collection tube 100, and the suction tube 20 is inserted into the inside. The metering section 21 generates a negative pressure in a state where the suction tube 20 is inserted into the blood collection tube 100, whereby the blood sample contained in the blood collection tube 100 is sucked into the suction tube 20. The specimen suction mechanism 450 moves the suction tube 20 upward to extract the suction tube 20 from the blood collection tube 100. The specimen suction mechanism 450 horizontally moves the suction tube 20 above the first chamber 420. The specimen suction mechanism 450 lowers the suction tube 20 with respect to the first chamber 420, and the metering section 21 generates a positive pressure to discharge the sucked blood sample to the first chamber 420. The specimen suction mechanism 450 moves the suction tube 20 upward. The specimen suction mechanism 450 horizontally moves the suction tube 20 above the second chamber 55. The specimen suction mechanism 450 discharges the blood sample to the second chamber 55 in the same manner as in the first chamber 420.

The first chamber 420 is connected to the FCM detection section 460 (see FIG. 4). The blood sample discharged to the first chamber 420 is mixed with the white blood cell staining reagent contained in the reagent container 200 and the hemolytic agent contained in the reagent container R1 to prepare a measurement sample. More specifically, a measurement sample in which red blood cells are hemolyzed by the hemolytic agent and white blood cells are stained with the first fluorescent dye and the second fluorescent dye is prepared. Such a measurement sample is prepared, for example, as follows. First, the hemolytic agent is supplied to the first chamber 420, and then the blood sample is discharged to the first chamber 420. Air is supplied to the first chamber 420, and the mixture is stirred. As a result, the red blood cells are hemolyzed by the hemolytic agent. Next, the white blood cell staining reagent is supplied to the first chamber 420. Air is supplied to the first chamber 420, and the mixture is stirred. A reaction proceeds in the first chamber 420, and staining with the fluorescent dyes is performed. The reaction time is, for example, less than 1 minute, more preferably less than 50 seconds, and more preferably less than 45 seconds. As a result, a measurement sample in which white blood cells contained in the blood are stained with the first fluorescent dye and the second fluorescent dye is obtained. The FCM detection section 460 is connected to a pump (not shown), and the measurement sample in the first chamber 420 is supplied to the FCM detection section 460 by driving the pump. The FCM detection section 460 acquires a plurality of optical signals including fluorescence corresponding to the first fluorescent dye and fluorescence corresponding to the second fluorescent dye from the white blood cells.

The second chamber 55 is connected to the RBC/PLT detection section 461 and the HGB detection section 462. An electromagnetic valve V13 switches between feeding of the measurement sample from the second chamber 55 to the RBC/PLT detection section 46 and feeding of the measurement sample to the HGB detection section 462. The RBC/PLT detection section 461 and the HGB detection section 462 are connected to a pump (not shown), and the measurement sample in the second chamber 55 is supplied to each of the RBC/PLT detection section 461 and the HGB detection section 462 by driving the pump. The second chamber 55 is used to prepare both a measurement sample for RBC/PLT detection and a measurement sample for HGB detection. An example of a procedure for preparing such a sample will be described. First, the diluent is supplied from the reagent container R2 to the second chamber 55. Next, the blood sample is discharged to the second chamber 55. As a result, a measurement sample in which blood is diluted is obtained. This serves as the measurement sample for RBC/PLT detection. A part of the measurement sample of the second chamber 55 is fed to the RBC/PLT detection section 461, and electric resistance type detection is performed. Next, the SLS hemolytic agent is supplied from the reagent container R3 to the measurement sample remaining in the second chamber 55. As a result, a measurement sample in which the red blood cells are hemolyzed and hemoglobin is converted into SLS hemoglobin is obtained. The measurement sample is fed to the HGB detection section 462. In the example of FIG. 5, the measurement sample for RBC/PLT detection and the measurement sample for HGB detection are prepared in the common second chamber 55, but they may be prepared in separate chambers.

The analysis system 4000 (see FIG. 1) having such a configuration may be configured to be able to measure CBC (Complete Blood Count) items including at least eight parameters of red blood cell count (RBC), white blood cell count (WBC), platelet count (PLT), hemoglobin concentration (HGB), hematocrit value (HCT), mean corpuscular volume (MCV), mean corpuscular hemoglobin (MCH), and mean corpuscular hemoglobin concentration (MCHC). The analysis system 4000 may be configured to be able to measure, in addition to CBC items, DIFF items that classify white blood cells into a plurality of subpopulations.

<Modification Regarding Sample Preparation Section>

Figure 6:
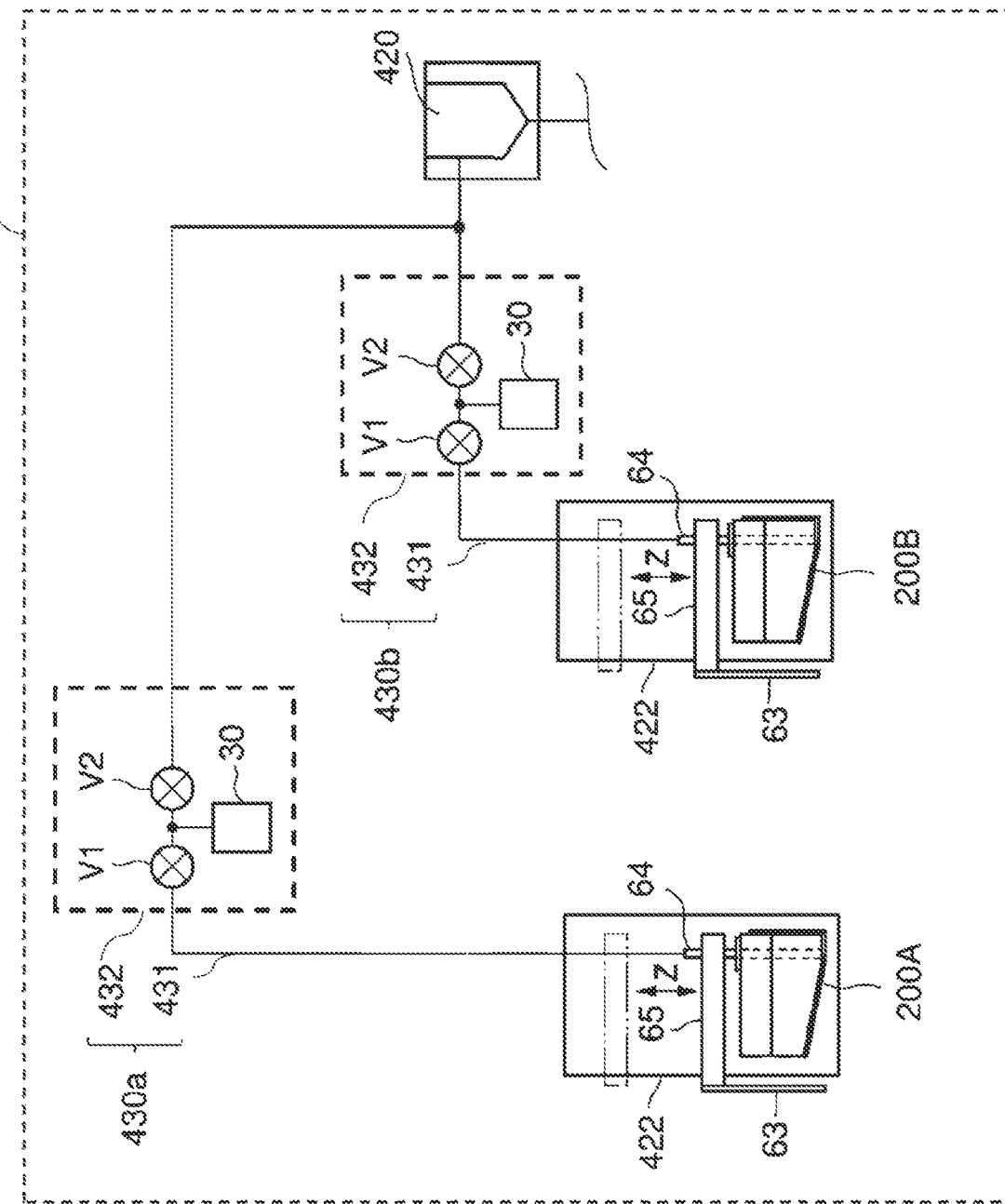
FIG. 6 is a schematic diagram showing another example of a first sample preparation section in the second embodiment of the present invention.

FIG. 6 is a schematic diagram showing another example of the first sample preparation section 440A. In FIG. 6, elements similar to those in FIG. 5 are not shown. In the example shown in FIG. 5, the first sample preparation section 440A configured to store the reagent containing the first fluorescent dye and the second fluorescent dye in one reagent container 200 and feed the reagent in one reagent container 200 into the chamber 420 by one liquid feeding mechanism 430 has been exemplified. The first sample preparation section 440A of the modification shown in FIG. 6 is configured to store a reagent containing a first fluorescent dye and a reagent containing a second fluorescent dye in individual reagent containers 200A and 200B, respectively, and feed the reagents in the reagent containers 200A and 200B into the chamber 420 by individual first and second liquid feeding mechanisms 430a and 430b, respectively.

The first sample preparation section 440A of FIG. 6 includes one or more chambers 420 that mix two reagents containing one of the first and second fluorescent dyes attached to a reagent container holder with a specimen to prepare a measurement sample in which a cell is stained with the first and second fluorescent dyes. The first reagent container 200A containing the reagent containing the first fluorescent dye is attached to a first holder portion of the reagent container holder 442, and the second reagent container 200B containing the reagent containing the second fluorescent dye is attached to a second holder portion of the reagent container holder 442.

The first liquid feeding mechanism 430a is provided to feed the reagent in the first reagent container 200A to the chamber 54. The configuration of the first liquid feeding mechanism 430a is as described with reference to FIG. 3. The second liquid feeding mechanism 430b is provided to feed the reagent in the second reagent container 200B to the chamber 54. The configuration of the second liquid feeding mechanism 430b is similar to that of the first liquid feeding mechanism. Liquid feeding tubes 431 of the two liquid feeding mechanisms 430a and 430b merge in the middle of the flow path, and they are connected to the chamber 420. In the example of FIG. 6, an example in which the two liquid feeding tubes merge is shown, but the two liquid feeding tubes may be individually connected to the chamber 420.

In the configuration of FIG. 6, the reagent containing the first fluorescent dye and the reagent containing the second fluorescent dye are contained in different reagent containers 200A and 200B, respectively, and they are supplied to the chamber 420 by two different liquid feeding mechanisms to be mixed with the specimen. Also with this configuration, a system for staining a blood cell component contained in the specimen with two fluorescent dyes can be constructed.

Figure 7:
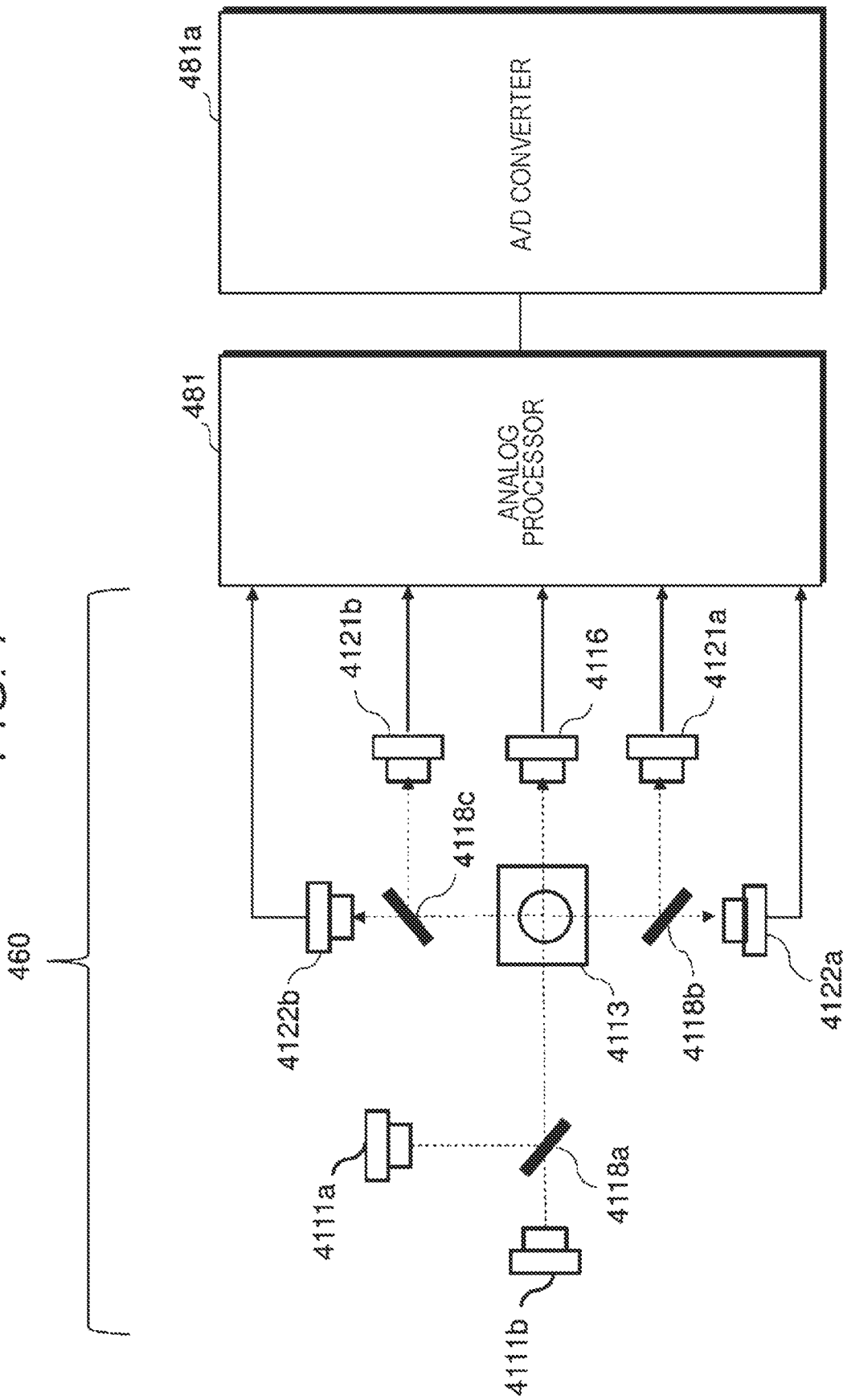
FIG. 7 is a configuration explanatory diagram showing an example of an optical system of an FCM detection section in the second embodiment of the present invention.

FIG. 7 is a configuration explanatory diagram showing an example of an optical system of the FCM detection section 460. As shown in FIG. 7, the FCM detection section 460 includes a first light source 4111a and a second light source 4111b having different wavelengths, a flow cell 4113, dichroic mirrors 4118a, 4118b, and 4118c, side scattered light receiving elements 4121a and 4121b, a forward scattered light receiving element 4116, and side fluorescent light receiving elements 4122a and 4122b. In the example of FIG. 7, the light source includes the first light source 4111a for exciting the first fluorescent dye and the second light source 4111b for exciting the second fluorescent dye.

The FCM detection section 460 acquires the first signal including a plurality of signals each corresponding to the side scattered light and the side fluorescent light by the first light source 4111a and the second signal including a plurality of signals each corresponding to the forward scattered light, the side scattered light and the side fluorescent light by the second light source 4111*b*. As described above, the FCM detection section 460 is connected to the first chamber 420 of the first sample preparation section 440A (see FIG. 5). The measurement sample prepared in the first chamber 420 flows into a flow cell (sheath flow cell) 4113 of the FCM detection section 460. In the example of FIG. 7, the measurement sample flows in a direction perpendicular to a paper surface. In a state where the measurement sample is flowing in the flow cell 4113, the first light source 4111*a* and the second light source 4111*b* irradiate the flow cell 4113 with light. More specifically, the light emitted from the first light source 4111*a* is reflected by the dichroic mirror 4118*a*, and the light is applied to the flow cell 4113. The light emitted from the second light source 4111*b* is transmitted through the dichroic mirror 4118*a*, and the light is applied to the flow cell 4113.

The first light source 4111*a* and the second light source 4111*b* of the FCM detection section 460 are not particularly limited, and a light source of a wavelength suitable for exciting the fluorescent dye is selected. For example, the first light source 4111*a* can emit light of a first wavelength, and the second light source 4111*b* can emit light of a second wavelength longer than the first wavelength. For example, the first wavelength is 315 to 490 nm, preferably 400 to 450 nm, and more preferably 400 to 410 nm. The second wavelength is 610 to 750 nm, preferably 620 to 700 nm, and more preferably 633 to 643 nm. As such first and second light sources 4111*a* and 4111*b*, for example, a semiconductor laser light source, a gas laser light source such as an argon laser light source and a helium-neon laser, a mercury arc lamp or the like can be used. Especially, a semiconductor laser light source is preferable because it is inexpensive compared to a gas laser light source. As described above, by selecting the first light source 4111*a* and the second light source 4111*b* in which wavelength bands of the light to be emitted are separated from each other, it is easy to select a dye in which overlapping of wavelength bands of fluorescence from the fluorescent dyes each corresponding to each light source is small. In a case where the overlapping of wavelength bands of fluorescence emitted from the fluorescent dye is large, it is necessary to cope with leakage to be described later. However, since a fluorescent dye having a small overlapping (or no overlapping) of the wavelength bands of the fluorescence can be selected, it is not necessary to cope with leakage.

The forward scattered light receiving element 4116 is disposed to receive forward scattered light emitted from the cell based on the light emitted from the second light source 4111*b*. The forward scattered light receiving element 4116 is, for example, configured to receive only forward scattered light corresponding to light emitted from the second light source 4111*b*. The forward scattered light receiving element 4116 is, for example, a photodiode. In this example, the light receiving element 4116 receives the forward scattered light of the second wavelength emitted from the second light source 4111*b*, but the light receiving element 4116 may alternatively receive the forward scattered light of the first wavelength emitted from the first light source 4111*a*.

The side scattered light receiving element 4121*a* is disposed to receive side scattered light corresponding to light from the first light source 4111*a*. The side scattered light corresponding to light emitted from the first light source 4111*a* (the first side scattered light) is reflected by the dichroic mirror 4118*b*, and the first side scattered light is received by the side scattered light receiving element 4121*a*. The side scattered light receiving element 4121*a* is, for example, a photodiode.

The side scattered light receiving element 4121*b* is disposed to receive side scattered light corresponding to light from the second light source 4111*b*. The side scattered light corresponding to light emitted from the second light source 4111*b* (the second side scattered light) is reflected by the dichroic mirror 4118*c*, and the second side scattered light is received by the side scattered light receiving element 4121*b*. The side scattered light receiving element 4121*b* is, for example, a photodiode.

The side fluorescent light receiving element 4122*a* is disposed to receive fluorescence corresponding to light from the first light source 4111*a*, that is, light generated by exciting the first fluorescent dye by light of the first wavelength from the first light source 4111*a*. The side fluorescent light corresponding to light emitted from the first light source 4111*a* (the first side fluorescent light) is transmitted through the dichroic mirror 4118*b*, and the first side fluorescent light is received by the side fluorescent light receiving element 4122*a*. The side fluorescent light receiving element 4122*a* is, for example, an avalanche photodiode.

The side fluorescent light receiving element 4122*b* is disposed to receive fluorescence corresponding to light from the second light source 4111*b*, that is, light generated by exciting the second fluorescent dye by light of the second wavelength from the second light source 4111*b*. The side fluorescent light corresponding to light emitted from the second light source 4111*b* (the second side fluorescent light) is transmitted through the dichroic mirror 4118*c*, and the second side fluorescent light is received by the side fluorescent light receiving element 4122*b*. The side fluorescent light receiving element 4122*b* is, for example, an avalanche photodiode. Photomultipliers may be used as the forward scattered light receiving element 4116, the side scattered light receiving elements 4121*a* and 4121*b*, and the side fluorescent light receiving elements 4122*a* and 4122*b*.

Each of the forward scattered light receiving element 4116, the side scattered light receiving elements 4121*a* and 4121*b*, and the side fluorescent light receiving elements 4122*a* and 4122*b* outputs a wave-shaped electric signal including a pulse corresponding to received light intensity (also referred to as a received light signal). Typically, each pulse of the received light signal corresponds to one cell (for example, white blood cell). Each of the output received light signals is input to the analog processor 481. The analog processor 481 performs processing such as noise removal and smoothing on the analog signal input from the FCM detection section 460. The analog processor 481 outputs the processed analog signal to the A/D converter 481*a*. The other analog processors 482 and 483 (see FIG. 4) are configured similarly to the analog processor 481.

The A/D converter 481*a* converts the analog signal output from the analog processor 481 into a digital signal. The A/D converter 481*a* converts the analog signal from the start to the end of measurement of the specimen into a digital signal. When a plurality of types of analog signals (for example, analog signals respectively corresponding to the forward scattered light intensity, the first side scattered light intensity, the first fluorescence intensity, the second side scattered light intensity, and the second fluorescence intensity) are generated by measurement in a certain measurement channel, the A/D converter 481*a* converts each analog signal from the start to the end of measurement into a digital signal. For example, five types of analog signals (that is, the forward scattered light signal, the first side scattered light signal, the first fluorescence signal, the second side scattered light signal, and the second fluorescence signal) are input to the A/D converter 481*a*. The A/D converter 481*a* converts each of the input analog signals into a digital signal.

For example, the A/D converter 481*a* samples analog signals at a predetermined sampling rate (for example, sampling at 1024 points at intervals of 10 nanoseconds, sampling at 128 points at intervals of 80 nanoseconds, sampling at 64 points at intervals of 160 nanoseconds, or the like). For example, the A/D converter 481*a* generates waveform data of the forward scattered light signal, waveform data of the first side scattered light signal, waveform data of the first fluorescence signal, waveform data of the second side scattered light signal, and waveform data of the second fluorescence signal for each tangible component by executing sampling processing on five types of analog signals corresponding to individual cells flowing through the flow cell 4113. The A/D converter 481*a* gives an index to each of the generated waveform data. The generated waveform data is, for example, a digital signal having a signal corresponding to each of N cells contained in one specimen. As a result, five digital signals corresponding to five types of analog signals (forward scattered light signal, first and second side scattered light signals and first and second fluorescence signals) obtained from the N cells are generated (see FIG. 39).

In addition to generating waveform data from the analog signal, the A/D converter 481*a* calculates feature parameters representing morphological features of individual cell, for example, a peak value, a pulse width, and a pulse area from pulses of the analog signal.

Figure 8:
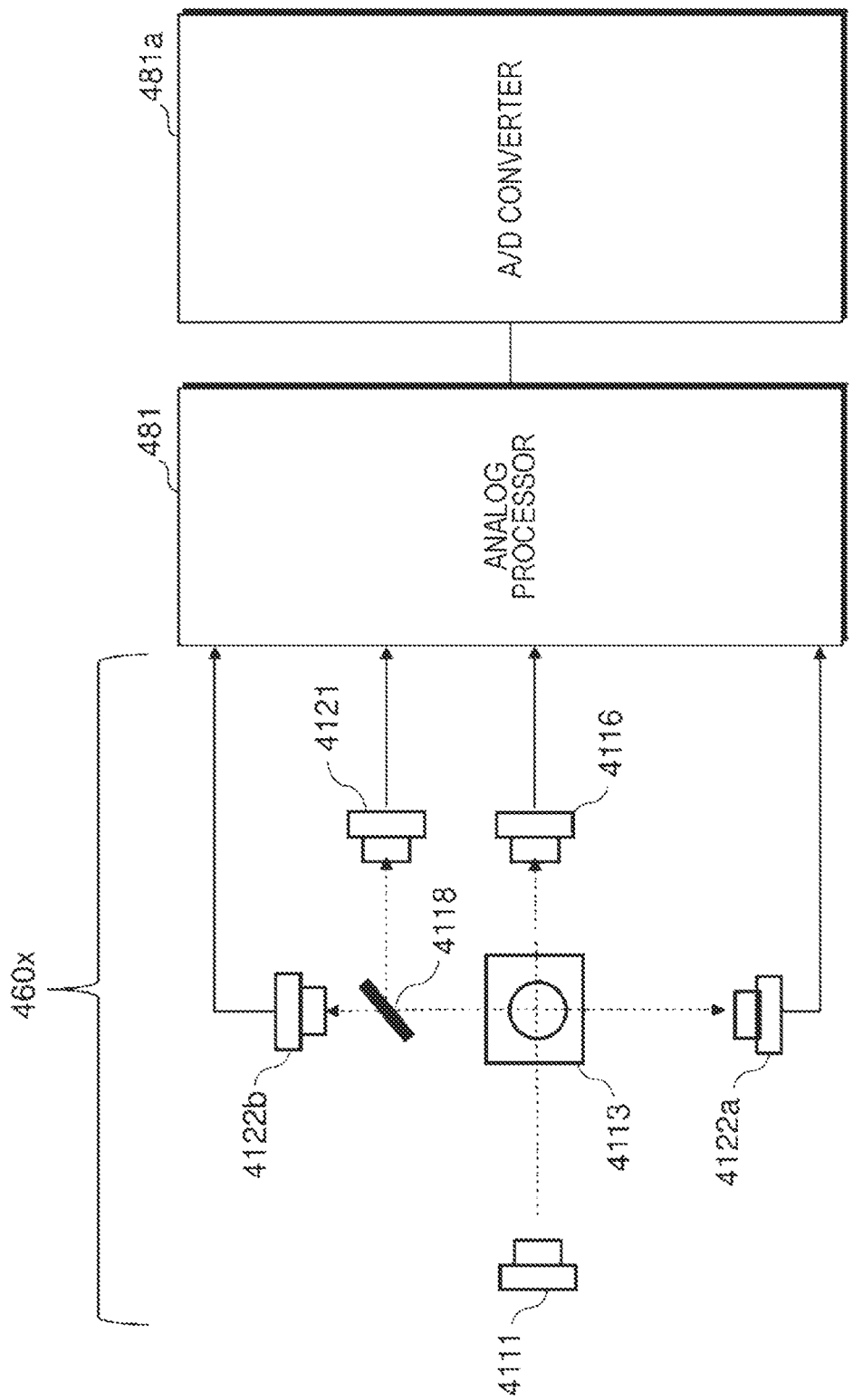
FIG. 8 is a configuration explanatory diagram showing another example of the optical system of the FCM detection section in the second embodiment of the present invention.

FIG. 8 is a configuration explanatory diagram showing another example of the optical system of the FCM detection section. As shown in FIG. 8, the light source of FCM detection section 460*x* may be constructed with one light source 4111 that excites the first fluorescent dye and the second fluorescent dye. In this case, the FCM detection section 460*x* acquires the first signal including a plurality of signals each corresponding to the forward scattered light, the side scattered light, and the side fluorescent light by the light source 4111 and the second signal corresponding to the side fluorescent light by the light source 4111.

In this case, for example, the flow cell 4113 is irradiated with light of a predetermined wavelength from one light source 4111. The cell contained in the measurement sample flowing through the flow cell 4113 is stained with a plurality of types of fluorescent dyes having different wavelengths of fluorescence emitted from the fluorescent dye to be excited, similarly to the above-described example. In this example, as the plurality of types of fluorescent dyes, a plurality of types of fluorescent dyes having different wavelengths excited by irradiation with light of a predetermined wavelength (for example, 488 nm) is used. The plurality of types of fluorescent dyes having different wavelengths to be excited means that, for example, colors of fluorescence emitted by being excited when each fluorescent dye is irradiated with light from one light source are different.

In the optical system of the FCM detection section 460*x* shown in FIG. 8, the cell contained in the measurement sample is stained with a plurality of fluorescent dyes, and each fluorescence emitted from the plurality of fluorescent dyes by irradiating the cell with light from one light source 4111 can be detected. In this case, the light emitted from one light source 4111 has a single wavelength, thus when the cell is irradiated with the light from one light source 4111, one side scattered light corresponding to the single wavelength of the light is emitted. Therefore, in the optical system of the FCM detection section 460*x* shown in FIG. 8, one dichroic mirror 4118 is provided for the dichroic mirror, and the other configurations are substantially the same as those of the optical system shown in FIG. 7.

Figure 9:
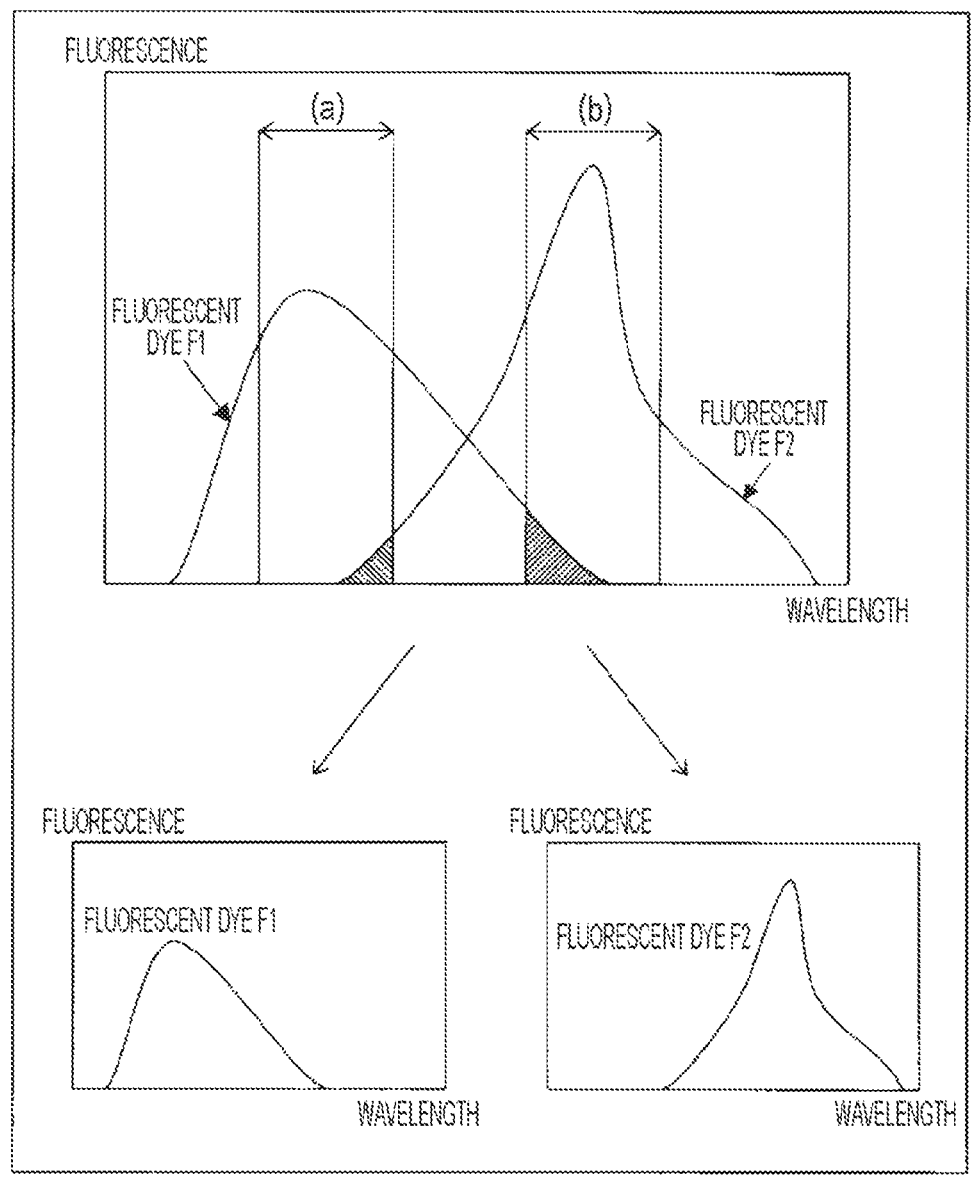
FIG. 9 is a diagram showing an example in which fluorescence emitted from two different fluorescent dyes leaks from each other.

The fluorescence of each of the fluorescent dyes has a unique spectrum. Therefore, in the case of separation into a single wavelength range by an optical system (for example, the dichroic mirrors 4118 and the side fluorescent light receiving elements 4122*a* and 4122*b* in FIG. 7), fluorescence emitted from a fluorescent dye other than one fluorescent dye bound to a target molecule in one cell may leak into each of the side fluorescent light receiving elements 4122*a* and 4122*b*. For example, as in the example shown in FIG. 9, when each fluorescent dye is excited by irradiating a plurality of fluorescent dyes with light of a single wavelength, overlapping of wavelength bands of each fluorescence emitted by the excitation of each fluorescent dye may increase. As shown in FIG. 9 showing an example of overlapping of wavelength bands of fluorescence, in a case where a plurality of fluorescent dyes having overlapping wavelength bands of fluorescence is selected, for example, a countermeasure against leakage of fluorescence is performed.

FIG. 9 is a diagram showing an example in which fluorescence emitted from two different fluorescent dyes leaks into each other. In the example shown in FIG. 9, an example is shown in which each fluorescence emitted from two dyes of fluorescent dye F1 and fluorescent dye F2 leaks into each other. In the graph shown in FIG. 9, a vertical axis represents fluorescence altitude, and a horizontal axis represents wavelength. In the light emitted from the fluorescent dye F1, light in wavelength band (a) in FIG. 9 is detected by one side fluorescent light receiving element. In the light emitted from the fluorescent dye F2, light in wavelength band (b) in FIG. 9 is detected by the other side fluorescent light receiving element. The wavelength band (a) detected by one side fluorescent light receiving element corresponding to the fluorescent dye F1 includes a wavelength band of fluorescence emitted by the fluorescent dye F2. The wavelength band (b) detected by the other side fluorescent light receiving element corresponding to the fluorescent dye F2 includes a wavelength band of fluorescence emitted by the fluorescent dye F1. Therefore, measured value of fluorescence by the fluorescent dye F1 can be obtained more accurately by performing correction excluding a portion corresponding to the fluorescent dye F2 in the fluorescence in the wavelength band (a) (corresponding to the fluorescent dye F1). Measured value of fluorescence by the fluorescent dye F2 can be obtained more accurately by performing correction excluding a portion corresponding to the fluorescent dye F1 in the fluorescence in the wavelength band (b) (corresponding to the fluorescent dye F2).

In order to correct the leakage of fluorescence shown in FIG. 9, a positive control of the fluorescent dye F1 and a positive control of the fluorescent dye F2 are used. For the positive control of the fluorescent dye F1, for example, a control reagent containing a particle to which the fluorescent dye F1 is added is used. For the positive control of the fluorescent dye F2, for example, a control reagent containing a particle to which the fluorescent dye F2 is added is used.

Measurement of the positive control of the fluorescent dye F1 by the analysis system including the optical system shown in FIG. 8 is performed as follows before the measurement of the specimen. Light (light of a single wavelength) from the light source 4111 is applied to the particle in the positive control flowing through the flow cell 4113. Fluorescence generated by irradiating the particle with light is detected by each of the side fluorescent light receiving elements 4122a and 4122b. For example, the side fluorescent light receiving element 4122a corresponds to detection of fluorescence emitted from the fluorescent dye F1, and the side fluorescent light receiving element 4122b corresponds to detection of fluorescence generated from the fluorescent dye F2. In this case, among the fluorescence emitted from the particle in the positive control of the fluorescent dye F1, the fluorescence detected by the side fluorescent light receiving element 4122b leaks. For example, when the fluorescence intensity detected by the side fluorescent light receiving element 4122a is "100" and the fluorescence intensity detected by the side fluorescent light receiving element 4122b is "5" among the fluorescence generated from the particle in the positive control of the fluorescent dye F1, 5% of the fluorescence from the fluorescent dye F1 leaks into the side fluorescent light receiving element 4122b. For example, when the fluorescence intensity detected by the side fluorescent light receiving element 4122a is "10" and the fluorescence intensity detected by the side fluorescent light receiving element 4122b is "100" among the fluorescence emitted from the particle in the positive control of the fluorescent dye F2, 10% of the fluorescence from the fluorescent dye F2 leaks into the side fluorescent light receiving element 4122a. The results are summarized in Table 1 below. This Table 1 may be hereinafter referred to as a "compensation matrix".

TABLE 1

|  | Side fluorescent light receiving element 4122a | Side fluorescent light receiving element 4122b |
|---|---|---|
| Fluorescent dye F1 |  | 5% |
| Fluorescent dye F2 | 10% |  |

Next, an example in which a measured value obtained from a measurement sample containing a cell stained with each of the fluorescent dyes F1 and F2 is corrected using the compensation matrix will be described. An example of correction of the measured value is as follows:

Corrected fluorescence intensity of fluorescent dye F1 by side fluorescent light receiving element 4122a=Fluorescence intensity measured by side fluorescent light receiving element 4122a−(5% of fluorescence intensity when positive control of fluorescent dye F2 is measured by side fluorescent light receiving element 4122b)

Corrected fluorescence intensity of fluorescent dye F2 by side fluorescent light receiving element 4122b=Fluorescence intensity measured by side fluorescent light receiving element 4122b−(10% of fluorescence intensity when positive control of fluorescent dye F1 is measured by side fluorescent light receiving element 4122a)

In the above example, the fluorescence intensity when the fluorescence of the positive control of the fluorescent dye F1 is detected by the side fluorescent light receiving element 4122a is "100", and the fluorescence intensity when the fluorescence of the positive control of the fluorescent dye F2 is detected by the side fluorescent light receiving element 4122b is "100". Therefore, each of the corrected fluorescence intensities is as follows.

Corrected fluorescence intensity of fluorescent dye F1 by side fluorescent light receiving element 4122a=Fluorescence intensity measured by side fluorescent light receiving element 4122a 100−10

Corrected fluorescence intensity of fluorescent dye F2 by side fluorescent light receiving element 4122b=Fluorescence intensity measured by side fluorescent light receiving element 4122b 100−5

In the optical system shown in FIGS. 7 and 8, as the fluorescence generated by exciting the first fluorescent dye and the second fluorescent dye, an example in which the fluorescence generated on the side (about 90° with respect to the traveling direction in the examples of FIGS. 7 and 8) with respect to the traveling direction of the irradiation light (side fluorescent light) is detected has been shown, but the example is not limited to this example. For example, fluorescence generated in front of the traveling direction of the irradiation light may be detected, or fluorescence generated at a certain angle that is not perpendicular to the traveling direction of the irradiation light, for example, 20 to 90° may be detected.

Figure 10:
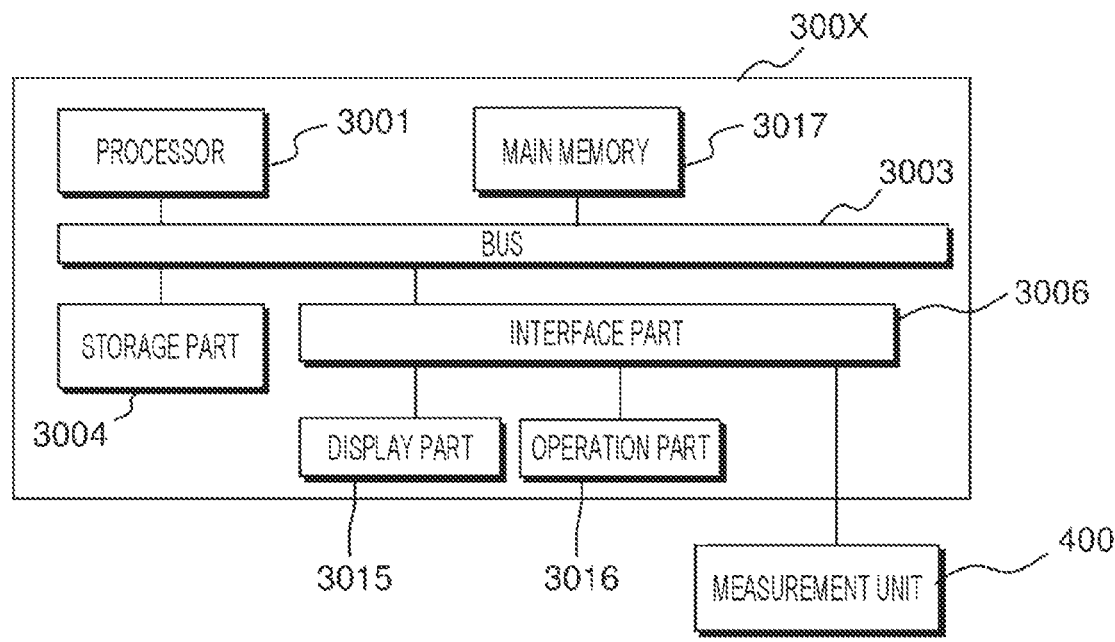
FIG. 10 is a block diagram showing an example of a configuration of an analysis unit in the second embodiment of the present invention.

FIG. 10 is a block diagram showing an example of a configuration of the analysis unit 300X. As shown in FIG. 10, the analysis unit 300X is electrically connected to the measurement unit 400 via an interface part 3006. The interface part 3006 is, for example, a USB interface. The analysis unit 300X includes a processor 3001, a main memory 3017, a bus 3003, a storage part 3004, the interface part 3006, a display part 3015, and an operation part 3016. The analysis unit 300X includes, for example, a personal computer (see the analysis unit 300X in FIG. 1). The analysis unit 300X controls the measurement unit 400 of the analysis system 4000 by executing a program stored in the storage part 3004. The analysis unit 300X executes, for example, a program for analysis. The analysis unit 300X analyzes data acquired by the measurement unit 400. The analysis unit 300X displays an analysis result on the display part 3015. For example, in the example described with reference to FIG. 7, the analysis unit 300X may perform cell classification by inputting, to an AI algorithm learned from waveform data corresponding to at least one, preferably a plurality, of the forward scattered light intensity, first side scattered light intensity, first fluorescence intensity, second side scattered light intensity, and second fluorescence intensity acquired by the measurement unit 400 from an individual cell by the FCM detection section 460. Alternatively, the analysis unit 300X may perform cell classification based on feature parameters (peak value, pulse width, pulse area) of the individual cell based on the forward scattered light intensity, the first side scattered light intensity, the first fluorescence intensity, the second side scattered light intensity, and the second fluorescence intensity. For example, as a method of classifying particles into a plurality of types using a plurality of feature parameters, it is possible to adopt a method of classifying a plurality of particles into a plurality of types by plotting the particles in a multi-dimensional coordinate space having a plurality of parameters as axes, classifying at least some particles into a plurality of populations corresponding to a plurality of types, obtaining an attribution degree of each particle for each population on the basis of a centroid position of each population and a distance between the particles, and reclassifying the particles on the basis of the attribution degree. Such a classification method is described, for example, in U.S. Pat. No. 5,555,198. U.S. Pat. No. 5,555,198 is incorporated herein by reference. Alternatively, classification based on the AI algorithm may be performed on some cells contained in one measurement sample, and classification based on the feature parameters may be performed on other cells.

The processor 3001 is a central processing unit (CPU), and executes a program expanded from the storage part 3004 to the main memory 3017. The storage part 3004 is, for example, a hard disk or a solid state drive (SSD). The storage part 3004 stores, for example, a program for controlling the measurement unit 400, a program for analyzing data acquired by the measurement unit 400, and the like. The display part 3015 includes a computer screen. The display part 3015 is electrically connected to the processor 3001 via the interface part 3006 and the bus 3003. The display part 3015 displays, for example, an analysis result of data acquired by the measurement unit 400.

The operation part 3016 includes a keyboard, a mouse, or a pointing device including a touch panel. A user such as a doctor or a medical technician can input a measurement order to the analysis system 4000 and input a measurement instruction according to the measurement order by operating the operation part 3016. The operation part 3016 can also receive an instruction to display an inspection result from the user. The user can operate the operation part 3016 to browse various information related to the inspection result, for example, a graph, a chart, and flag information given to the specimen. The above-described measurement unit 400 is electrically connected to the analysis unit 300X via the interface part 3006.

Figure 11:
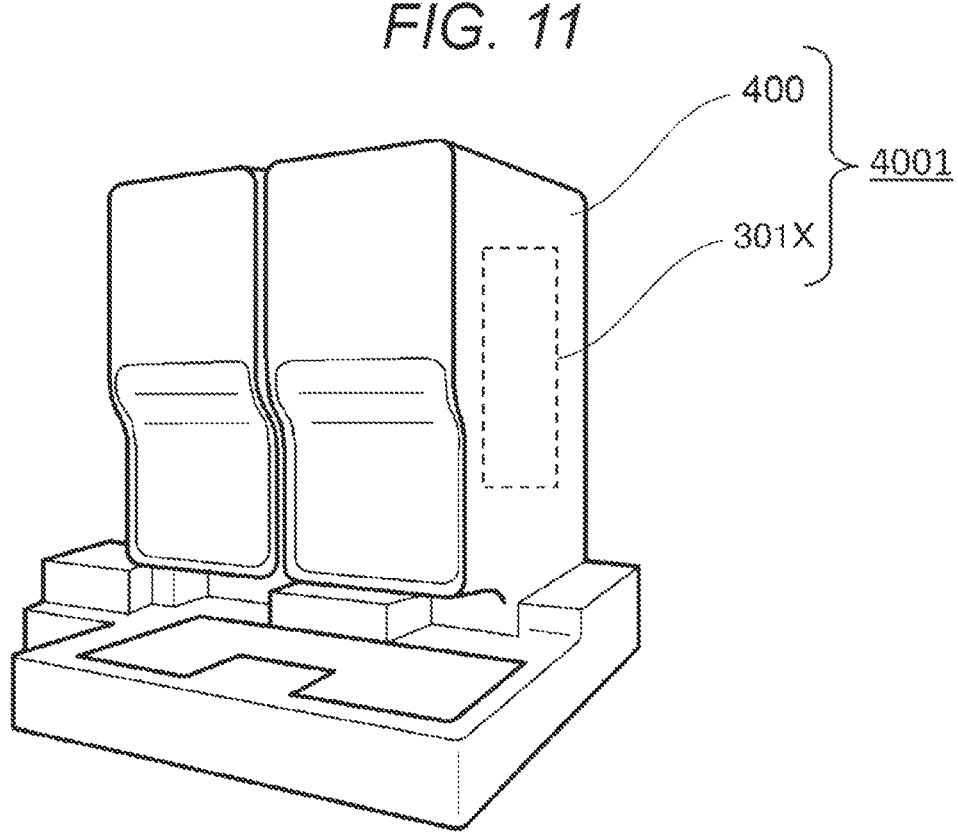
FIG. 11 is a perspective view showing another configuration example of the analysis system in the second embodiment of the present invention.

FIG. 11 is a perspective view showing another configuration example of the analysis system 4000. In the configuration examples shown in FIGS. 1 to 10, the analysis system 4000 in which the measurement unit 400 and the analysis unit 300X are provided as separate bodies has been exemplified. However, as shown in FIG. 11, the analysis system 4001 may be one in which the analysis section 300X is provided in the measurement unit 400. According to this configuration, the entire analysis system 4001 is compact.

Figure 12:
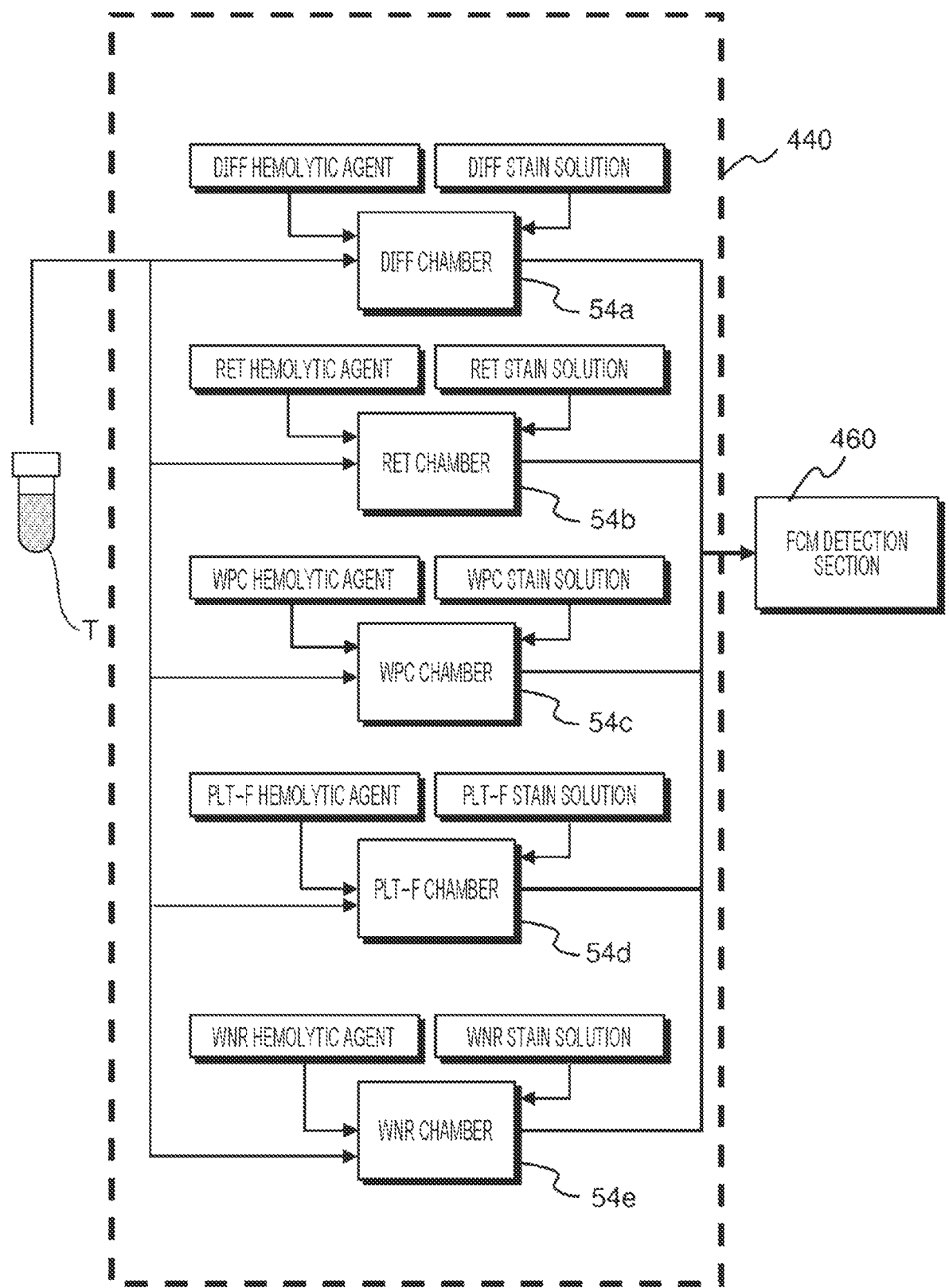
FIG. 12 is a block diagram showing a configuration of another example of the measurement unit in the second embodiment of the present invention.

FIG. 12 is a block diagram showing a configuration of another example of the measurement unit. The examples of FIGS. 2, 5, and 6 show examples in which there is one measurement system (also referred to as a measurement channel) that can be measured by the FCM detection section 460 has been shown. The configuration example of FIG. 12 shows an example in which five measurement channels are provided.

The first sample preparation section 440A includes five chambers 54a to 54e. The chambers 54a to 54e are used in measurement channels of DIFF, RET, WPC, PLT-F, and WNR, respectively. To each of the chambers 54a to 54e, a hemolytic agent container containing a hemolytic agent which is a reagent and a stain solution container containing a stain solution corresponding to each measurement channel can be fed through flow paths. One chamber and a hemolytic agent container and a stain solution container provided in the chamber so as to be capable of feeding liquid constitute one measurement channel. For example, the DIFF measurement channel includes a hemolytic agent container containing a DIFF hemolytic agent which is a reagent for DIFF measurement, a stain solution container containing a DIFF stain solution, and the DIFF chamber 54a connected to these containers through the flow paths. The other measurement channels are similarly configured. Here, a case where one measurement channel is configured to supply both one hemolytic agent and one stain solution to the chamber is exemplified, but the present invention is not limited to this configuration. For example, a plurality of measurement channels may be configured to supply both one hemolytic agent and one stain solution to different plurality of chambers. In other words, one reagent (one hemolytic agent and one stain solution) may be shared by the plurality of measurement channels, and for example, two of the five measurement channels may be DIFF measurement channels. One measurement channel may be provided, or for example, only two DIFF measurement channels may be provided.

The specimen suction mechanism 450 (see FIGS. 2, 4, and 5) sucks a blood specimen from the specimen container T containing the blood specimen. The specimen suction mechanism 450 moves the sucked blood specimen to an upper position in the chamber of the measurement channel corresponding to the order among the chambers 54a to 54e by horizontal/vertical movement by the device mechanism section 455 (see FIG. 4). The specimen suction mechanism 450 discharges the sucked blood specimen into the chamber. The sample preparation section 440 prepares a measurement sample by supplying the corresponding hemolytic agent and stain solution to the chamber from which the blood specimen is discharged, and mixing the blood specimen, the hemolytic agent, and the stain solution in the chamber. The prepared measurement sample is supplied from the chamber to the FCM detection section 460 through the flow paths, and the cells are measured by flow cytometry method.

The above-described measurement channels (DIFF, RET, WPC, PLT-F, WNR) correspond to measurement items included in the measurement order. For example, DIFF corresponds to a measurement item related to classification of white blood cells. RET corresponds to a measurement item related to reticulocyte. WPC corresponds to a measurement item related to measurement of abnormal white blood cells. PLT-F corresponds to a measurement item related to optical measurement of platelets. WNR corresponds to a measurement item related to white blood cells and nucleated red blood cells. The above-described measurement channels (DIFF, RET, WPC, PLT-F, WNR) are measured by the FCM detection section 460.

Figure 13:
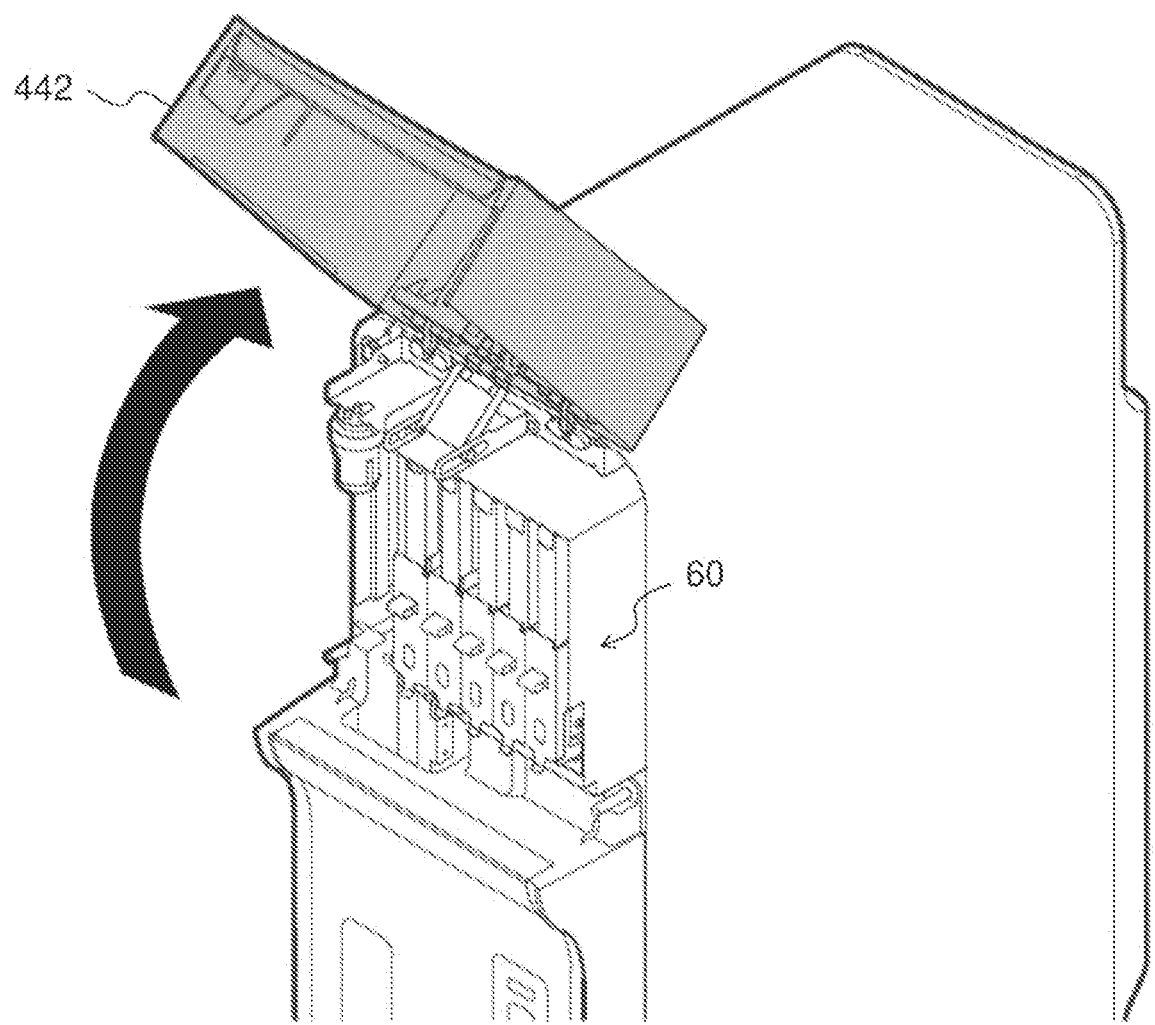
FIG. 13 is a view showing a state in which a cover of the measurement unit in the second embodiment of the present invention is opened.
Figure 14:
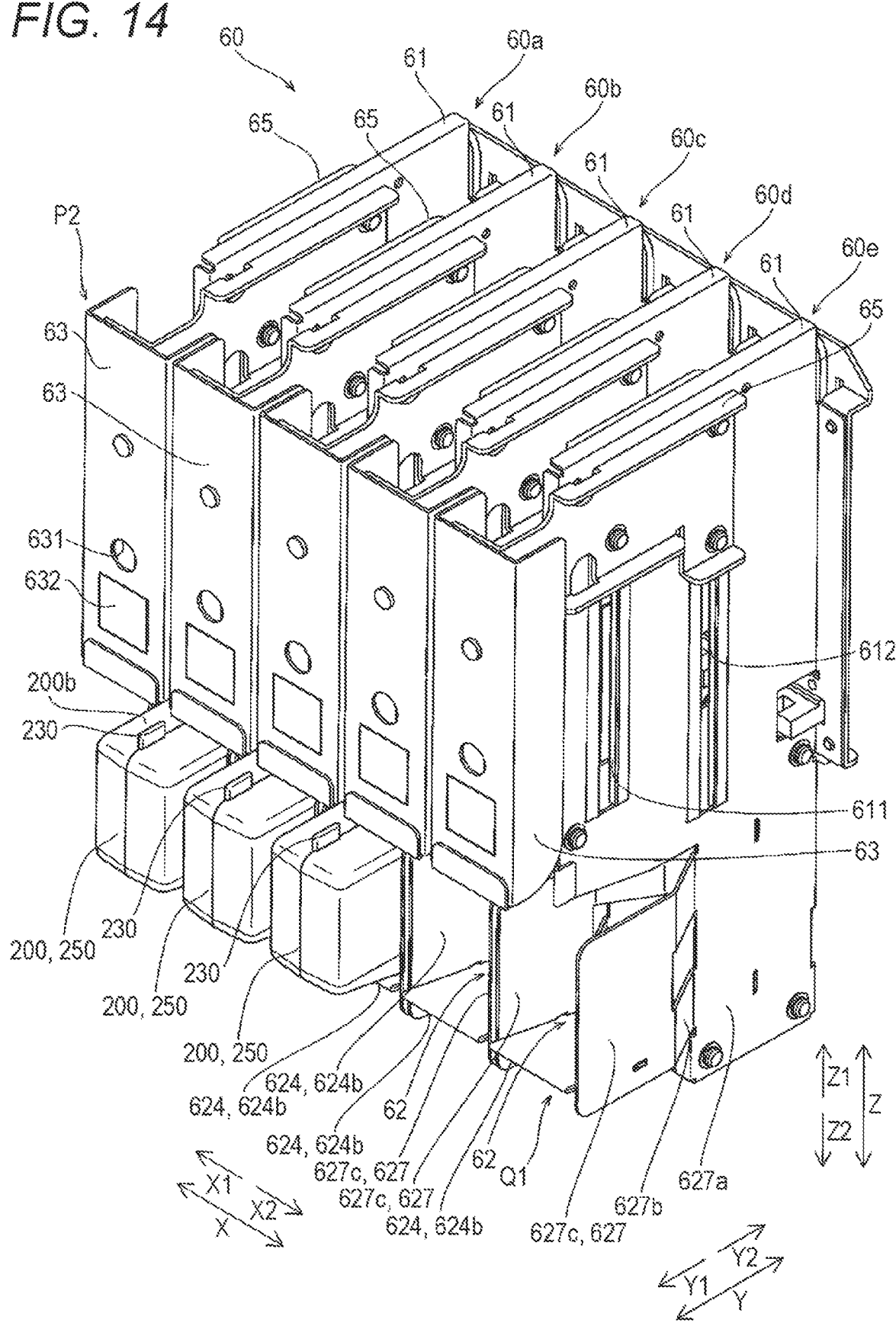
FIG. 14 is a perspective view showing a reagent container holder of the measurement unit in the second embodiment of the present invention.
Figure 15:
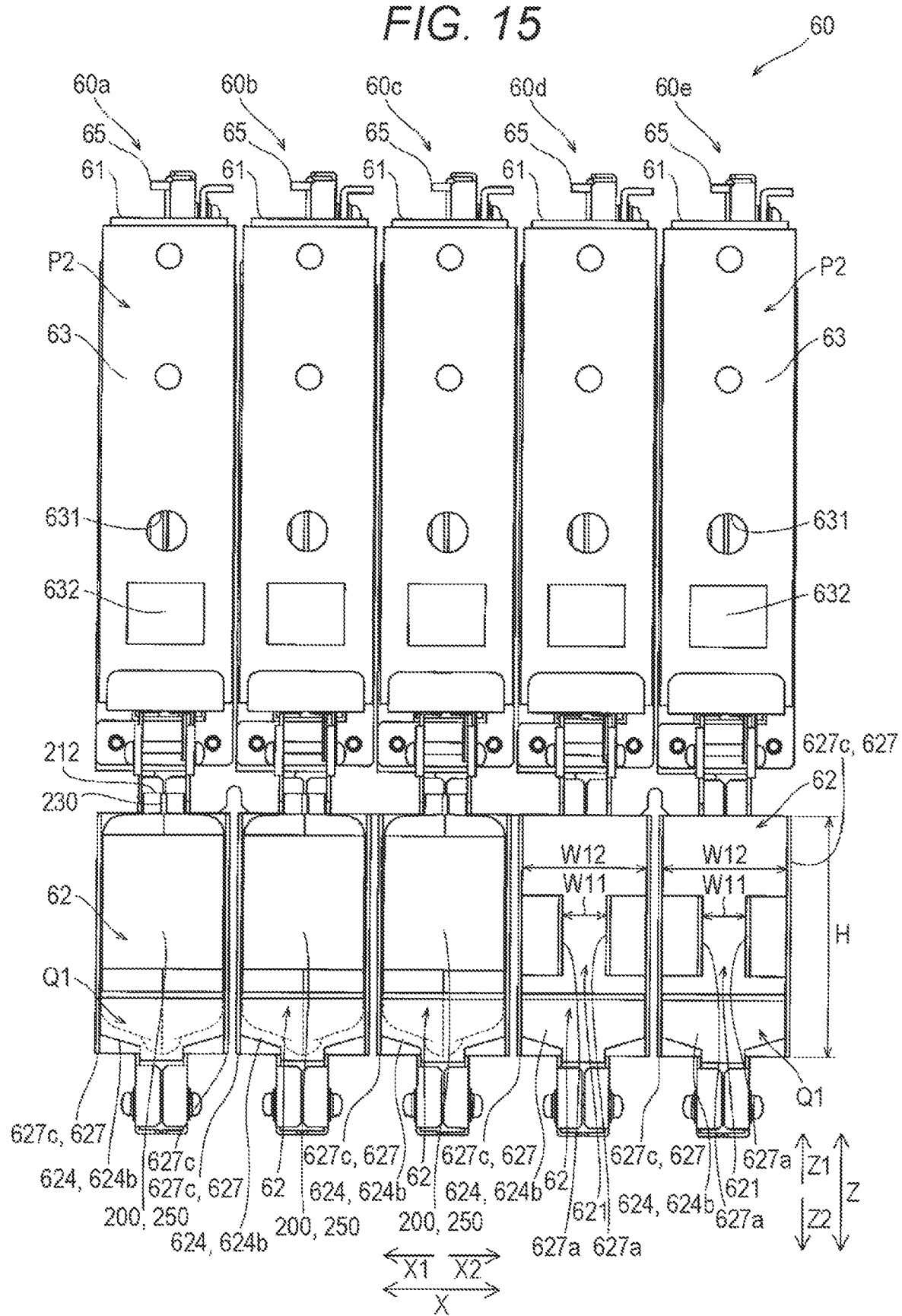
FIG. 15 is a front view showing the reagent container holder shown in FIG. 14.

FIG. 13 is a view showing a state in which a cover 442 of the measurement unit 40 is opened. FIG. 14 is a perspective view showing the reagent container holder 60 of the measurement unit 400, and FIG. 15 is a front view showing the reagent container holder 60 shown in FIG. 14. An openable and closable front cover 442 is provided on the front side of the measurement unit 400 (see FIG. 1) of the analysis system 4000 (see FIG. 13). The reagent container holder 60 is disposed at the upper portion of the front surface of the measurement unit 400, and as shown in FIG. 13, by opening the cover 442, the reagent container holder 60 is exposed, which can be accessed by the user. That is, the user can install the reagent container 200 in the reagent container holder 60 and take out the reagent container 200 from the reagent container holder 60.

As shown in FIGS. 14 and 15, the reagent container holder 60 includes five holder portions 60a, 60b, 60c, 60d, and 60e, and the reagent container holder 60 is configured to hold a total of five (five types of) reagent containers 200 (or 300). The reagent containers 200 (or 300) held by the reagent container holder 60 contain different types of reagents (stain solutions) for measuring a plurality of measurement items by the FCM detection section 460. The color of the reagent container is, for example, black. As the reagent containers, a large-sized (about 100 mL) reagent container 200 (see FIG. 22) and a small-sized (about 20 mL) reagent container 300 (see FIG. 25) are used according to the type of reagent. The volume of the reagent container is not limited to the above, and may be, for example, less than 20 mL, less than 100 mL, or more than 100 mL. For example, the volume of the reagent container may be about 10 mL, about 40 mL, about 80 mL, or about 300 mL. Each of the holder portions 60a to 60e is configured, for example, to be able to hold either the reagent container 200 or 300. Therefore, the five holder portions 60a to 60e have the same configuration, and for example, a large-sized reagent container 200 can be set in the three holder portions 60a to 60c, and a small-sized reagent container 300 can be set in the two holder portions 60d and 60e. Each of the holder portions 60a to 60e includes a chassis 61, a reagent container holding portion 62, a cover 63 for opening and closing the reagent container holding portion 62, the above-described suction tube 64, and a suction tube lifting mechanism 65.

Figure 16:
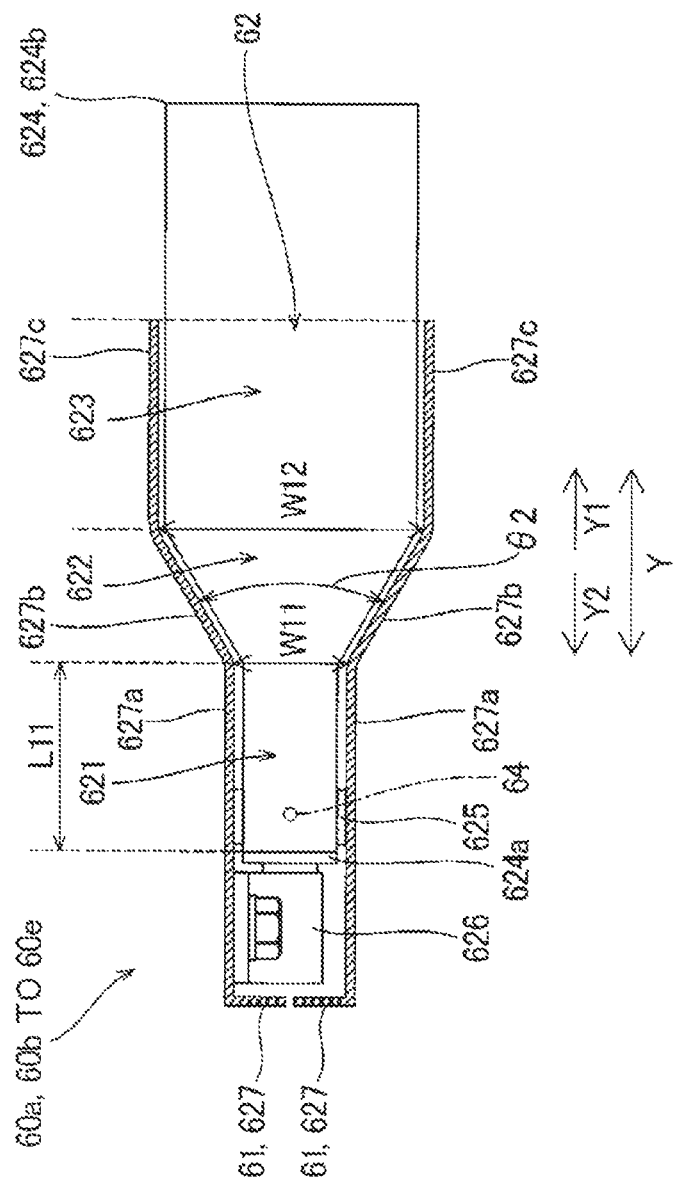
FIG. 16 is a schematic view for explaining a reagent container holding portion of the reagent container holder shown in FIG. 14.
Figure 17:
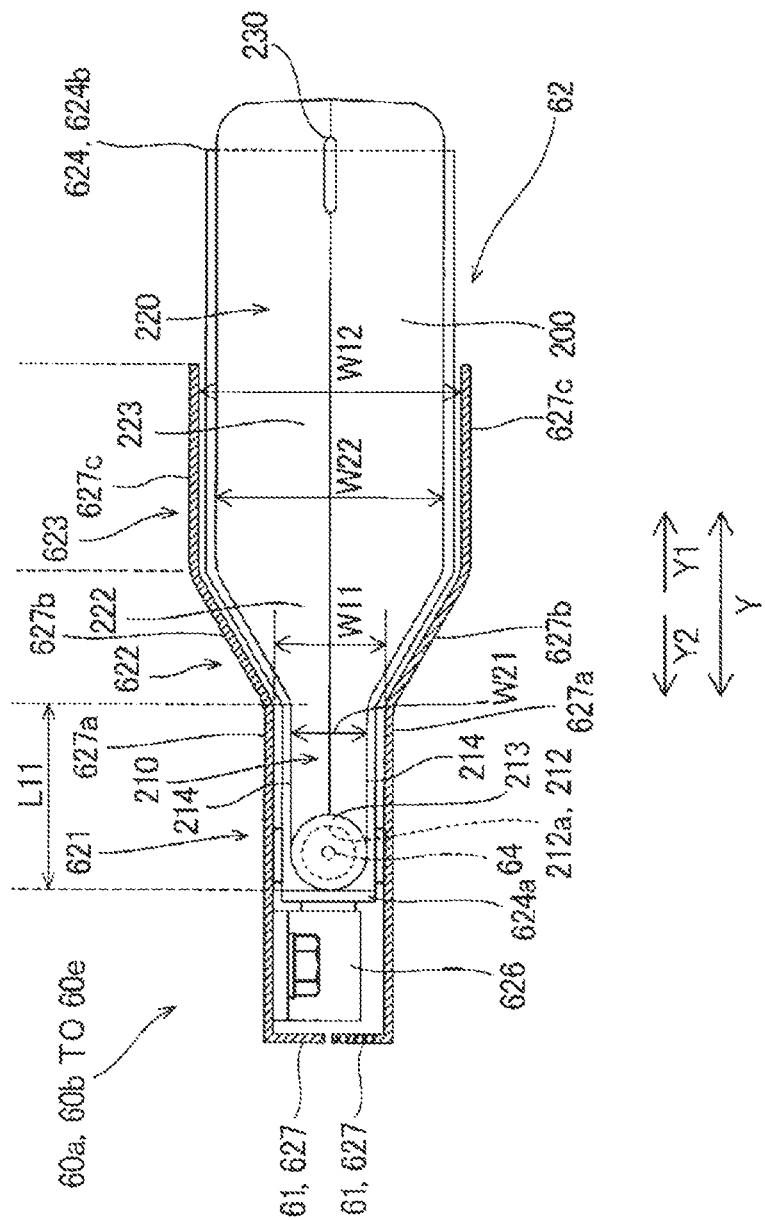
FIG. 17 is a schematic view showing a state in which a reagent container is placed on the reagent container holding portion shown in FIG. 14.

The reagent container holding portion 62 is provided in a lower portion (see FIGS. 14 and 15) of the chassis 61. The reagent container holding portion 62 includes a first receiving part 621 having a height H as shown in FIG. 15, and a width W11 as shown in FIG. 16, an intermediate receiving part 622 which is continuous with the first receiving part 621 and expands from the first receiving part 621 at a predetermined angle θ2, and a second receiving part 623 which is continuous with the intermediate receiving part 622. As shown in FIGS. 16 and 17, the first receiving part 621 can receive a first storage portion 210 (310) described later of the reagent container 200 (300), and the first receiving part 621 has a width (width W11) that prohibits entry of a user's finger. The finger means, for example, an adult finger having an average thickness, and for example, the width W11 is 10 mM. The second receiving part 623 has a width W12 larger than the width W11. As shown in FIGS. 16 and 17, the first receiving part 621 is disposed on the innermost side (arrow Y2 direction side) of the reagent container holding portion 62. The reagent container 200 (300) is inserted toward the inner side of the reagent container holding portion 62 from an entry portion 212 (312) side described later of the first storage portion 210 (310). Therefore, the reagent container holding portion 62 is configured to hold the reagent container 200 (300) in a state where the entry portion 212 (312) of the reagent container 200 (300) is inserted so as to be on the innermost side (arrow Y2 direction side).

Figure 18:
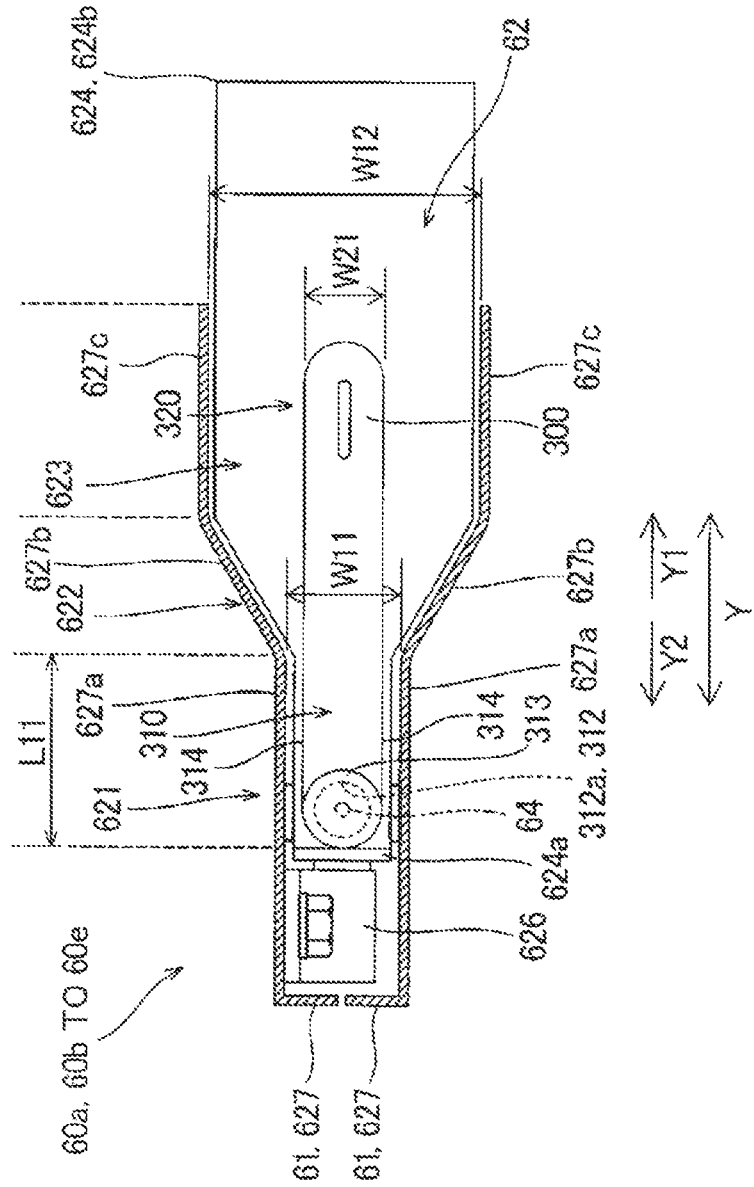
FIG. 18 is a schematic view showing a state in which a reagent container is placed on the reagent container holding portion shown in FIG. 14.

As shown in FIGS. 16 to 18, the reagent container holding portion 62 includes a pair of guide members 627 that guides both side surfaces 214 (314) of the first storage portion 210 (310) of the reagent container 200 (300) to guide the reagent container 200 (300) to the first receiving part 621. The guide member 627 includes a first guide part 627a that guides the first storage portion 210 (310) of the reagent container 200 (300) to the first receiving part 621, an intermediate guide part 627b corresponding to the intermediate receiving part 622, and a second guide part 627c that guides a second storage portion 220 (320) described later of the reagent container 200 (300) to the second receiving part 623. The guide member 627 is formed by a part (both inner side surfaces) of the chassis 61. The first receiving part 621, the intermediate receiving part 622 and the second receiving part 623 are formed by a space between a pair of corresponding first guide parts 627a, a space between a pair of corresponding intermediate guide parts 627b, and a space between a pair of corresponding second guide parts 627c, respectively. Therefore, the width W11 of the first receiving part 621 is equal to the width between the pair of first guide parts 627a, and the width W12 of the second receiving part 623 is equal to the width between the pair of second guide parts 627c.

Figure 24:
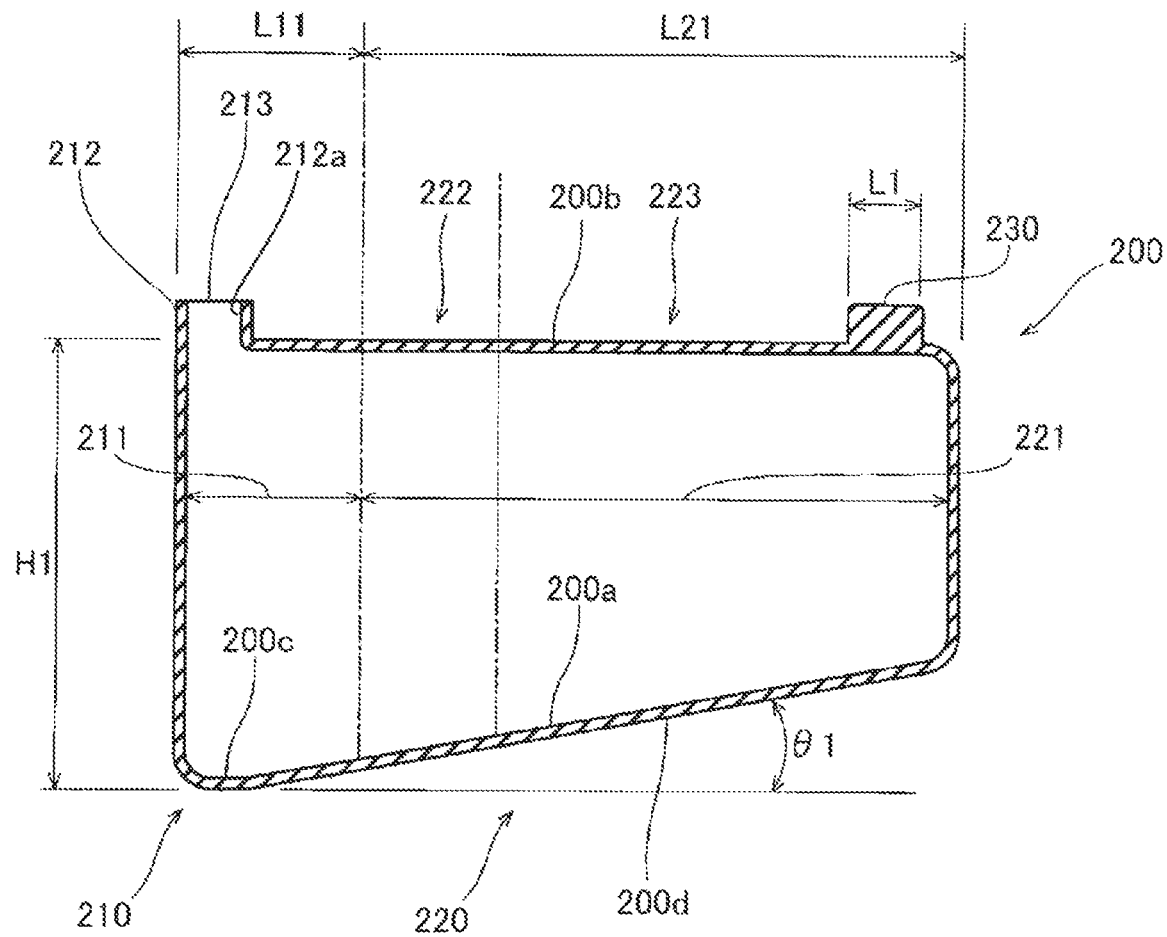
FIG. 24 is a longitudinal sectional view showing the large-sized reagent container according to the second embodiment of the present invention.
Figure 27:
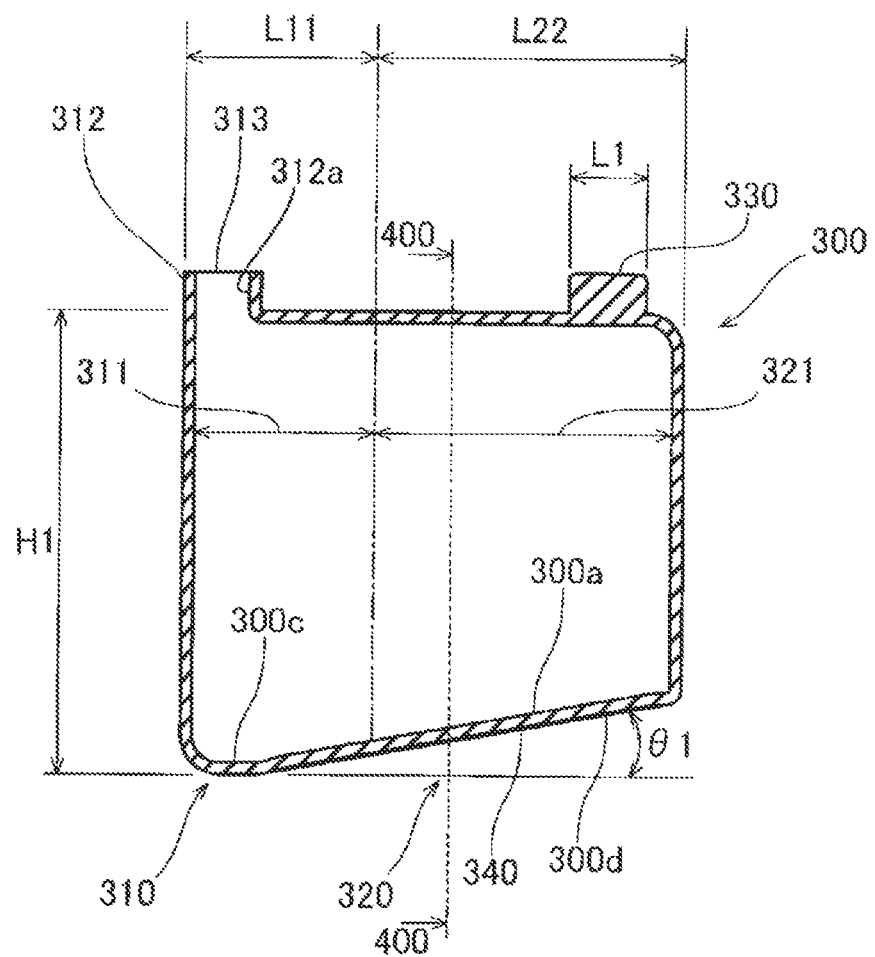
FIG. 27 is a longitudinal sectional view showing the small-sized reagent container according to the second embodiment of the present invention.

The pair of guide members 627 has a height H (see FIG. 15) substantially equal to height H1 (see FIGS. 24 and 27) of the both side surfaces 214 (314) of the first storage portion 210 (310) of the reagent container 200 (300). The pair of guide members 627 is configured to be able to guide from a lower end to an upper end of both side surfaces 214 (314) of the first storage portion 210 (310) of the reagent container 200 (300). The pair of guide members 627 has a shape reflecting the outer shape of the first storage portion 210 (310). The pair of guide members 627 is configured to be able to guide the entire both side surfaces 214 (314) of the first storage portion 210 (310) of the reagent container 200 (300). The intermediate guide part 627b and the second guide part 627c have shapes reflecting the outer shape of the large-sized reagent container 200. The intermediate guide part 627b and the second guide part 627c are configured to be able to guide both side surfaces of a half of the tip side (first storage portion 210 side) of the second storage portion 220. The second storage portion 220 of the large-sized reagent container 200 has a width W22 larger than a width W21 of the first storage portion 210, and the first guide part 627a is provided with the width W11 smaller than the width W22 of the second storage portion 220.

As shown in FIG. 18, the reagent container holding portion 62 includes a support part 624 that supports the reagent container 200 (300), and a rotation mechanism 625 that rotatably supports the support part 624. The support part 624 is a plate-shaped member integrally including a front side part 624a abutting on a front surface (tip surface) of the first storage portion 210 (310), see FIGS. 16 and 17) of the reagent container 200 (300) and a lower side part 624b abutting on a lower surface of the reagent container 200 (300). That is, the support part 624 is formed to have a shape corresponding to the shape of the reagent container 200 (300). The rotation mechanism 625 is configured such that a projection 624c provided on the support part 624 is inserted into annular bearing 625a provided on the inner surface of chassis 61, whereby the support part 624 can be rotated with the position of the projection 624c (bearing 625a) as a rotation center.

A locking portion 626 that locks the rotating support part 624 by abutting on the front side part 624a of the support part 624 is provided inside the chassis 61. The locking portion 626 is provided with a magnet, and the locking portion 626 is configured to hold the front side part 624a (support part 624) in a state of abutting on the front side part 624a of the support part 624. Accordingly, the support part 624 is configured to move to a placement position P1 (see FIG. 19) where the lower side part 624b is horizontal (the lower surface of the reagent container 200 (300) is horizontal) and a set position Q1 (see FIG. 20) where the front side part 624a is vertical. As shown in FIG. 20, the entry portion 212 (312) (see FIGS. 16 and 17) described later of the reagent container 200 (300) is configured to be horizontal (orthogonal to the suction tube 64) in a state where the reagent container 200 (300) is disposed at the set position Q1.

Figure 19:
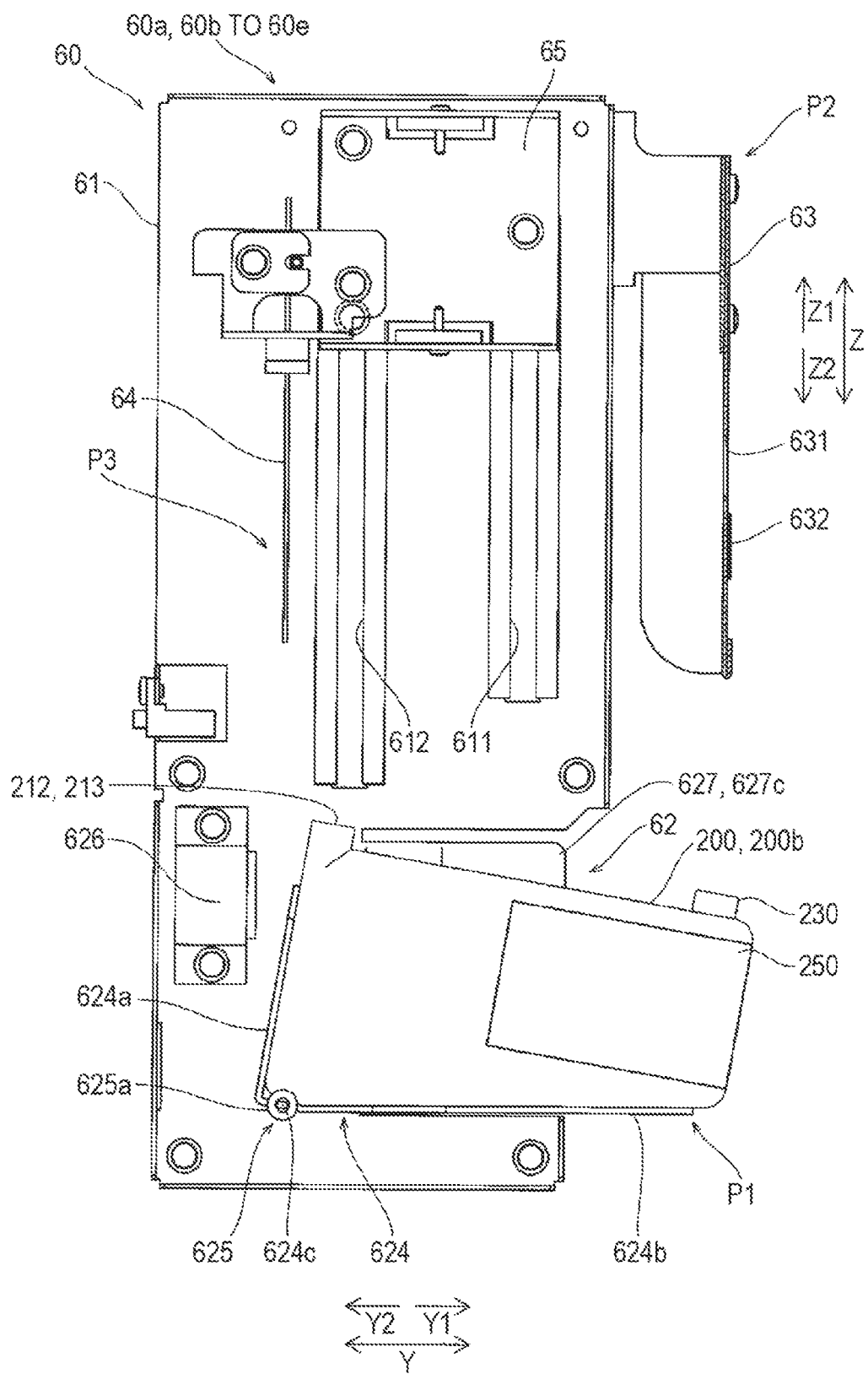
FIG. 19 is a longitudinal sectional view schematically showing an internal configuration of the reagent container holder shown in FIG. 14.
Figure 20:
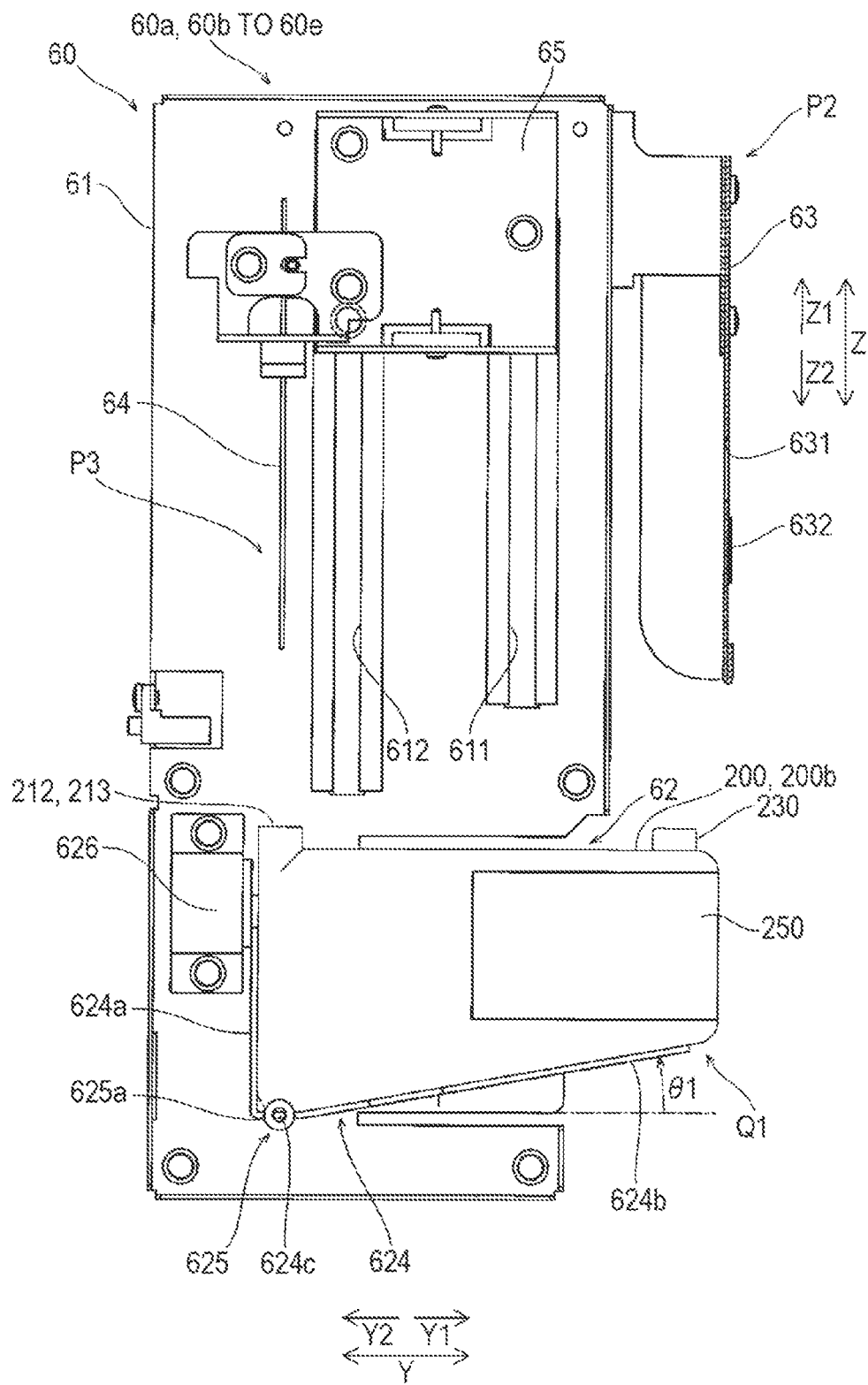
FIG. 20 is a view for explaining a set state of a reagent container in the longitudinal sectional view of the reagent container holder shown in FIG. 19.

As shown in FIG. 19, the cover 63 is disposed so as to protrude from each of the holder portions 60a to 60e (chassis 61) toward the front side (arrow Y1 direction side), and the cover 63 is attached to the suction tube lifting mechanism 65. With the suction tube lifting mechanism 65, the cover 63 is configured to be movable to a raised position P2 (see FIG. 19) at which the reagent container holding portion 62 is opened and a lowered position Q2 (see FIG. 21) at which the reagent container holding portion 62 is covered (closed). Therefore, the cover 63 is configured to allow the reagent container 200 (300) to be taken in and out at the raised position P2 and prohibit the reagent container 200 (300) to be taken in and out at the lowered position Q2.

Figure 21:
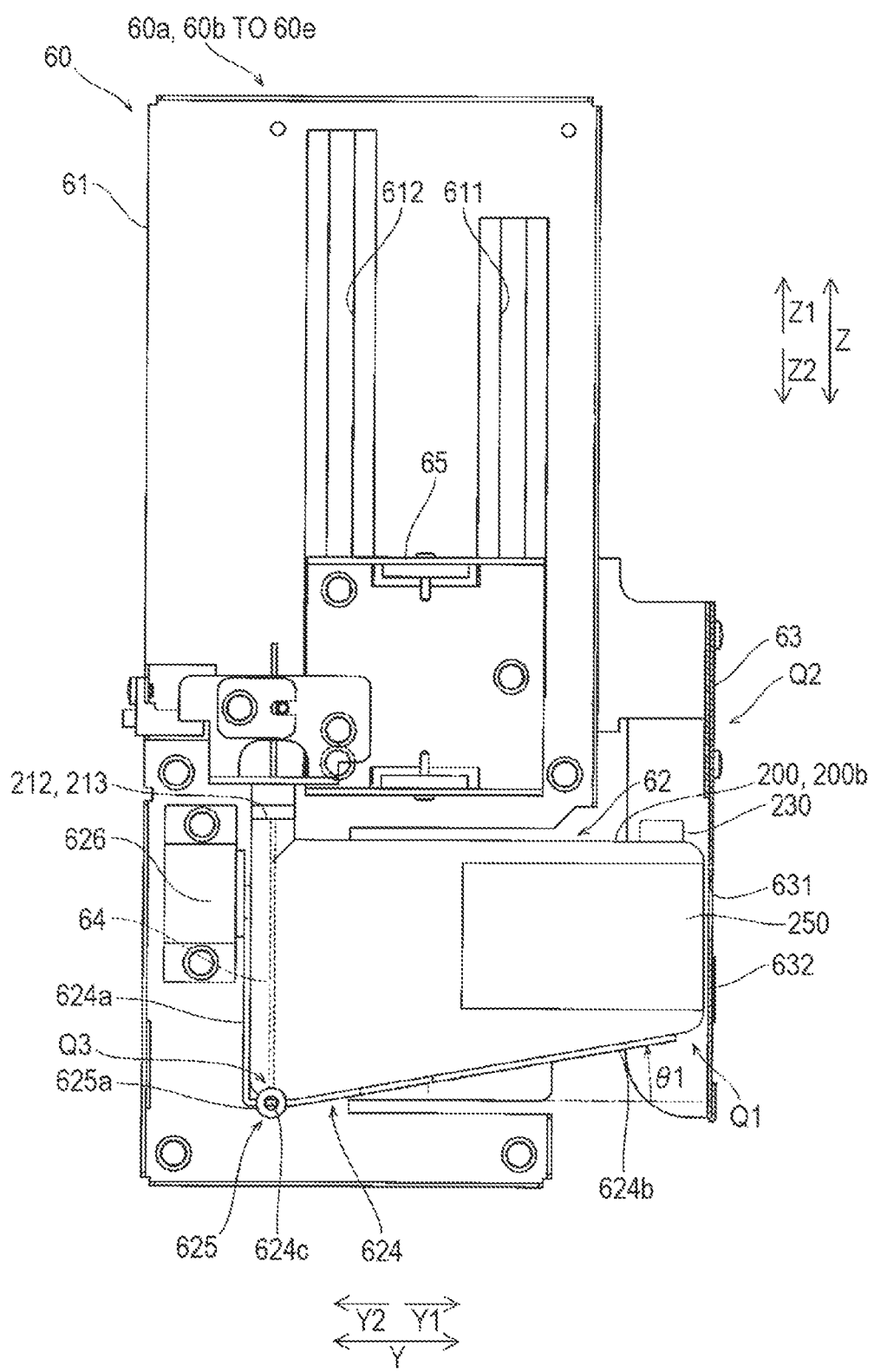
FIG. 21 is a view for explaining a state in which the cover is lowered in the longitudinal sectional view of the reagent container holder shown in FIG. 20.

As shown in FIG. 15, a window portion 631 including an opening is provided at a predetermined position of the cover 63. As shown in FIG. 21, it is configured so that, in a state where the cover 63 is located at the lowered position Q2 that covers (closes) the reagent container holding portion 62, the user can visually recognize a label 250 (350, see FIG. 25) attached to the reagent container 200 (300) through the window portion 631. A label for identifying the type (type of reagent) of the reagent container 200 (300) is printed at a position visible through the window portion 631 of the label 250 (350). A label 632 on which a label for identifying the type (type of reagent) of the reagent container 200 (300) set in the reagent container holding portion 62 is printed is attached to the cover 63. That is, since the reagent containers 200 (300) each containing a predetermined type of reagent are set in the five holder portions 60a to 60e, the label 632 for identifying the type of reagent to be set is attached to the cover 63 of each of the holder portions 60a to 60e correspondingly. Accordingly, it is configured so that, in a state where the reagent container 200 (300) is set in the reagent container holding portion 62 (in a state where the cover 63 is lowered to the lowered position Q2), whether the correct reagent is set in each of the holder portions 60a to 60e can be confirmed from the label 632 attached to the cover 63 and the label 250 (350) visually recognized through the window portion 631.

As shown in FIGS. 16 and 20, the suction tube 64 is disposed at an upper position in the inner part (arrow Y2 direction side) of the first receiving part 621 of the reagent container holding portion 62. It is configured so that the suction tube 64 is moved in the vertical direction (Z direction) by the suction tube lifting mechanism 65 that holds the suction tube 64. As a result, the suction tube 64 is configured to enter the first storage portion 210 (310) via the entry portion 212 (312) of the reagent container 200 (300) inserted into the inner side of the reagent container holding portion 62 so that the suction tube 64 can suck the reagent inside the reagent container 200 (300). The suction tube 64 is formed such that a tip thereof can penetrate (puncture) a seal member 213 (313) for sealing an opening portion 212a (312a) (see FIGS. 17 and 18) formed in the entry portion 212 (312) of the reagent container 200 (300). As described with reference to FIGS. 2, 5, and 6, the suction tube 64 constitutes one end of the liquid feeding tube 431, and the upper end of the suction tube 64 is connected to the flow path (not shown in FIGS. 19 to 21) leading to the liquid feeding section 430 and the chamber 420.

As shown in FIGS. 19 and 20, the suction tube lifting mechanism 65 is configured to hold the suction tube 26 and the cover 63. The suction tube lifting mechanism 65 is engaged with grooves 611 and 612 provided in the chassis 61 so as to be movable in the vertical direction (Z direction). Thus, the suction tube lifting mechanism 65 is configured to integrally move the suction tube 26 in the vertical direction (Z direction) in conjunction with opening and closing (lifting and lowering movement) of the cover 63. As shown in FIG. 19, in a state where the cover 63 is disposed at the raised position P2, the suction tube 26 is disposed at the raised position P3 above the reagent container holding portion 62 (outside of the reagent container 200 (300) and the first receiving part 621). As shown in FIG. 21, in a state where the cover 63 is disposed at the lowered position Q2, the suction tube 26 is disposed at the lowered position Q3 close to the inner bottom portion immediately below the entry portion 212 (312) of the reagent container 200 (300).

The tip of the suction tube 26 inserted into the reagent container is a first end of the liquid feeding tube. The first end of the suction tube 26 is fixed to the above-described lowered position Q3 while the reagent container is disposed in the device. That is, while the measurement of a plurality of specimens is performed using the reagent in the reagent container, the first end of the suction tube 26 is fixed to the lowered position Q3.

Figure 22:
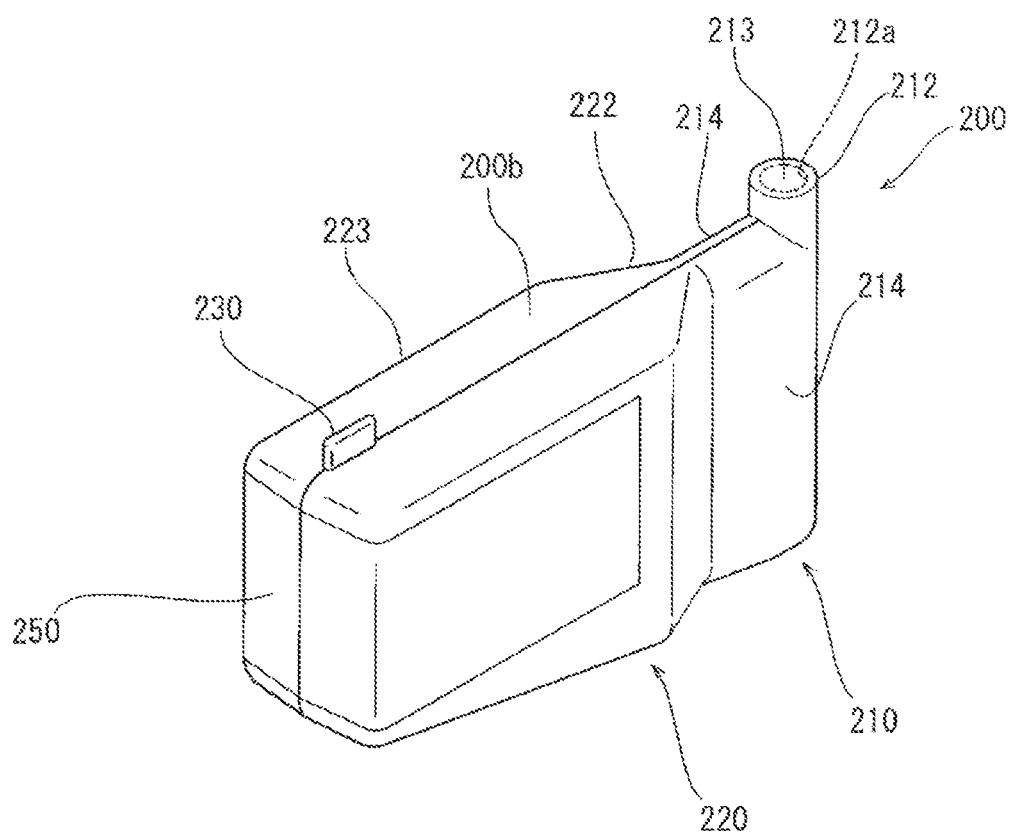
FIG. 22 is a perspective view showing a large-sized reagent container according to the second embodiment of the present invention.
Figure 23:
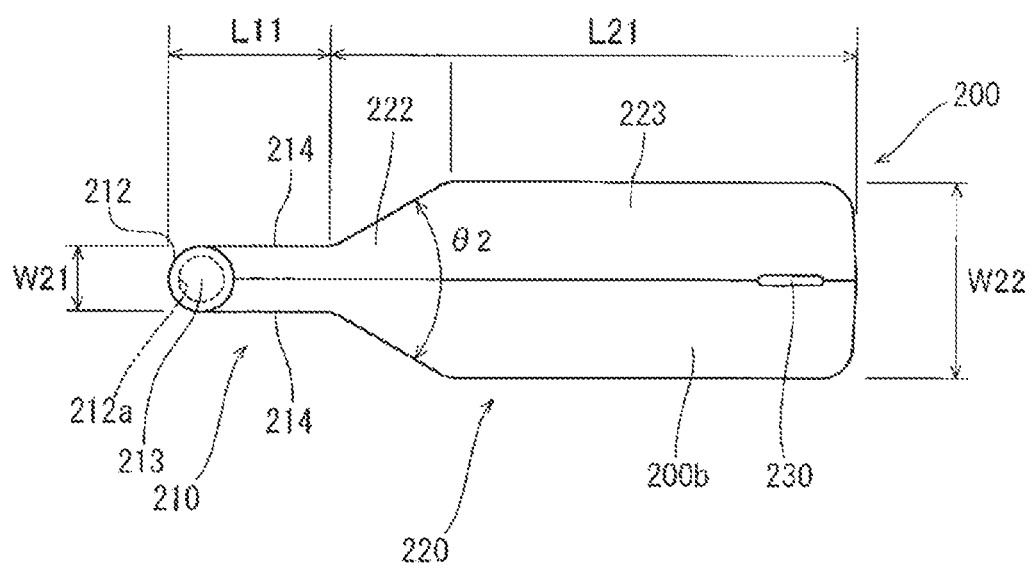
FIG. 23 is a top view showing the large-sized reagent container according to the second embodiment of the present invention.
Figure 25:
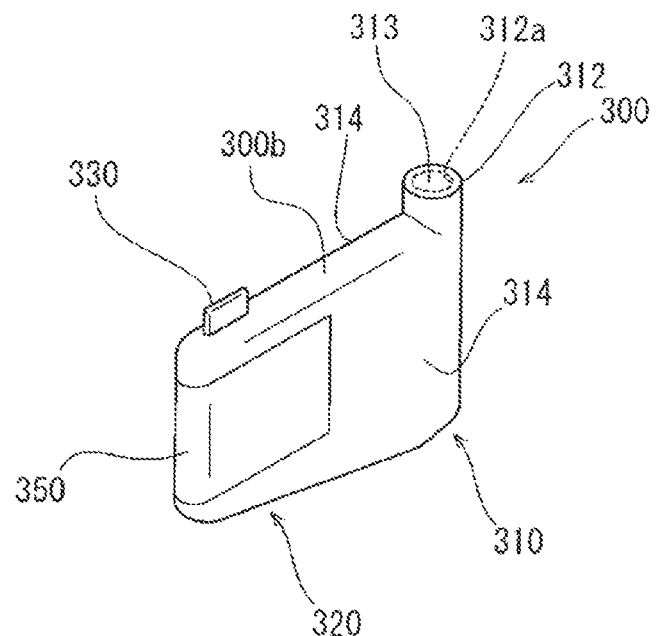
FIG. 25 is a perspective view showing a small-sized reagent container according to the second embodiment of the present invention.
Figure 26:
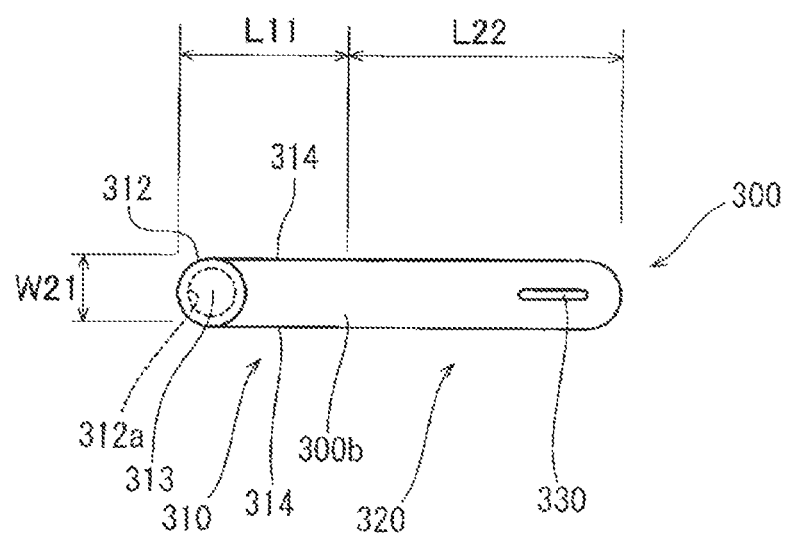
FIG. 26 is a top view showing the small-sized reagent container according to the second embodiment of the present invention.

As shown in FIGS. 22 and 25, the large-sized (volume of about 100 mL) reagent container 200 and the small-sized (volume of about 20 mL) reagent container 300 are configured to be used corresponding to the type of reagent to be contained. Each of the reagent containers 200 and 300 integrally includes the first storage portion 210 (310) provided with the entry portion 212 (312) into which the suction tube 26 can enter at an upper portion, and the second storage portion 220 (320) continuous with the first storage portion 210 (310). As shown in FIGS. 17 and 18, the first storage portion 210 (310) is configured to be disposed inside the first receiving part 621 in a state where the reagent container 200 (300) is set in the reagent container holding portion 62. As shown in FIGS. 17 and 18, the second storage portion 220 (320) is configured to be disposed outside of the first receiving part 621 in a state where the reagent container 200 (300) is set in the reagent container holding portion 62. As shown in FIGS. 23 and 26, a first reagent storage space 211 (311) is provided inside each of the first storage portions 210 (310), and a second reagent storage space 221 (321) continuous with the first reagent storage space 211 (311) is provided inside each of the second storage portions 220 (320).

The first storage portion 210 (310) is a portion having a length L11, and these shapes are substantially common to the reagent containers 200 and 300. Since the shapes of the first storage portions 210 and 310 are substantially the same, the reagent containers 200 and 300 can be set to the reagent container holding portions 62 (first receiving parts 621) of the holder portions 60a to 60e having the same shape.

Specifically, as shown in FIGS. 17 and 18, each of the first storage portions 210 (310) has a constant width W21 slightly smaller than the width W11 of the first receiving part 621. In the first storage portions 210 (310), the entry portion 212 (312) is provided at an end on the front side (direction in which the first storage portion 210 (310) is inserted into the reagent container holding portion 62, arrow Y2 direction in FIGS. 17 and 18). Therefore, the reagent container 200 (300) is configured to be inserted from the entry portion 212 (312) side of the first storage portion 210 (310) toward the inner side of the reagent container holding portion 62. As shown in FIGS. 23 and 26, the entry portion 212 (312) is provided so as to protrude upward from an outer upper surface 200b (300b). As shown in FIGS. 22 and 25, the protruding entry portion 212 (312) is formed with the opening portion 212a (312a) communicating with the inside of the first storage portion 210 (310). The seal member 213 (313) made of aluminum foil or the like is provided in the entry portion 212 (312) so as to close the opening portion 212a (312a) so that the reagent container 200 (300) is sealed. The outer diameter of the entry portion 212 (312) is equal to the width W21 of the first storage portion 210 (310), and the entry portion 212 (312) is formed to continuously (flush) protrude from the front surface of the first storage portion 210 (310).

As shown in FIGS. 23 and 26, the reagent container 200 (300) is configured such that an inner bottom surface 200a (300a) is not parallel to the outer upper surface 200b (300b), and the distance between the inner bottom surface 200a (300a) and the outer upper surface 200b (300b) increases as approaching the entry portion 212 (312). In the second embodiment, the inner bottom surface 200a (300a) is configured to be an inclined surface inclined at an angle θ1 (about 10 degrees) with respect to the outer upper surface 200b (300b). A bottom portion 200c (300c) substantially parallel to the outer upper surface 200b (300b) exists on a bottom surface portion immediately below the entry portion 212 (312) of the reagent container 200 (300), and an inclined surface 200d (300d) starts from an end of the bottom portion 200c (300c). As a result, the reagent container 200 (300) is configured such that the entry portion 212 (312) is located at the uppermost position and the bottom portion 200c (300c) immediately below the entry portion 212 (312) is located at the lowermost position in a state where the reagent container 200 (300) is set at the set position Q1 shown in FIG. 20.

The outer upper surface 200b (300b) of the reagent container 200 (300) is provided with a protrusion 230 (330) that protrudes upward (in a direction perpendicular to the outer upper surface 200b (300b)). The protrusion 230 (330) has a plate shape having a length L1 extending in the longitudinal direction of the reagent container 200 (300). The protrusion 230 (330) is formed to have a protrusion amount (protrusion height) substantially equal to the entry portion 212 (312). The protrusion 230 (330) is provided at a position in the vicinity of the end on the rear side (arrow Y1 direction side in FIGS. 17 and 18) of each of the second storage portion 220 (320). The protrusion 230 (330) has a function as a handle portion so that the user can easily set or detach the reagent container 200 (300).

On the other hand, the shape of the second storage portion 220 (320) is different between the reagent container 200 and the reagent container 300. As shown in FIG. 23, the second storage portion 220 of the large-sized reagent container 200 is continuous with the first storage portion 210. The second storage portion 220 integrally includes a first part 222 whose width increases with distance from the first storage portion 210, and a second part 223 having a constant width W22 larger than the width W21. Therefore, as shown in FIG. 23, in the reagent container 200, the second reagent storage space 221 inside the second storage portion 220 is a reagent storage space provided continuously over both the first part 222 and the second part 223.

As shown in FIG. 23, the first part 222 is continuous with the second part 223 so as to expand the width of the first storage portion 210 at an angle θ2 (about 60 degrees). The first part 222 connects the first storage portion 210 and the second part 223. Since the second part 223 has a width W22 larger than the width W21, the volume of the second reagent storage space 221 can be secured for about 100 mL.

As shown in FIGS. 16 and 17, the intermediate receiving part 622 of the reagent container holding portion 62 and the second receiving part 623 continuous with the intermediate receiving part 622 and having the width W12 have shapes corresponding to the first part 222 and the second part 223 having the width W22, respectively.

As shown in FIG. 26, the second storage portion 320 of the small-sized reagent container 300 has a constant width W21 that is the same as the width W21 of the first storage portion 310. That is, in the small-sized reagent container 300, the first storage portion 310 and the second storage portion 320 are formed so as to continuously extend linearly. The length L22 of the second storage portion 320 is smaller than the length L21 of the second storage portion 220 of the large-sized reagent container 200. The small-sized reagent container 300 is configured to have a reagent volume of about 20 mL in total by including the second storage portion 320 having a width W21 and a length L22 smaller than those of the second storage portion 220 of the large-sized reagent container 200.

As described above, the length L11 of the first storage portion 310 is common to the reagent containers 200 and 300 in order to be set in the first receiving part 621. Therefore, as shown in FIG. 18, for the small-sized reagent container 300 in which the first storage portion 310 and the second storage portion 320 are continuous with the same width W21, the region contained in the first receiving part 621 is the first storage portion 310, and the region disposed outside the first receiving part 621 is the second storage portion 320.

Unlike the large-sized reagent container 200, the small-sized reagent container 300 is provided with a recess 340 linearly extending along the longitudinal direction of the reagent container 300 on an inclined surface 300d of the outer bottom surface. When the inclined surface 300d is placed on a horizontal plane by the recess 340, the outer peripheral part of the recess 340 serves as a contact point in contact with the horizontal plane. Therefore, even the reagent container 300 having the small width W21 can be stably erected.

As shown in FIGS. 22 and 25, a label 250 (350) on which name of reagent to be contained, lot number of the reagent, expiration date, identification barcode and the like are printed is attached to the reagent container 200 (300). The label 250 (350) is attached over the rear surface and at least one of the lateral side surfaces of the reagent container 200 (300). A part (a portion corresponding to the rear surface of the reagent container 200 (300)) or all of the label 250 (350) is provided with a color indicating the type of reagent to be contained, so that it is configured that the type of reagent can be identified by the color displayed on the label 250 (350). It is possible to confirm whether or not the reagent container 200 (300) is set in the correct holder portions 60a to 60e depending on whether or not the colors of the label 250 (350) and the label 632 (see FIG. 15) attached to the cover 63 of the reagent container holder 60 match each other.

The reagent in the reagent container 200 (300) can be stored at a temperature of an environment where the analysis system 4002 is installed. The environmental temperature at which the analysis system 4002 is installed is, for example, a temperature in a range of 20° C. to 35° C. For example, at an environmental temperature, the reagent in the reagent container 200 (300) can be stored in the device for several months (for example, 60 days, 90 days, 120 days) in a state where performance can be guaranteed after the reagent container 200 is installed in the device and the seal member 213 of the entry portion 212 is opened. The reagent contained in the reagent container 200 (300) includes, for example, a plurality of fluorescent dyes each corresponding to light of a plurality of wavelengths emitted from the light source of the FCM detection section 460. In these fluorescent dyes, a compound itself constituting the dye stains cytoplasm, nucleic acid, and DNA of a cell. As a method for staining cells in blood, for example, immunostaining using an antibody reagent containing a labeled antibody that specifically binds to a surface antigen (for example, CD4 or CD25) of the cell is known, but such an antibody reagent needs to be cooled and stored in a refrigerator after being used for a certain period of time (for example, 8 hours). That is, the user needs to take out the antibody reagent from the device at certain time intervals, return the antibody reagent to the refrigerator, and set the antibody reagent in the device again at the time of use. In this respect, in the reagent of the present embodiment, since the compound (fluorescent dye) itself constituting the dye stains the cell and does not contain the antibody, the reagent does not need to be refrigerated and can be stored at the use environment temperature of the device. Therefore, in the present embodiment, once the reagent container is installed in the device during the period in which the performance is guaranteed, replacement is not necessary until the reagent is used up, the frequency of reagent replacement is low, and operation cost by the user is reduced.

Third Embodiment

In the present embodiment, the reagent container 200 is configured to suppress quality deterioration of a reagent containing a plurality of fluorescent dyes after being installed in the measurement unit 400, and to be continuously used for a longer period of time in a state of being attached to the measurement unit 400. One of the main means for suppressing quality degradation is to suppress contact between the reagent and air. In order to suppress contact with air, the opening of the reagent container 200 is sealed in a state where the liquid feeding tube is inserted into the reagent container 200. In order to allow feeding of the reagent by the liquid feeding tube by sealing the opening of the reagent container 200 even in a state where contact between air and the reagent is suppressed, the reagent container 200 includes a flexible bag-shaped reagent storage portion.

Storage period of the reagent is, for example, 75 days or more and 1 year or less after the reagent container 200 is installed in the measurement unit 400. The storage period is a length of a period in which measurement accuracy using a reagent by the measurement unit 400 can be guaranteed. In the present embodiment, for example, the measurement accuracy is maintained over a period of 75 days or more and 1 year or less in a state where the inside of the reagent storage portion 10 is sealed. Since deterioration of the reagent can be suppressed by sealing the reagent storage portion 10, reagent quality can be stably maintained over a longer period of time. As a result, since the replacement frequency of the reagent (reagent container 200) containing a plurality of fluorescent dyes can be reduced, a burden on the user related to a replacement operation can be reduced. The plurality of fluorescent dyes may be each contained in different reagent containers 200, or may be contained in one reagent container 200.

Figure 28A:
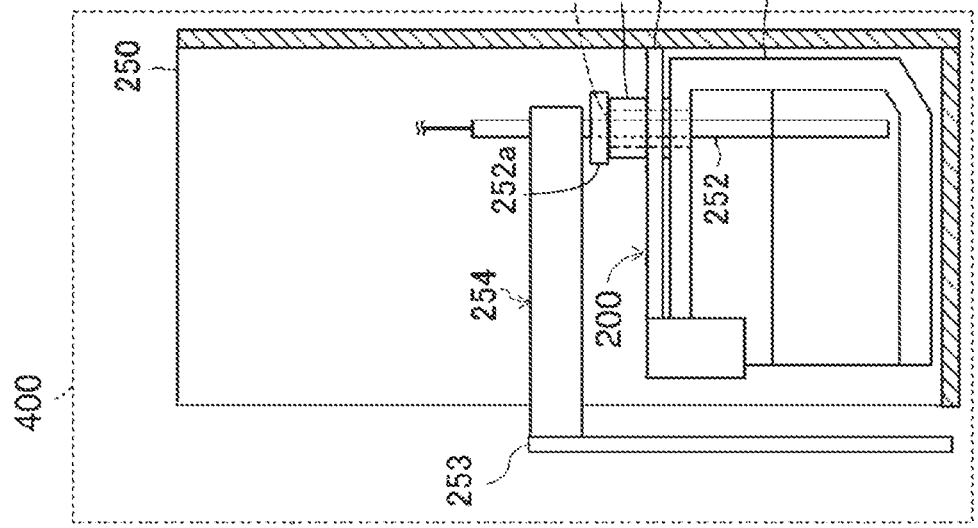
FIG. 28A is a view showing a state in which a reagent container 200 according to another embodiment of the present invention is installed in a measurement unit 400.
Figure 28B:
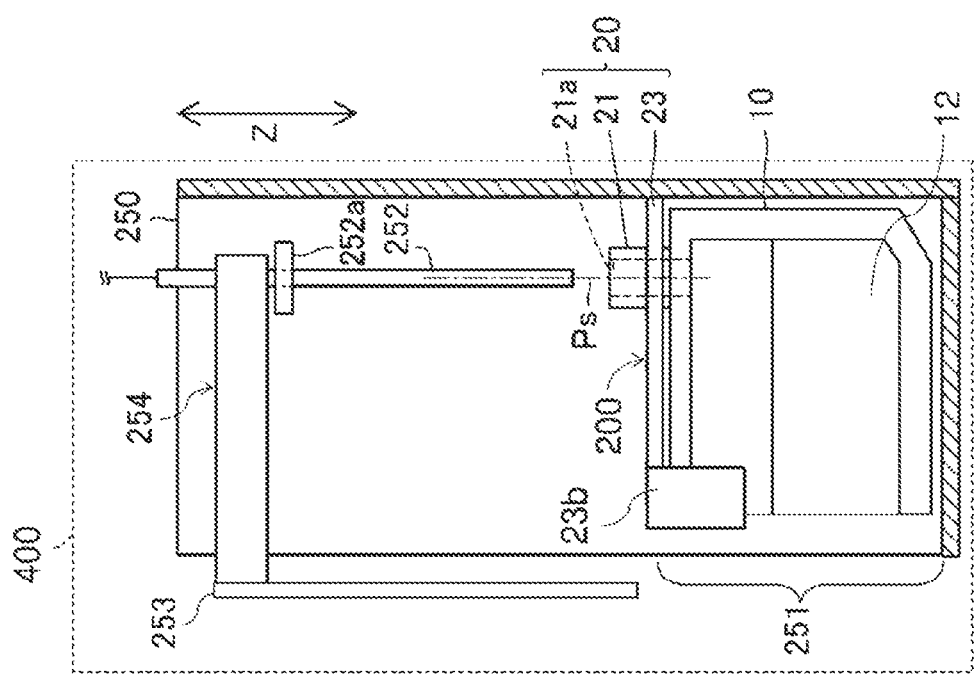
FIG. 28B is a view showing a state in which a suction tube 252 is inserted into the reagent container 200 according to another embodiment of the present invention from above.
Figure 29:
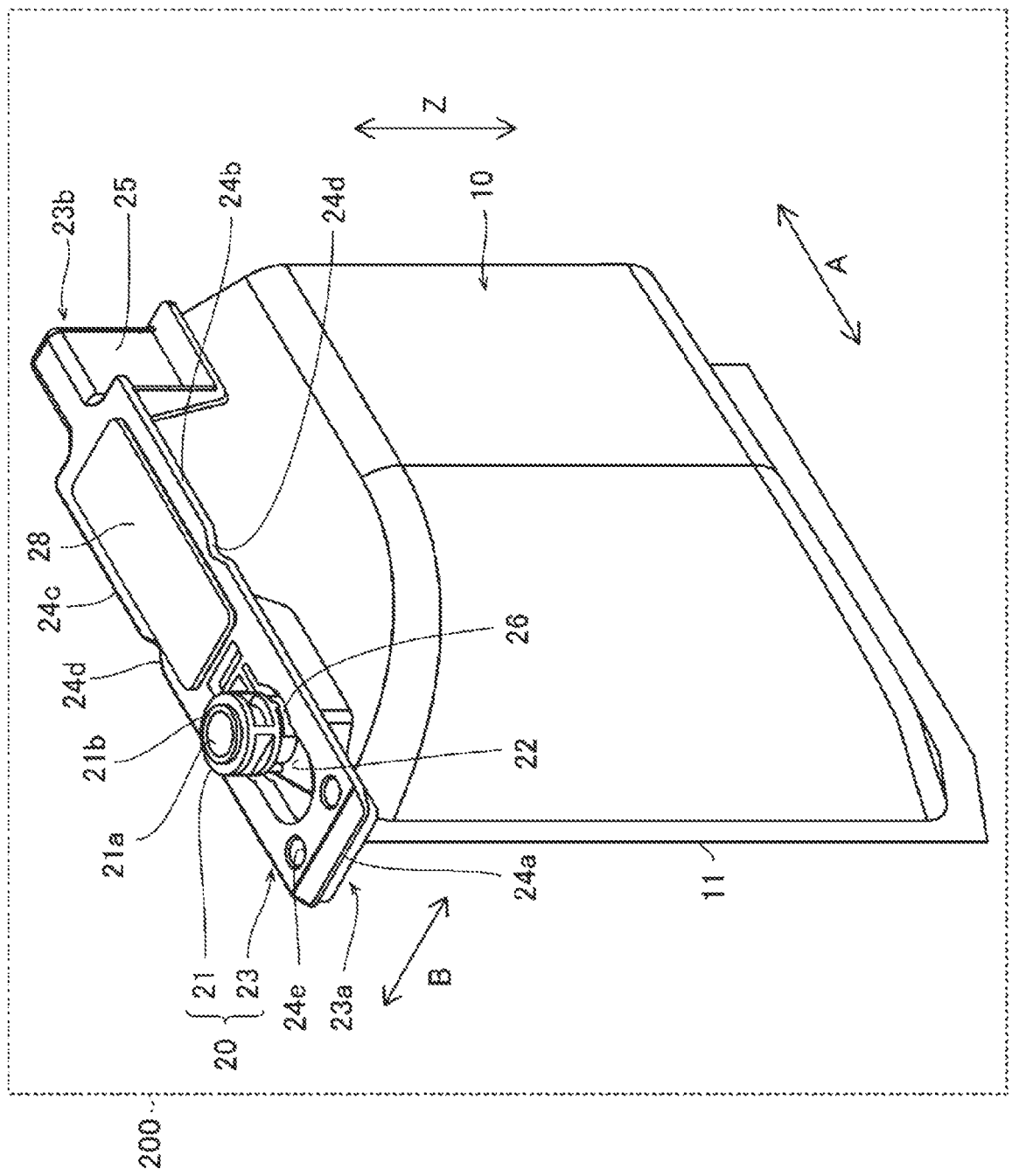
FIG. 29 is a view showing that the reagent container 200 according to another embodiment of the present invention includes a reagent storage portion 10 and a frame 20.

With reference to FIGS. 28 and 29, a reagent container 200 according to another embodiment will be described. The reagent container 200 is installed in the measurement unit 400 as shown in FIG. 28A. As shown in FIG. 28B, a suction tube 252 is inserted into the reagent container 200 from above in conjunction with a predetermined operation on the measurement unit 400. The suction tube 252 constitutes a first end of the above-described liquid feeding tube. As shown in FIG. 28B, the reagent container 200 contains a reagent 12 repeatedly sucked in a state where the suction tube 252 provided in the measurement unit 400 is inserted. The reagent container 200 includes a reagent storage portion 10 and a frame 20. Hereinafter, the vertical direction is defined as Z direction. As shown in FIG. 29, in the horizontal direction, the longitudinal direction of the reagent container 200 is defined as first direction A, and the lateral direction of the reagent container 200 is defined as second direction B.

The reagent storage portion 10 contains the reagent 12 (see FIG. 29). As shown in FIG. 29, the reagent storage portion 10 is a bag-shaped liquid storage member. The volume of the reagent storage portion 10 is, for example, 200 mL or more and 500 mL or less and 20 mL or more and 100 mL or less.

Figure 30:
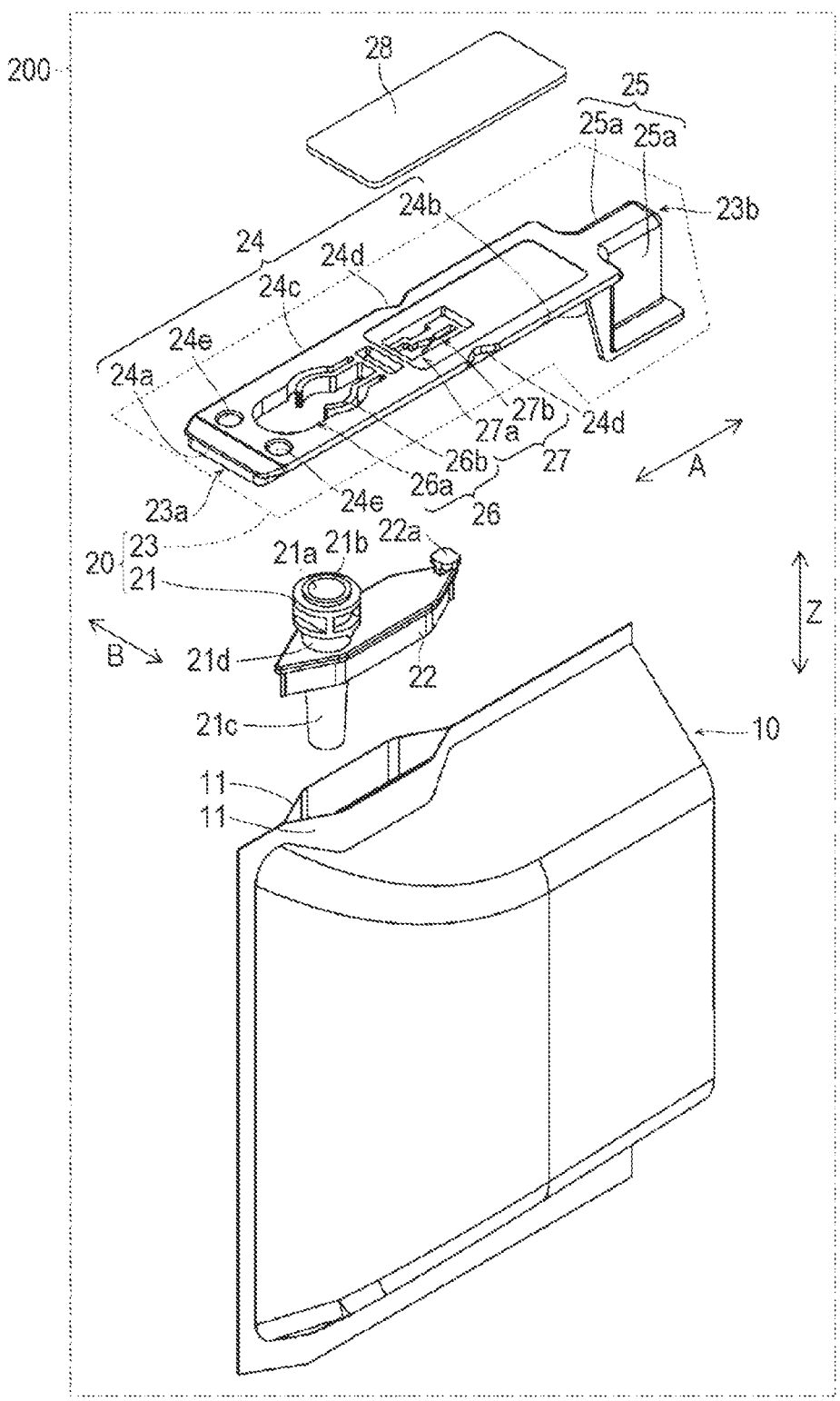
FIG. 30 is a view showing that the reagent storage portion 10 is formed in a hollow bag shape, and the frame 20 includes an opening portion 21, an attachment member 22, and a movement restriction portion 23.

The reagent storage portion 10 is formed in a bag shape by a film-like material. The reagent storage portion 10 has flexibility to be deformable. As shown in FIG. 30, the reagent storage portion 10 is formed in a hollow bag shape by overlapping a plurality of sheet-shaped members and joining outer peripheral edges of the overlapped film materials. The film may be formed into a bag shape by joining inner surfaces of the outer peripheral portion of one folded film material.

The reagent storage portion 10 is made of a laminated structure film material 11 having gas barrier properties and light shielding properties. The gas barrier property is a property of hardly permeating gas. Herein, the gas barrier property refers to being less permeable to air, particularly oxygen. The light shielding property is a property of hardly transmitting light. As a result, it is possible to suppress deterioration of the reagent 12 contained in the reagent container 200 due to external air and deterioration of the reagent 12 contained in the reagent container 200 due to external light such as sunlight. As a result, deterioration of the reagent can be effectively suppressed over a long period of time.

The laminated structure film material 11 may include at least one base material layer and at least one gas barrier layer. The laminated structure film material 11 may further include a protective layer that protects the outer surface of the gas barrier layer. The laminated structure film material 11 may have a light shielding layer made of a light shielding material. When a material having both gas barrier properties and light shielding properties is used for the gas barrier layer, the gas barrier layer and the light shielding layer may be the same layer. The number of layers of the laminated structure film material is 2 or more, but may be 3 to 9 or 10 or more, and is not particularly limited.

Examples of the laminated structure film material 11 used in the reagent storage portion 10 include the following configuration. (outside of bag)/nylon (15 μm)/aluminum foil (9 μm)/polyethylene (9 μm)/(inside of bag). In this configuration, in the reagent storage portion 10, nylon functions as a protective layer, an aluminum foil functions as a gas barrier layer and a light shielding layer, and polyethylene is a base material layer. In the reagent storage portion 10, base material layers made of polyethylene are joined to each other by thermal welding. The laminated structure film material 11 having this configuration is a metal foil laminate film having a structure in which a gas barrier layer made of metal foil is laminated on a resin base material layer.

For the laminated structure film material 11, for example, a resin-based multilayer barrier film, a coating-based film, a deposited film, an organic-inorganic composite film, or the like can also be used. The resin-based multilayer barrier film is a film having a structure in which a gas barrier layer of a resin material is laminated. Examples of the resin material having excellent gas barrier properties include polyvinylidene chloride (PVDC), polyvinyl alcohol (PVA), ethylene-vinyl alcohol copolymer (EVOH), and the like. The coating film is a film having a structure in which a gas barrier material is coated (formed) on a base material layer. The gas barrier material to be formed includes PVDC, PVA, EVOH, and the like. The deposited film is a film having a structure in which a gas barrier material is deposited on a base material layer. The gas barrier material to be deposited includes metals such as aluminum, or inorganic oxides such as alumina and silica. The organic-inorganic composite film includes a laminated film having a structure in which a gas barrier layer of an organic material (resin material) and a gas barrier layer of an inorganic material are separately laminated, a film including a gas barrier layer in which an inorganic material is dispersed in an organic binder, and the like.

The frame 20 includes an opening 21a attached to the reagent storage portion 10. The frame 20 is configured such that the inside of the reagent storage portion 10 is sealed when the suction tube 252 is inserted from above in conjunction with a predetermined operation on the measurement unit 400.

As shown in FIG. 28, the reagent container 200 is installed and held in a predetermined installation attitude in a container holding portion 251 of the measurement unit 400 by the user. In a state where the reagent container 200 is set at a set position Ps of the container holding portion 251, the suction tube 252 disposed above the reagent container 200 is inserted into the opening 21a from above. The set position Ps is a position where the opening 21a is disposed immediately below the suction tube 252. The frame 20 is configured such that the inside of the reagent storage portion 10 is sealed by closing the opening 21a in a state where the suction tube 252 is inserted.

This eliminates the need for the user to perform an operation of inserting the suction tube 252 into the opening 21a of the reagent container 200 before installing the reagent container 200, so that the suction tube 252 can be easily inserted into the reagent container 200. Since the inside of the reagent storage portion 10 is sealed when the suction tube 252 is inserted, it is possible to suppress the reagent in the reagent storage portion 10 from coming into contact with outside air by sealing. Therefore, deterioration of the reagent after installation in the measurement unit 400 can be suppressed. For example, by gripping a portion of the frame 20 or installing the frame 20 in the measurement unit 400, attachment work of the reagent container 200 to the measurement unit 400 can be easily performed even if the reagent container 200 has a flexible bag-shaped reagent storage portion 10.

In the case of a hard reagent container that does not deform, when the reagent is sucked in a sealed state, the internal pressure of the reagent container decreases along with decrease of the reagent, and the reagent cannot be sucked due to equilibrium with the suction pressure. Therefore, it is necessary to open the inside of the container to the atmosphere, and the reagent in the reagent container may deteriorate due to contact with air.

On the other hand, in the present embodiment, since the deformable bag-shaped reagent storage portion 10 is provided, it is possible to avoid a decrease in the internal pressure by contraction and deformation of the reagent storage portion 10 itself, and as a result, it is possible to suck the reagent 12 even in the sealed state. Therefore, the reagent container 100 is configured such that the inside of the reagent storage portion 10 is sealed by suppressing inflow of air into the opening 21a. By suppressing inflow of air into the opening 21a, it is possible to suppress deterioration of the reagent 12 due to contact of the reagent 12 inside the reagent storage portion 10 with air. Since deterioration of the reagent can be suppressed, the reagent in the reagent container 200 can be continuously used over a longer period of time in a state where the reagent container 200 is installed in the measurement unit 400. Therefore, by increasing the capacity of the reagent storage portion 10 to making it possible to suck the reagent more times from one reagent container 200, the replacement frequency of the reagent container 200 associated with the operation of the measurement unit 400 can be reduced. For the user, there is an advantage that the number of executions of the replacement operation of the reagent container 200 in a certain period can be reduced.

In the configuration in which the suction tube 252 is inserted into the opening 21a by the operation of the measurement unit 400 instead of manually inserting the suction tube 252 by the user, positioning of the opening 21a and prevention of positional deviation of the opening 21a are important for reliably sealing the reagent storage portion 10 without damaging the reagent storage portion 10 by the suction tube 252. The reagent container 200 of the present embodiment has a frame structure for reliably positioning the opening 21a and preventing positional deviation of the opening 21a when being installed in the measurement unit 400.

As shown in FIG. 29, the frame 20 includes an opening portion 21 having an opening 21a, and a movement restriction portion 23 configured to abut on a part of the measurement unit 400 to restrict movement of the opening 21a.

The movement restriction portion 23 abuts on a part of the measurement unit 400, whereby the movement of the opening 21a can be suppressed. As a result, it is possible to suppress positional deviation between the suction tube 252 and the opening 21a when the suction tube 252 is inserted. Since it is possible to suppress the positional deviation between the suction tube 252 and the opening 21a in a state where the suction tube 252 is inserted into the reagent storage portion 10 from the opening 21a, it is possible to effectively maintain a sealed state inside the reagent storage portion 10.

The opening portion 21 is a cylindrical part in which the opening 21a is formed. The lower end of the opening 21a is connected to the inside of the reagent storage portion 10, and the upper end is connected to the outside of the reagent storage portion 10. The opening portion 21 is provided in the upper portion of the reagent storage portion 10.

The opening portion 21 has a sealing surface 21b that comes into contact with a sealing body 252a (see FIG. 28) provided in the suction tube 252 to seal the opening 21a. Accordingly, the reagent storage portion 10 can be easily and effectively sealed by abutment between the sealing body 252a and the sealing surface 21b.

The sealing surface 21b may be any of an upper end surface of the opening portion 21, an inner peripheral surface of the opening portion 21, and an outer peripheral surface of the opening portion 21. In the example of FIG. 29, the sealing surface 21b is an annular upper end surface of the opening portion 21 surrounding the opening 21a (that is, an edge portion of the opening 21a). The sealing surface 21b vertically abuts on the sealing body 252a (see FIG. 28B) provided in the suction tube 252.

For example, a detachable cap can be attached to the opening portion 21. The reagent container 200 is provided to the user with the opening 21a sealed by the cap. The reagent container 200 can be installed in the measurement unit 400 with the cap removed.

For example, a puncturable sealing film may be welded to the upper surface of the opening portion 21 so as to cover the opening 21a. The reagent container 200 is provided to the user in a state where the opening 21a is sealed by the sealing film. The reagent container 200 can be opened by puncturing the seal film by the suction tube 252 after being installed in the measurement unit 400.

As shown in FIG. 30, the opening portion 21 is formed in an attachment member 22 attached to the reagent storage portion 10. The opening portion 21 is integrally formed with the attachment member 22 so as to protrude upward from the upper surface of the attachment member 22.

An outer peripheral portion of the attachment member 22 is welded to an inner peripheral portion of the reagent storage portion 10. The attachment member 22 is provided at the upper end of the reagent storage portion 10 so as to be sandwiched between the outer peripheral edges of the two laminated structure film materials 11 constituting the reagent storage portion 10. The attachment member 22 is welded to the inner surfaces of the two laminated structure film materials 11. The outer peripheral portion of the attachment member 22 and the reagent storage portion 10 are sealed by welding. As a result, the attachment member 22 having rigidity for coupling with the movement restriction portion 23 can be easily provided in the flexible bag-shaped reagent storage portion 10, and sealing between the attachment member 22 and the reagent storage portion 10 can be easily realized.

The attachment member 22 has a supported portion 22a disposed at a distance from the opening portion 21 in the horizontal direction. The attachment member 22 has a thin and long hexagonal shape, and the opening portion 21 is disposed at one end in the longitudinal direction of the attachment member 22, and the supported portion 22a is disposed at the other end. The supported portion 22a is a protrusion integrally formed with the attachment member 22 so as to protrude upward from the upper surface of the attachment member 22. The supported portion 22a has a T shape when viewed from A direction, and has a root portion thinner than an upper portion.

The opening portion 21 is disposed near the end of the reagent storage portion 10 in the horizontal direction. Even when the reagent storage portion 10 is expanded by containing the reagent 12 (see FIG. 28), the opening portion 21 of the attachment member 22 is located at a position relatively close to the inner surface of the reagent storage portion 10. Therefore, when the suction tube 252 is inserted in an inclined manner with respect to a center axis of the opening portion 21, there is a possibility that the tip of the suction tube 252 comes into contact with the inner surface of the reagent storage portion 10.

Therefore, the opening portion 21 has a suction tube guide part 21c protruding downward from the lower end of the opening 21a toward the inside of the reagent storage portion 10. The suction tube guide part 21c is integrally formed with the attachment member 22. The suction tube guide part 21c has a shape obtained by partially extending the lower end of the cylindrical opening portion 21 downward. The suction tube guide part 21c is formed in a wall shape so as to partition the suction tube 252 inserted into the opening 21a and the inner surface of the reagent storage portion 10. As a result, even when the suction tube 252 is inserted into the reagent storage portion 10 while being inclined with respect to the center axis of the opening 21a, the tip of the suction tube 252 can be guided so as to suppress contact between the tip of the suction tube 252 and the inner surface of the reagent storage portion 10.

Returning to FIG. 29, the movement restriction portion 23 has a function of positioning the opening 21a of the measurement unit 400 with respect to the suction tube 252. The movement restriction portion 23 has a function of preventing positional deviation of the opening 21a.

The movement restriction portion 23 is fixed to the opening portion 21 so as to protrude from the opening portion 21 in the horizontal direction. As a result, the relative position between the movement restriction portion 23 and the opening 21a can be fixed. The portion of the movement restriction portion 23 protruding from the opening portion 21 in the horizontal direction makes it possible to easily realize the configuration in which the portion abuts on a part of the measurement unit 400 to restrict the movement, and to easily obtain a contact area necessary for preventing the positional deviation of the opening 21a by the abutment.

As shown in FIG. 30, the movement restriction portion 23 has a substantially flat plate shape. The movement restriction portion 23 has a shape extending along the first direction A in the horizontal plane. The movement restriction portion 23 has a rectangular shape including a pair of long sides extending in the first direction A and a pair of short sides extending in the second direction B. As will be described later, the reagent container 200 is installed in the container holding portion 251 of the measurement unit 400 by being inserted into the container holding portion 251 along the first direction A with the one end 23a side of the movement restriction portion 23 in which the opening portion 21 is disposed as a head. The movement restriction portion 23 is fixed to the opening portion 21 between the one end 23a of the movement restriction portion 23 in the first direction A and the central portion. That is, the opening portion 21 is disposed at a position closer to the one end 23a side between the one end 23a and the other end 23b of the movement restriction portion 23. As a result, by gripping the other end 23b side of the movement restriction portion 23 and moving the reagent container 200 in the first direction A, the opening 21a formed in the opening portion 21 on the one end 23a side can be disposed at a position immediately below the suction tube 252. In this case, since the opening portion 21 is separated from the other end 23b of the movement restriction portion 23, it is possible to suppress the user's finger from coming into contact with the suction tube 252 when the reagent container 200 is attached.

The movement restriction portion 23 is configured to restrict the movement of the opening 21a in the horizontal direction by abutting on a part of the measurement unit 400 in the horizontal direction. As a result, the movement restriction portion 23 can suppress the positional relationship between the opening 21a and the suction tube 252 in the horizontal direction from being deviated. The movement restriction portion 23 includes a horizontal abutment surface 24 including any one of an inner surface of a hole formed in the movement restriction portion 23, an inner surface of a notch formed in the movement restriction portion 23, and a side surface of the movement restriction portion 23. With a simple configuration, it is possible to provide the horizontal abutment surface 24 for restricting the movement of the opening 21a in the horizontal direction on the movement restriction portion 23.

The horizontal abutment surface 24 includes a first surface 24a including a side surface formed at the one end 23a (that is, a tip surface) of the movement restriction portion 23 in the first direction A. As a result, when the reagent container 200 is attached to the measurement unit 400, both alignment and movement restriction of the opening 21a in the first direction A can be easily realized by simply advancing the reagent container 200 in the first direction A until the one end 23a of the movement restriction portion 23 abuts the inner surface of the container holding portion 251.

The horizontal abutment surface 24 includes second surfaces 24b and 24c formed of side surfaces extending along the first direction A of the movement restriction portion 23. The second surfaces 24b and 24c are a pair of side surfaces constituting long sides of the movement restriction portion 23 in plan view. The second surfaces 24b and 24c are provided on one side and the other side in the second direction B of the movement restriction portion 23. As a result, both alignment and movement restriction of the opening 21a in the second direction B can be easily realized by the side surface of the movement restriction portion 23.

Figure 31:
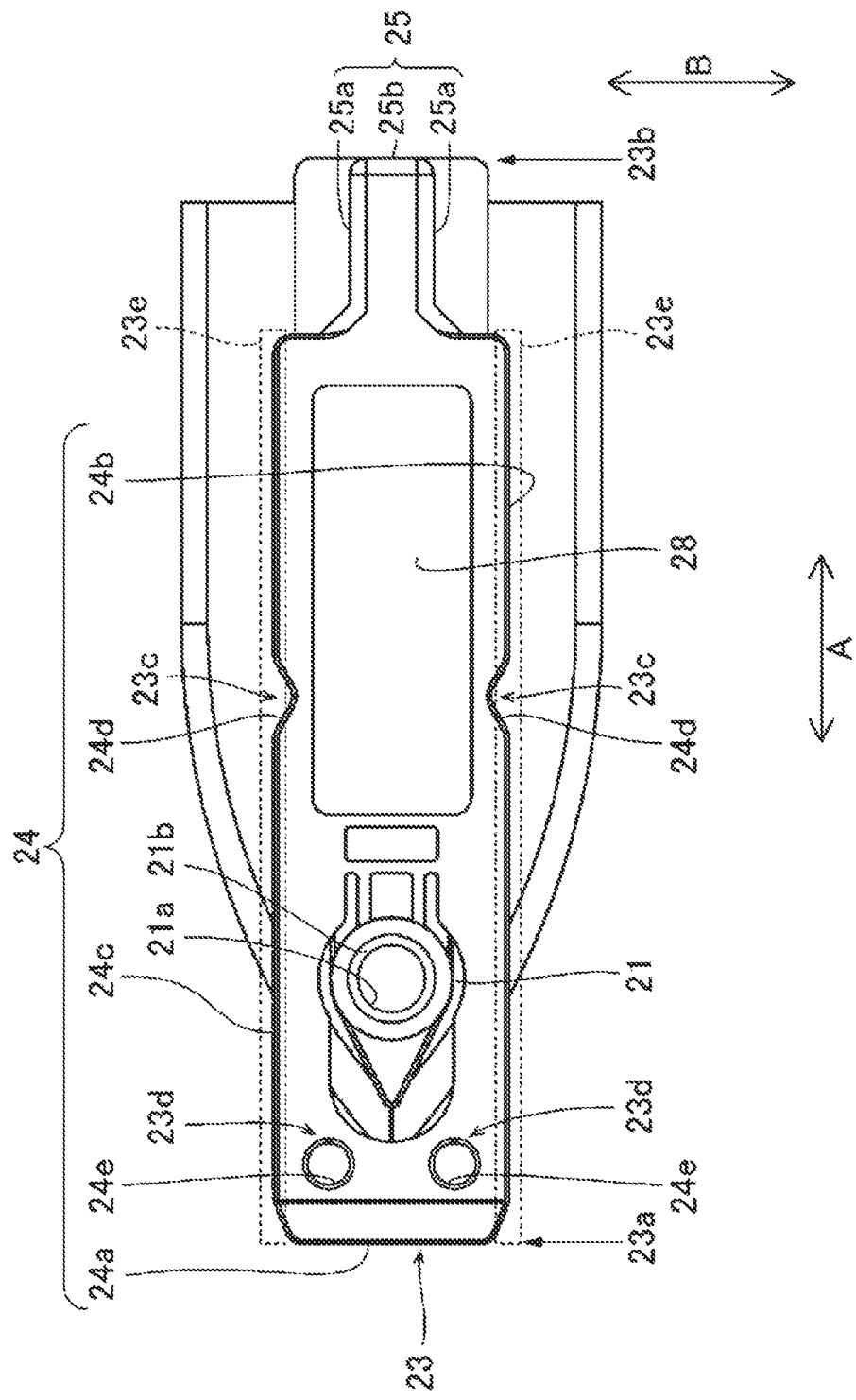
FIG. 31 is a top view of the movement restriction portion 23.

As shown in FIG. 31, the movement restriction portion 23 has a notch 23c formed on the side surface. The horizontal abutment surface 24 includes a third surface 24d formed of the inner surface of the notch 23c. The third surface 24d abuts on a part of the measurement unit 400 entering the notch 23c. As a result, the third surface 24d in the notch 23c abuts on a part of the measurement unit 400, so that the movement restriction portion 23 and the measurement unit 400 can be engaged with each other. By the engagement, it is possible to effectively suppress the position of the opening 21a from being deviated. When the reagent container 200 is attached to the measurement unit 400, the movement restriction portion 23 is engaged with a part of the measurement unit 400 and does not move, so that the user can perceive by feeling that the reagent container 200 is installed at an appropriate position without visually recognizing the reagent container 200.

The movement restriction portion 23 has a hole 23d formed on the upper surface of the movement restriction portion 23. The horizontal abutment surface 24 includes a fourth surface 24e formed of the inner surface of the hole 23d. The fourth surface 24e abuts on a part (for example, an entry member 281 to be described later, see FIG. 35) of the measurement unit 400 entering the inside of the hole 23d. As a result, a part of the measurement unit 400 enters the hole 23d formed in the movement restriction portion 23, so that the movement restriction portion 23 and the measurement unit 400 can be engaged with each other. By the engagement, it is possible to effectively suppress the position of the opening 21a from being deviated. In FIG. 31, two holes 23d are provided. The two holes 23d are arranged along the second direction B. Only one hole 23d may be arranged.

The movement restriction portion 23 includes a guide portion 23e that guides the movement when the opening 21a is disposed below the suction tube 252 of the measurement unit 400. The guide portion 23e extends along the first direction A in the horizontal plane. The guide portion 23e slides in a state of being in contact with a part of the measurement unit 400, thereby aligning the movement direction of the movement restriction portion 23 with the first direction A. As a result, when the reagent container 200 is installed in the container holding portion 251 of the measurement unit 400, the opening 21a can be easily and accurately disposed at an appropriate position where the suction tube 252 can be inserted.

The movement restriction portion 23 is configured to restrict the movement of the opening 21a in the vertical direction by abutting on a part of the measurement unit 400 in the vertical direction (Z direction). As a result, even in the reagent container 200 including the bag-shaped reagent storage portion 10 that is easily deformed, when the suction tube 252 is inserted into the reagent storage portion 10 and when the suction tube 252 is pulled out from the inside of the reagent storage portion 10, the movement of the opening 21a in the vertical direction can be suppressed.

As shown in FIG. 31, the movement restriction portion 23 has a grip portion 25 for gripping the movement restriction portion 23 at the other end 23b of the movement restriction portion 23 in the first direction A. As a result, the other end 23b side of the movement restriction portion 23 can be easily gripped. Since the bag-shaped reagent storage portion 10 is easily deformed and difficult to grip, the reagent container 200 can be easily carried by providing the grip portion 25 in the movement restriction portion 23.

As shown in FIG. 30, the movement restriction portion 23 includes a fixing portion 26 fixed to the opening portion 21 and a support portion 27 that supports the upper portion of the reagent storage portion 10 at a position away from the opening portion 21. As a result, when the reagent container 200 is carried, in a case where the movement restriction portion 23 is gripped by hand, the reagent storage portion 10 can be supported so as to be suspended from the movement restriction portion 23 at a plurality of positions of the fixing portion 26 and the support portion 27. Since the weight of the reagent storage portion 10 acts in a dispersed manner at a plurality of positions of the movement restriction portion 23, it is possible to stably support the reagent storage portion 10 even if the capacity of the reagent storage portion 10 is increased. Since the user does not need to grip the bag-shaped portion that is easily deformed, the reagent container 200 can be easily handled.

As shown in FIG. 29, the movement restriction portion 23 includes an information recording medium 28 in which reagent information is recorded. The information recording medium 28 is a radio frequency identifier (RFID) tag. Accordingly, when the reagent container 200 is attached to the measurement unit 400, the measurement unit 400 can read information of the reagent from the information recording medium 28. In a case where the information recording medium 28 is provided in the bag-shaped reagent storage portion 10 that is easily deformed, there is a possibility that it is difficult to provide the information recording medium 28 or it is difficult to read the information recording medium 28. However, by providing the information recording medium 28 in the movement restriction portion 23, the information recording medium 28 can be easily provided and can be read well.

Figure 32:
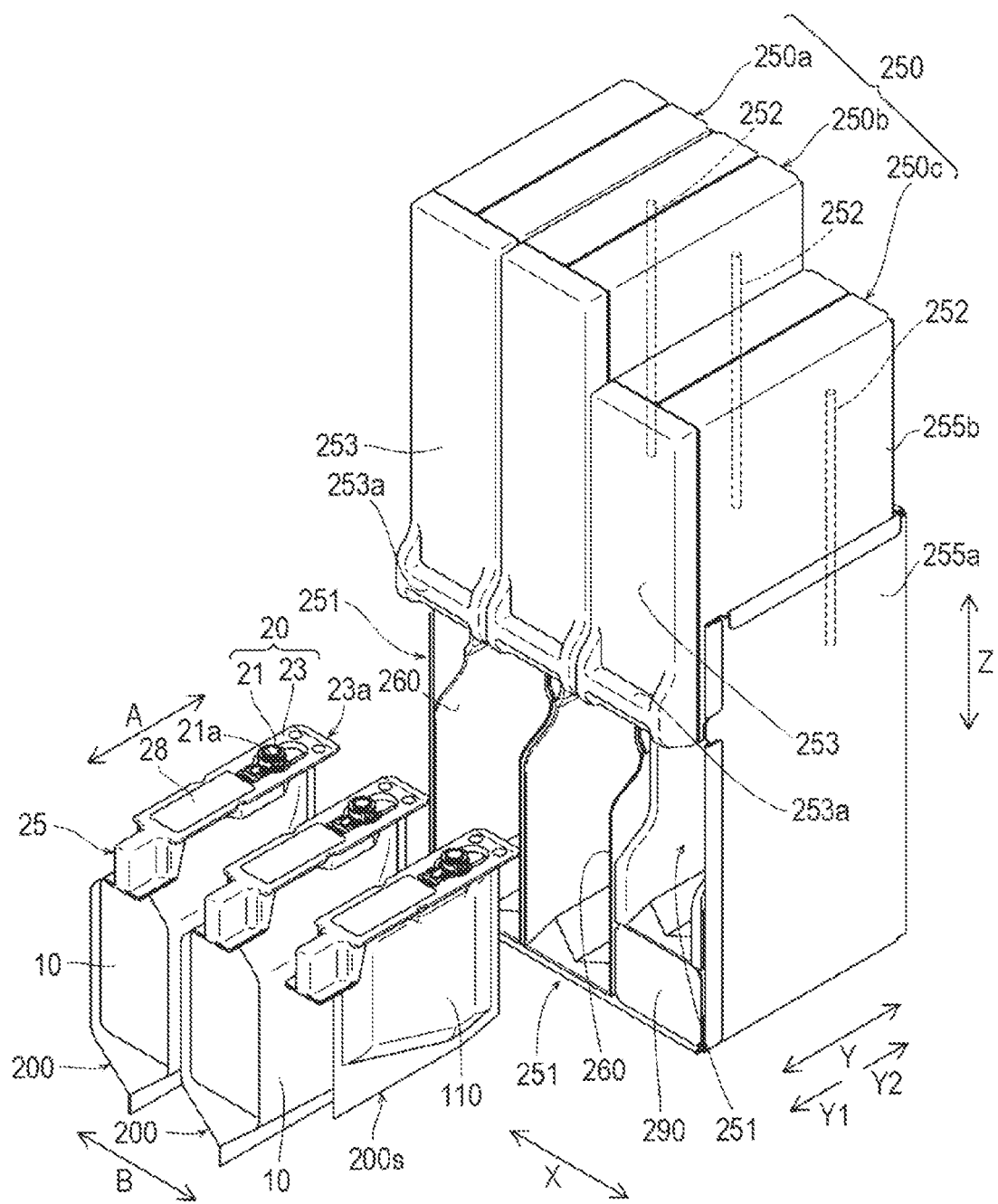
FIG. 32 is a view showing that the reagent suction portion 250 includes a plurality of reagent container holders capable of holding each one reagent container 200.

As shown in FIG. 32, the reagent suction portion 250 includes a plurality of reagent container holders capable of holding each one reagent container 200 (or small-sized reagent container 300). The reagent suction portion 250 includes, for example, a total of five reagent container holders, but FIG. 32 shows only three reagent container holders 250a, 250b, and 250c for convenience. The plurality of reagent container holders 250a to 250c are provided side by side in the lateral direction.

Figure 35:
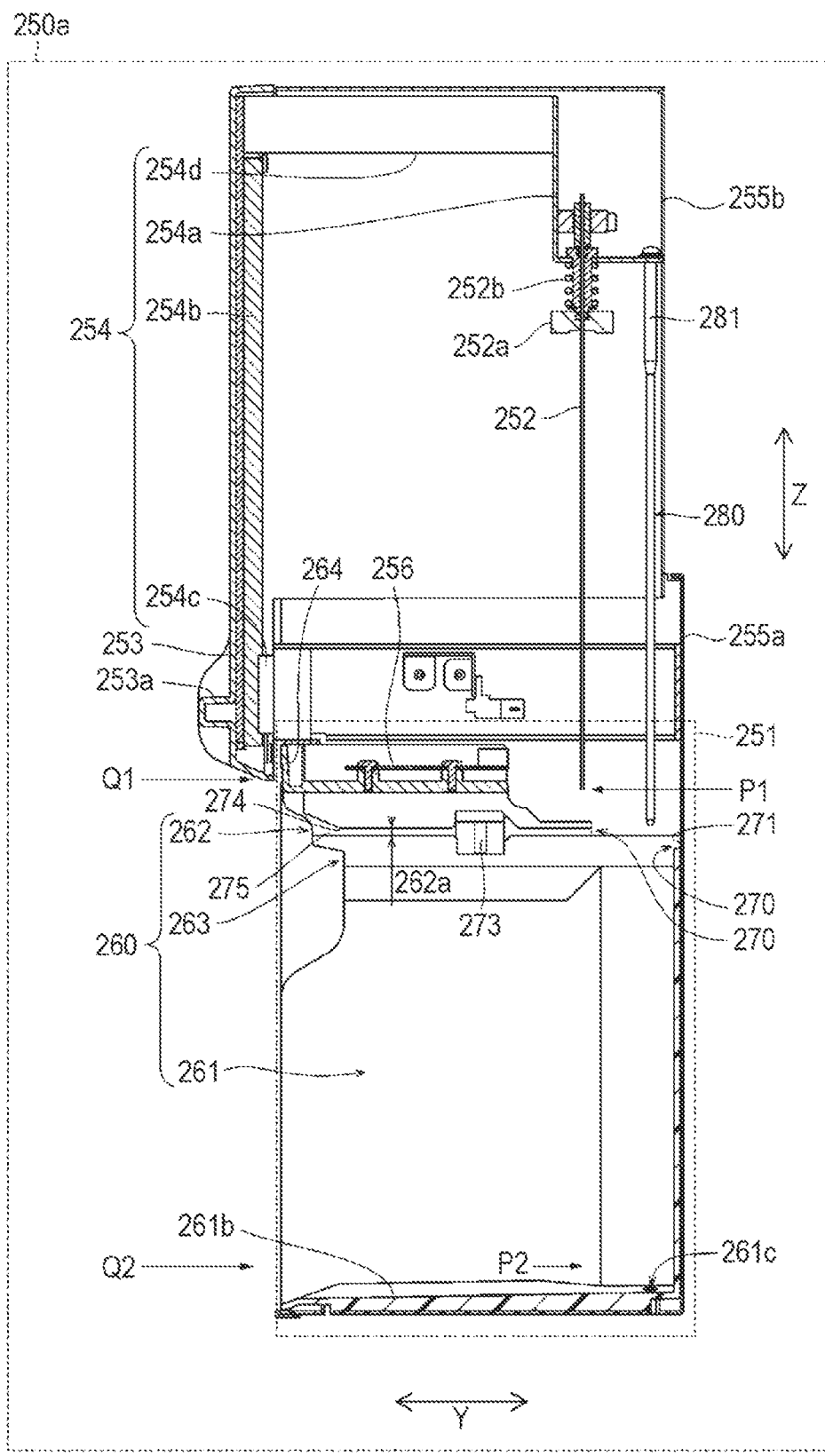

Each of the reagent container holders 250a to 250c includes a lower chassis 255a and an upper chassis 255b, a container holding portion 251, a suction tube 252, an operation part 253, and a moving mechanism 254 (see FIG. 35). Hereinafter, the structure of the reagent container holder 250a will be described as a representative of the reagent container holders 250a to 250c. The container holding portion 251 is provided in the lower chassis 255a. The container holding portion 251 is located at the lowermost portion of the reagent container holder 250a. The container holding portion 251 is configured to hold a reagent container 200 including a bag-shaped reagent storage portion 10 for containing a reagent and a frame 20 including an opening 21a.

The container holding portion 251 has a box-shaped or cylindrical storage portion 260 in which the reagent container 200 can be stored inside and an inlet is formed in the horizontal direction. The storage portion 260 has an inlet opened at an end in the Y1 direction. The storage portion 260 is provided to extend from the inlet toward the Y2 direction.

Figure 33:
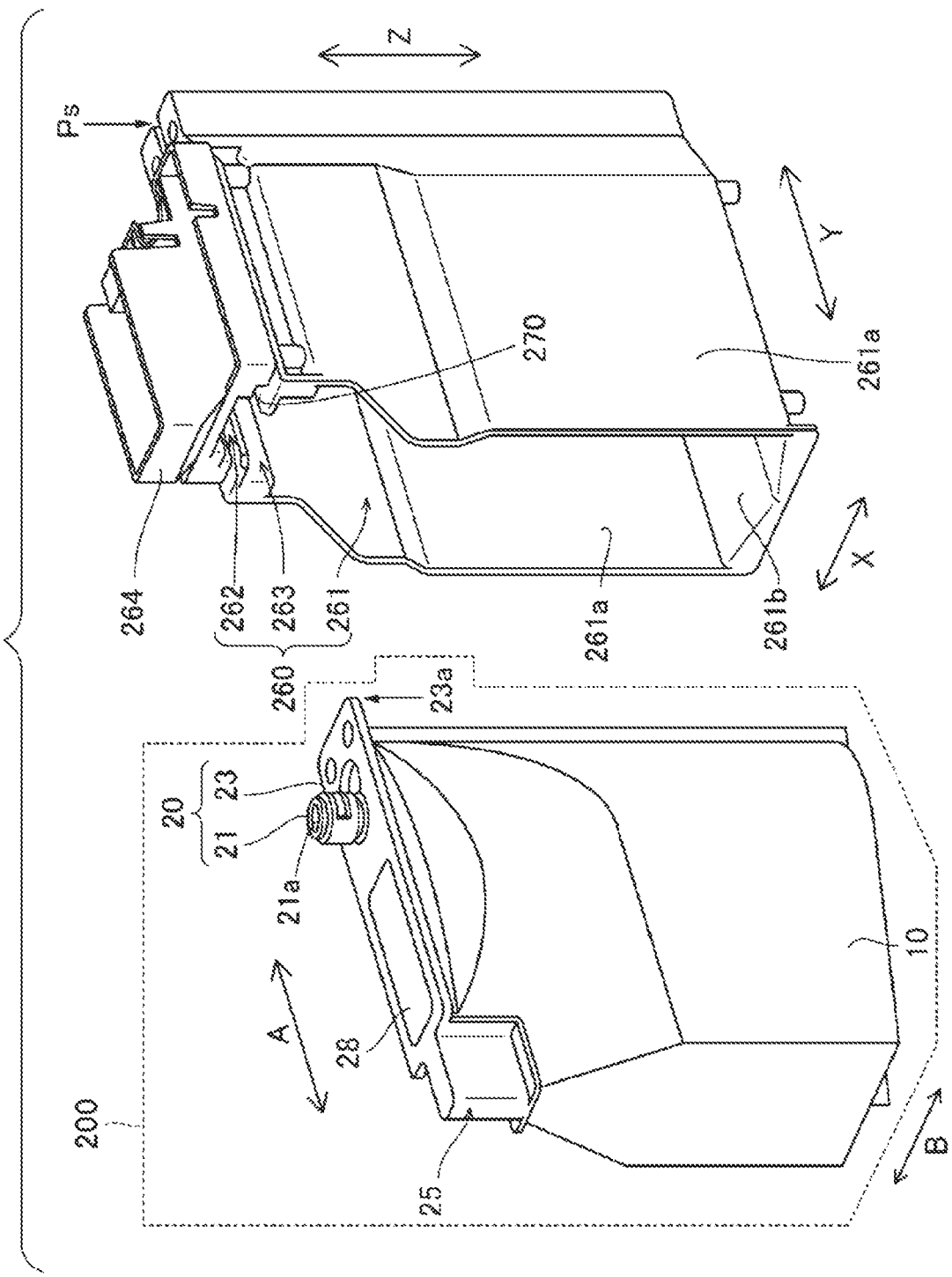
FIG. 33 is a view showing that a storage portion 260 includes a first insertion part 261 into which the reagent storage portion 10 of the reagent container 200 is inserted and a second insertion part 262 into which the movement restriction portion 23 of the reagent container 200 is inserted.

As shown in FIG. 33, the storage portion 260 includes a first insertion part 261 into which the reagent storage portion 10 of the reagent container 200 is inserted, and a second insertion part 262 which is disposed above the first insertion part 261 and into which the movement restriction portion 23 of the reagent container 200 is inserted.

The first insertion part 261 is a space partitioned by a pair of side surface portions 261a facing both side surfaces of the reagent storage portion 10 in the width direction (X direction) and a bottom surface portion 261b facing the lower surface of the reagent storage portion 10 in the vertical direction (Z direction). The upper portion of the first insertion part 261 and the second insertion part 262 are connected by a connection passage 263.

The connection passage 263 is a space for allowing a connection part between the movement restriction portion 23 and the reagent storage portion 10 (a portion where the attachment member 22 is disposed) of the reagent container 200 to pass in the Y direction.

Figure 34:
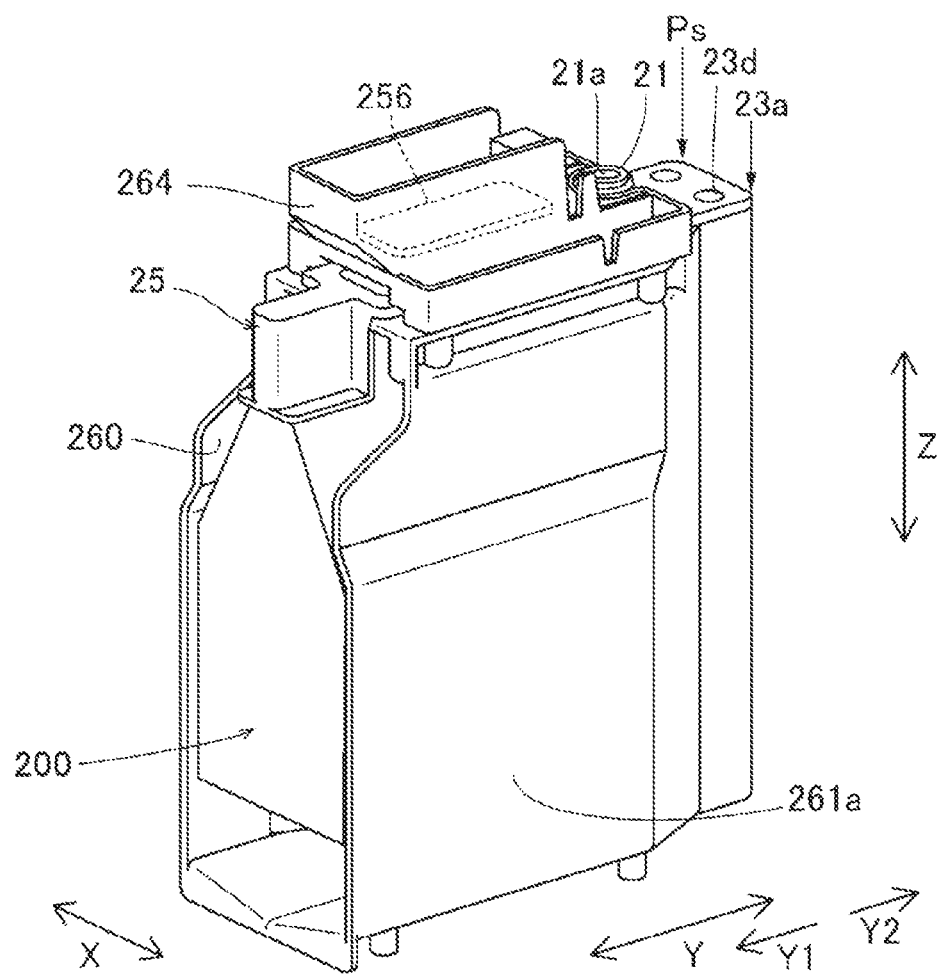
FIG. 34 is a view showing a storage portion 260 in which the reagent container 200 is set.

The second insertion part 262 extends from the inlet of the storage portion 260 toward the set position Ps immediately below the suction tube 252. The second insertion part 262 is configured to guide the reagent container 200 to the set position Ps (see FIG. 34) by abutting on the movement restriction portion 23. As a result, the reagent container 200 can be guided from the inlet of the storage portion 260 to the set position Ps using the movement restriction portion 23. As a result, even in the case of the reagent container 200 including the reagent storage portion 10 that is easily deformed, it is possible to accurately guide the reagent container 200 to the set position Ps by a simple operation in which the user inserts the reagent container 200 from the inlet of the storage portion 260. The second insertion part 262 has, for example, a convex cross-sectional shape. That is, the second insertion part 262 has a convex cross-sectional shape with a wide lower portion into which the flat plate-shaped movement restriction portion 23 is inserted and a narrow upper portion into which the opening portion 21 protruding upward from the movement restriction portion 23 is inserted.

The reagent suction portion 250 includes an abutting portion 270. The abutting portion 270 abuts on the movement restriction portion 23 provided in the frame 20 of the reagent container 200 disposed in the container holding portion 251 to restrict the movement of the opening 21a. As a result, since the abutting portion 270 abuts on the movement restriction portion 23, it is possible to suppress the positional deviation between the suction tube 252 and the opening 21a when the suction tube 252 is inserted. Since it is possible to suppress the positional deviation between the suction tube 252 and the opening 21a in a state where the suction tube 252 is inserted into the reagent storage portion 10 from the opening 21a, it is possible to effectively maintain a sealed state inside the reagent storage portion 10.

The abutting portion 270 abuts on the movement restriction portion 23 provided in the frame 20 of the reagent container 200 disposed in the container holding portion 251 to restrict the movement of the opening 21a. Since the abutting portion 270 abuts on the movement restriction portion 23, it is possible to suppress the positional deviation between the suction tube 252 and the opening 21a when the suction tube 252 is inserted. Since it is possible to suppress the positional deviation between the suction tube 252 and the opening 21a in a state where the suction tube 252 is inserted into the reagent storage portion 10 from the opening 21a, it is possible to effectively maintain a sealed state inside the reagent storage portion 10.

The abutting portion 270 is configured to abut on the movement restriction portion 23 fixed to the opening 21a of the reagent container 200 to restrict the movement of the opening 21a. As a result, since the relative position between the movement restriction portion 23 and the opening 21a is fixed, positioning and movement restriction of the opening 21a can be reliably and accurately performed by abutting the abutting portion 270 on the movement restriction portion 23.

At least a part of the abutting portion 270 is provided in the storage portion 260. As a result, by inserting the reagent container 200 into the storage portion 260 from the inlet, the abutting portion 270 can be abutted on the movement restriction portion 23, and the movement of the opening 21a in the storage portion 260 can be restricted.

The abutting portion 270 is disposed in the second insertion part 262. As a result, by providing the abutting portion 270 in the second insertion part 262 corresponding to the movement restriction portion 23 in the reagent container 200, the abutting portion 270 can be abutted on the movement restriction portion 23 in a preset relative positional relationship even in the reagent container 200 including the reagent storage portion 10 that is easily deformed. As a result, the positioning and movement restriction of the opening 21a can be accurately performed.

The abutting portion 270 is configured to abut on any one of a hole formed in the movement restriction portion 23, a notch formed in the movement restriction portion 23, and a side surface of the movement restriction portion 23. With a simple configuration, the abutting portion 270 can be abutted on the movement restriction portion 23 to effectively restrict the movement of the opening 21a in the horizontal direction.

When the suction tube 252 moves downward, the entry member 281 also moves downward together with the suction tube 252 and the entry member 281 enters the inside of the hole 23d of the movement restriction portion 23. When the entry member 281 enters the hole 23d, the movement of the movement restriction portion 23 is suppressed.

The abutting portion 270 is configured to abut on the movement restriction portion 23 in the vertical direction to restrict the movement of the opening 21a in the vertical direction. As a result, even in the reagent container 200 including the bag-shaped reagent storage portion 10 that is easily deformed, when the suction tube 252 is inserted into the reagent storage portion 10 and when the suction tube 252 is pulled out from the inside of the reagent storage portion 10, the movement of the opening 21a in the vertical direction can be suppressed.

As shown in FIG. 35, the suction tube 252 is disposed at an upper position of the deepest portion (end on the Y2 direction side) of the storage portion 260 of the container holding portion 251 with the tip facing downward. The suction tube 252 is held by the moving mechanism 254. The suction tube 252 is configured to be moved in the vertical direction (Z direction) by the moving mechanism 254. As a result, the suction tube 252 is configured to enter the inside of the reagent container 200 (300) through the opening 21a of the reagent storage portion 10 (110) inserted into the inner side of the container holding portion 251 so that the suction tube 252 can suck the reagent inside the reagent container 200 (300).

The suction tube 252 has the sealing body 252a that comes into contact with the opening 21a to seal the opening 21a when the suction tube 252 is inserted into the opening 21a. As a result, the reagent storage portion 10 can be easily and effectively sealed by the sealing body 252a.

The sealing body 252a is provided so as to surround the outer periphery of the suction tube 252. The sealing body 252a is configured to be elastically deformed by coming into contact with the edge portion of the opening 21a (that is, the sealing surface 21b of the opening portion 21) to seal the opening 21a. As a result, the reagent storage portion 10 can be reliably sealed by the sealing body 252a using downward movement when the suction tube 252 is inserted into the opening 21a.

The sealing body 252a is made of an elastically deformable rubber material. A biasing member 252b for biasing the sealing body 252a toward the opening 21a is provided between the sealing body 252a and the suction tube holding portion 254a that holds the suction tube 252. The biasing member 252b is formed of a compression spring.

The moving mechanism 254 holds the suction tube 252 so as to be movable in the vertical direction (Z direction) between a raised position P1 and a lowered position P2. The moving mechanism 254 includes the suction tube holding portion 254a and a linear motion mechanism including a linear rail 254b and a fixed slider 254c. The suction tube 252 is attached to the suction tube holding portion 254a, and the suction tube holding portion 254a is connected to the upper end of the linear rail 254b via a connecting portion 254d extending in the Y direction. The linear rail 254b is disposed on the front surface (the side surface on the Y1 direction side) of the reagent container holder 250a. The linear rail 254b extends in the Z direction. The fixed slider 254c is fixed to the lower chassis 255a. The fixed slider 254c holds the linear rail 254b so as to be movable along the Z direction. As a result, the linear rail 254b moves in the Z direction with respect to the fixed slider 254c. As the linear rail 254b moves in the Z direction, the suction tube 252 moves integrally with the linear rail 254b in the Z direction.

As described above, the moving mechanism 254 is configured to support the suction tube 252 so as to be movable in the vertical direction, and move the suction tube 252 in conjunction with a predetermined operation on the operation part 253, thereby causing the suction tube 252 to enter the reagent container 200 held by the container holding portion 251 and retract the suction tube 252 to the outside of the reagent container 200. As a result, the suction tube 252 can enter the reagent container 200 and retract the suction tube 252 to the outside of the reagent container 200 by simply moving the suction tube 252 up and down. As the degree of freedom in the moving direction of the suction tube 252 decreases, the suction tube 252 can be operated accurately and with high reproducibility. Therefore, the operation of sealing the reagent storage portion 10 when the suction tube 252 is inserted can be executed more accurately by simple vertical movement.

As shown in FIG. 35, the moving mechanism 254 holds the operation part 253 such that the suction tube 252 and the operation part 253 move in conjunction with each other. The operation part 253 is provided on the front surface (the side surface on the Y1 direction side) of the reagent container holder 250a, and the back surface side (the Y2 direction side) of the operation part 253 is attached to the linear rail 254b. As a result, the linear rail 254b, the suction tube 252, and the operation part 253 integrally move in the Z direction.

As shown in FIG. 32, the operation part 253 is disposed on a front surface (arrow Y1 direction side) of each of the reagent container holders 250a to 250c (lower chassis 255a). The operation part 253 is configured as a cover that openably and closably covers the front surface of the container holding portion 251 of the reagent container holder 250a.

The operation part 253 is configured to be gripped and moved by the user's hand. An operation grip portion 253a protruding forward (Y1 direction) from a front surface of the operation part 253 is formed on the operation part 253. The user can move the operation part 253 in the Z direction by gripping and moving the operation grip portion 253a in the Z direction.

Fourth Embodiment

In the analysis systems 4000 and 4001 described in the first and second embodiments, the analysis unit (analysis section) 300X may use waveforms of the first signal and the second signal corresponding to fluorescence emitted from a cell flowing in the flow cell as inputs, and perform cell classification using an AI algorithm learned from waveforms of signals corresponding to fluorescence emitted from various cells to be classified as at least a part of the first to third analyses. As described above, the first signal is a signal including a plurality of signals each corresponding to the side scattered light and the side fluorescent light by the first light source, and the second signal is a signal including a plurality of signals each corresponding to the forward scattered light, the side scattered light, and the side fluorescent light by the second light source. The first analysis is an analysis based on the first signal, the second analysis is an analysis based on the second signal, and the third analysis is an analysis based on the first signal and the second signal.

In the present embodiment, in the analysis system 4000 (see FIG. 7) including the FCM detection section 460 capable of irradiating the measurement sample with the light of the plurality of wavelengths, the data acquired by the measurement unit 400 is analyzed by the AI algorithm. Since the measurement sample is irradiated with light of a plurality of wavelengths, the measurement unit 400 detects a plurality of types of optical signals corresponding to each wavelength. Data acquired by A/D conversion of each of the plurality of types of detected optical signals is analyzed by the AI algorithm. The analysis by the AI algorithm is executed in the analysis unit 300X (see FIG. 10). The AI algorithm is stored, for example, in the storage part 3004 of the analysis unit 300X. The processor 3001 of the analysis unit 302X performs analysis based on the AI algorithm.

Figure 36:
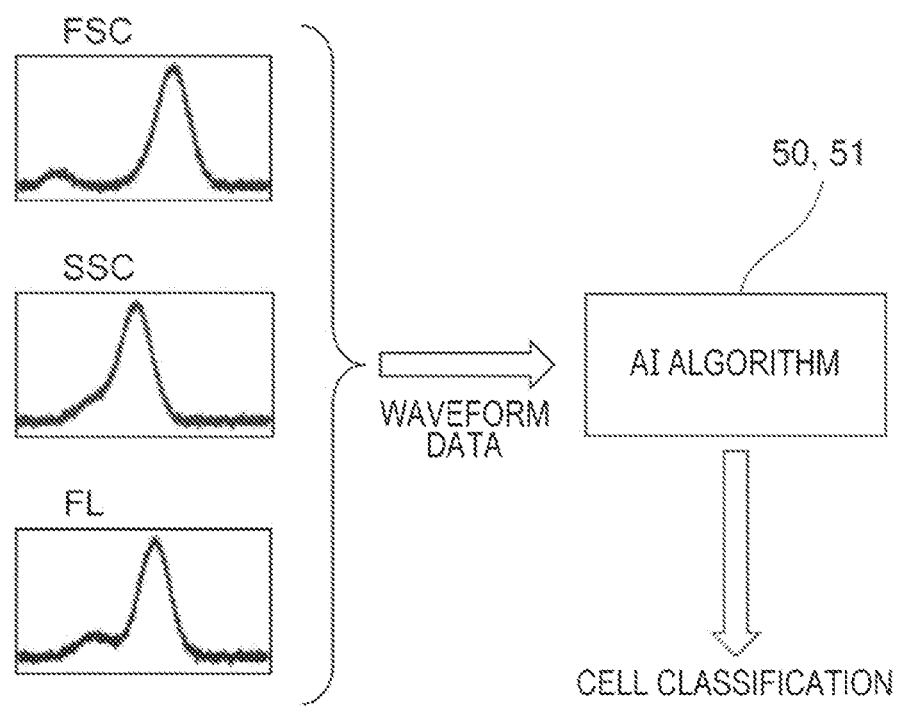
FIG. 36 is a conceptual diagram showing an analysis method according to a fourth embodiment of the present invention.

As in the example shown in FIG. 36, data acquired by the measurement unit 402 (hereinafter, it may be referred to as "waveform data") is input to the AI algorithm 50 (or 60). The AI algorithm classifies the type of cell corresponding to the input data by processing the input data. When the measurement sample is irradiated with light of a single wavelength, only data corresponding to light of a single wavelength can be obtained as data obtained for a certain cell in the measurement sample. When the measurement sample is irradiated with light of a plurality of wavelengths, a plurality of types of data corresponding to light of a plurality of wavelengths are obtained as data obtained for a certain cell in the measurement sample. Therefore, in the case of irradiating the measurement sample with light of a plurality of wavelengths, the amount of data input to the AI algorithm increases as compared with the case of irradiating the measurement sample with light of a single wavelength. As the amount of data input to the AI algorithm increases, cell classification accuracy by the AI algorithm increases.

A method of generating training data 75 (see FIG. 40) and a method for analyzing the waveform data will be described using the examples shown in FIGS. 37 to 40. Hereinafter, a case where the FCM detection section 460 having the configuration of FIG. 7 is used will be described as an example.

<Waveform Data>

Figure 37:
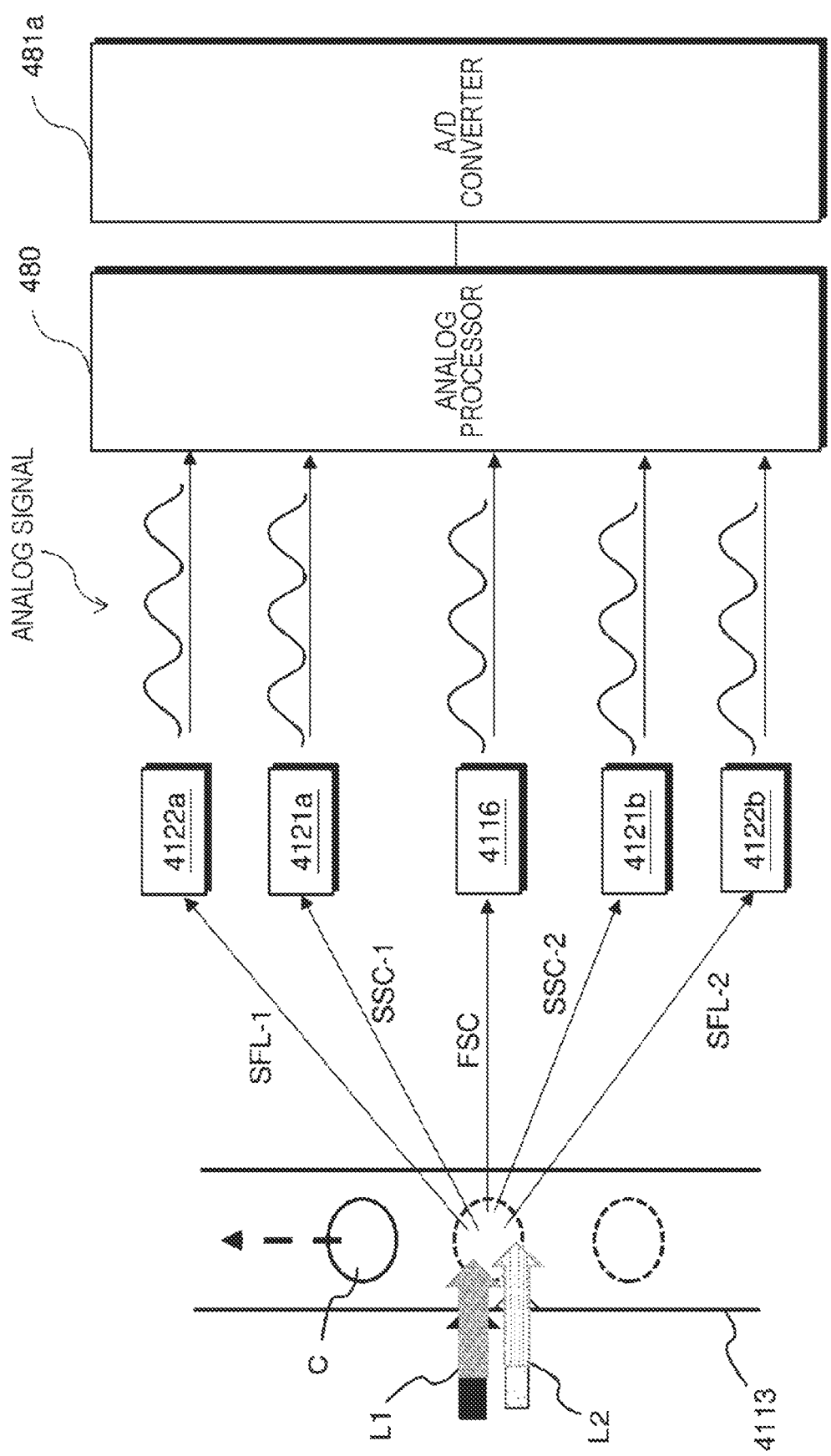
FIG. 37 is a schematic diagram for explaining waveform data used in the analysis method of the fourth embodiment.

FIG. 37 is a schematic diagram for explaining waveform data used in the present analysis method (fourth embodiment). As shown in FIG. 37, when a specimen containing a cell (component) C is flown in a flow cell FC and the cell C flowing through the flow cell FC is irradiated with light L1 of the first wavelength and light L2 of the second wavelength, forward scattered light (FSC) is generated forward with respect to the traveling direction of the light. First side scattered light (SSC-1) corresponding to the light of the first wavelength and first side fluorescent light (SFL-1) excited by the light of the first wavelength are generated laterally with respect to the traveling direction of the light. Second side scattered light (SSC-2) corresponding to the light of the second wavelength and second side fluorescent light (SFL-2) excited by the light of the second wavelength are generated laterally with respect to the traveling direction of the light.

The forward scattered light (FSC) is received by the forward scattered light receiving element 4116, and a signal corresponding to the amount of received light is output. The first side scattered light (SSC-1) is received by the side scattered light receiving element 4121*a*, and a signal corresponding to the amount of received light is output. The first side fluorescent light (SFL-1) is received by the side fluorescent light receiving element 4122*a*, and a signal corresponding to the amount of received light is output. The second side scattered light (SSC-2) is received by the side scattered light receiving element 4121*b*, and a signal corresponding to the amount of received light is output. The second side fluorescent light (SFL-2) is received by the side fluorescent light receiving element 4122*b*, and a signal corresponding to the amount of received light is output. As a result, an analog signal representing a change in the signal with the lapse of time is output from each light receiving element. An analog signal corresponding to the forward scattered light (FSC-1) is referred to as a "forward scattered light signal", an analog signal corresponding to the first side scattered light (SSC-1) is referred to as a "first side scattered light signal", an analog signal corresponding to the first side fluorescent light (SFL-1) is referred to as a "first fluorescence signal", an analog signal corresponding to the second side scattered light (SSC-2) is referred to as a "second side scattered light signal", and an analog signal corresponding to the second side fluorescent light (SFL-2) is referred to as a "second fluorescence signal". One pulse of each analog signal corresponds to one component (for example, one cell).

Figure 38:
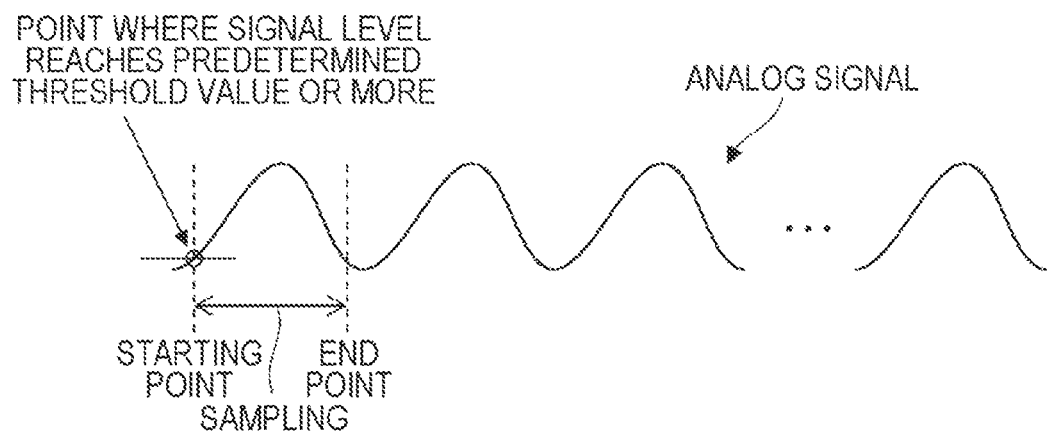
FIG. 38 is a diagram schematically showing conversion into a digital signal by an A/D converter in the analysis method of the fourth embodiment.

The analog signal is input to the A/D converter 481*a* (see FIG. 37) via the analog processor 480. The analog signal is converted into a digital signal. FIG. 38 is a diagram schematically showing conversion into a digital signal by the A/D converter. In order to simplify the description, the analog signal is directly input to the A/D converter 481*a*. As shown in FIG. 38, the A/D converter 481*a* samples the forward scattered light signal, the first side scattered light signal, the first side fluorescence signal, the second side scattered light signal and the second side fluorescence signal starting from a time point when the level of the forward scattered light signal reaches a level set as a predetermined threshold value among the analog signals input from each light receiving element. The A/D converter 481*a* samples each analog signal at a predetermined sampling rate (for example, sampling at 1024 points at intervals of 10 nanoseconds, sampling at 128 points at intervals of 80 nanoseconds, sampling at 64 points at intervals of 160 nanoseconds, or the like).

Figure 39:
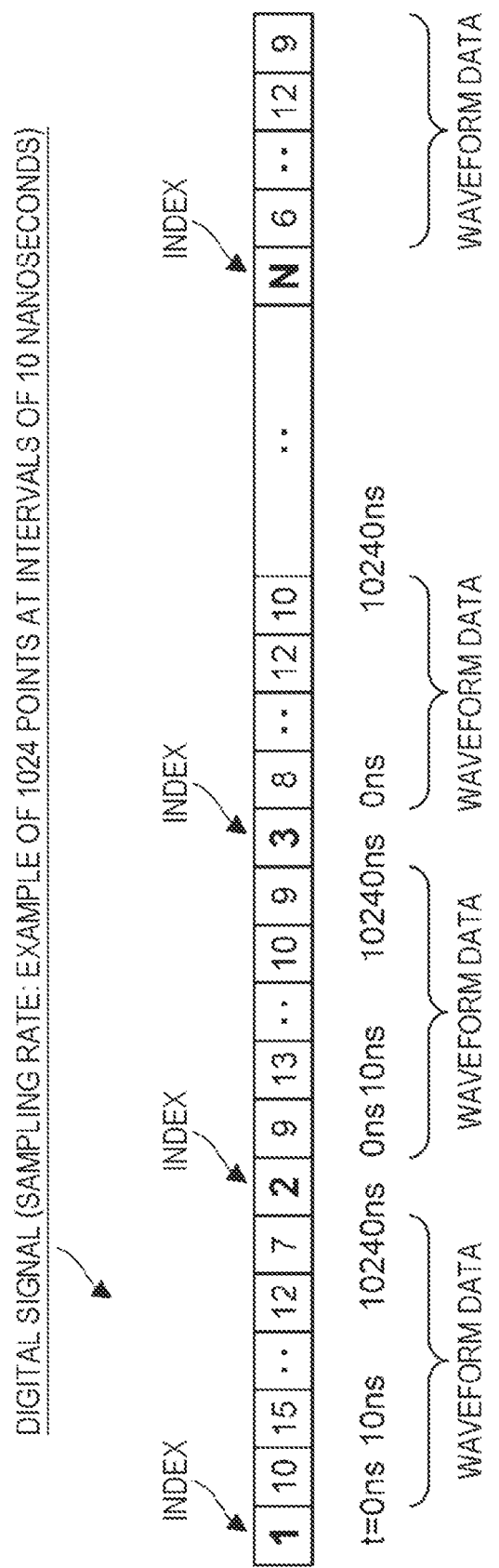
FIG. 39 is a diagram schematically showing waveform data obtained by sampling in the analysis method of the fourth embodiment.

FIG. 39 is a diagram schematically showing waveform data obtained by sampling. By sampling, as waveform data corresponding to one component, matrix data (which may be referred to as one-dimensional "array data") in which values digitally indicating analog signal levels at a plurality of time points are used as elements is obtained. In this manner, the A/D converter 481*a* generates a digital signal of the forward scattered light, a digital signal of the first side scattered light, a digital signal of the first side fluorescent light, a digital signal of the second side scattered light, and a digital signal of the second side fluorescent light corresponding to one component. The A/D conversion is repeated until the number of digitally signalized cells reaches a predetermined number or until a predetermined time has elapsed since the specimen started to flow into the flow cell 4113. As a result, as shown in FIG. 39, a digital signal including waveform data of N components (cells C) contained in one specimen is obtained. A set of sampling data (in the example of FIG. 39, a set of 1024 digital values every 10 nanoseconds from t=0 ns to t=10240 ns) for each component may be referred to as waveform data, and a set of waveform data obtained from one specimen may be referred to as a digital signal. Since the waveform data is acquired by irradiating the flow cell 4113 with light of a plurality of wavelengths, a plurality of waveform data corresponding to each wavelength is acquired. For example, in the example shown in FIG. 37, waveform data each corresponding to the first side scattered light and the first side fluorescent light corresponding to the light of the first wavelength (for example, 405 nm), and waveform data each corresponding to the forward scattered light, the second side scattered light and the second side fluorescent light corresponding to the light of the second wavelength (for example, 638 nm) are acquired. Side fluorescent light corresponding to the light of the first wavelength is acquired based on the first fluorescent dye, and side fluorescent light corresponding to the light of the second wavelength is acquired based on the second fluorescent dye.

Each waveform data generated by the A/D converter 481*a* may be given an index for identifying each component. For example, an integer of 1 to N is assigned to the index in the order of the generated waveform data, and the same index is assigned to the waveform data of the forward scattered light, the waveform data of the first/second side scattered light, and the waveform data of the first/second side fluorescent light obtained from the same component. Since each waveform data corresponds to one component, the index corresponds to the measured component. By assigning the same index to the waveform data corresponding to the same component, a deep learning algorithm to be described later can analyze the waveform data of the forward scattered light, the waveform data of the first/second side scattered light, and the waveform data of the first/second fluorescence corresponding to each component as one set to classify the type of the component.

<Generation of Training Data>

Figure 40:
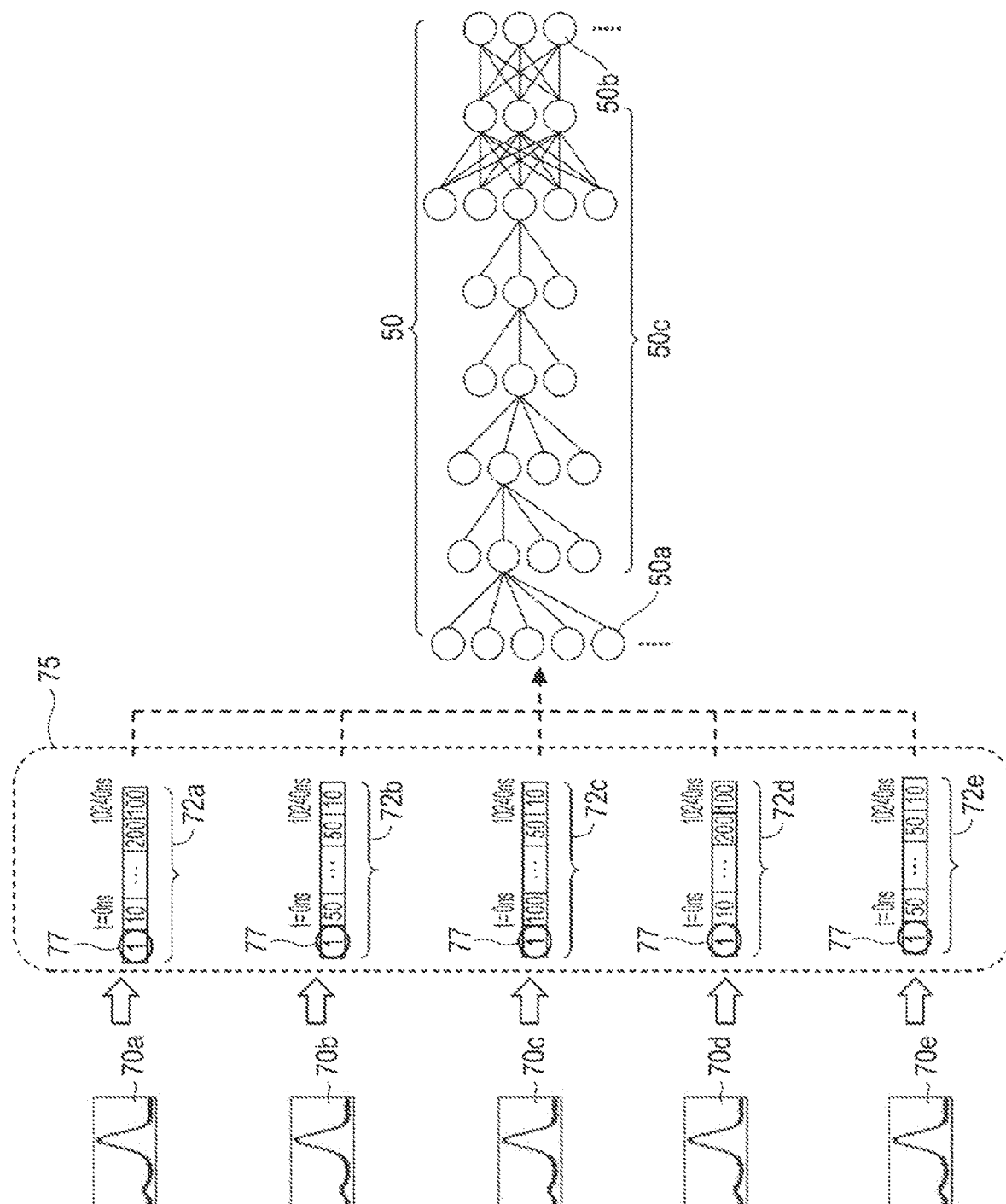
FIG. 40 is a schematic diagram showing an example of a method of generating training data used for training a deep learning algorithm for determining the type of a component in a specimen in the analysis method of the fourth embodiment.

FIG. 40 is a schematic diagram showing an example of a method of generating training data used for training a deep learning algorithm for determining the type of a component in a specimen. As shown in FIG. 40, the training data 75 is waveform data generated on the basis of an analog signal 70*a* of the forward scattered light (FSC), an analog signal 70*b* of the first side scattered light (SSC-1), an analog signal 70*c* of the first side fluorescent light (SFL-1), an analog signal 70*d* of the second side scattered light (SSC-2), and an analog signal 70*e* of the first side fluorescent light (SFL-2) obtained for the component in the specimen by measuring the specimen by a flow cytometer (measurement unit 400, see FIG. 7). The waveform data acquisition method is as described above.

As the training data 75, for example, waveform data of a component determined to be a specific type with a high possibility as a result of measuring the specimen by the flow cytometer and analyzing components contained in the specimen by calculation processing can be used. Hereinafter, an example of using the analysis system 4000 (see FIG. 4) as a blood cell counter that analyzes a blood specimen will be described. The blood specimen is measured by a flow cytometer (measurement unit 400), and waveform data of forward scattered light, first/second side scattered light, and first/second side fluorescent light of individual components contained in the specimen is accumulated. The cells in the specimen are classified into populations of neutrophils, lymphocytes, monocytes, eosinophils, basophils, immature granulocytes, and abnormal cells based on the first/second side scattered light intensities (pulse height of the side scattered light signal) and the first/second side fluorescence intensities (pulse height of the side fluorescence signal). The training data 75 is obtained by assigning a label value corresponding to the classified cell type to the waveform data of the cell. For example, the training data 75 can be obtained by determining the mode value, average value, or median value of the side scattered light intensity and the side fluorescence intensity of cells included in the neutrophil population, identifying representative cells on the basis of these values, and giving the label value "1" corresponding to the neutrophil to the waveform data of these cells. The method for generating the training data is not limited thereto, and for example, the training data may be obtained by collecting only a specific cell by a cell sorter, measuring the cell by the flow cytometer, and giving a label value of the cell to the obtained waveform data.

The analog signals 70a to 70e indicates a forward scattered light signal, first/second side scattered light signals, and first/second side fluorescence signals when neutrophils are measured by the flow cytometer, respectively. When these analog signals are A/D-converted as described above, waveform data 72a of the forward scattered light signal, waveform data 72b of the first side scattered light signal, waveform data 72c of the first side fluorescence signal, waveform data 72d of the second side scattered light signal, and waveform data 72e of the second side fluorescence signal are obtained. Adjacent cells in each of the waveform data 72a to 72e store signal levels at intervals corresponding to the sampling rate, for example, at intervals of 10 nanoseconds. Each of the waveform data 72a to 72e is combined with a label value 77 representing the type of the cell from which the data is based, and is input to the deep learning algorithm (neural network 50) as the training data 75 such that five waveform data corresponding to each cell, in other words, five signal intensities (signal intensity of forward scattered light, signal intensities of first/second side scattered light, and signal intensities of first/second side fluorescent light) data form a set. In the example of FIG. 40, since the cell on which the training data 75 is based is a neutrophil, "1" is assigned to each of the waveform data 72a to 72e as the label value 77 indicating a neutrophil, and the training data 75 is generated. FIG. 41 shows an example of the label value 77. Since the training data 75 is generated for each cell type, the label value 77 different according to the cell type is assigned.

<Overview of Deep Learning>

An outline of training of the neural network will be described with reference to FIG. 40 as an example. The neural network 50 is, for example, a convolutional neural network having a convolution layer. The number of nodes of an input layer 50a in the neural network 50 corresponds to the number of elements of an array included in the waveform data of the training data 75 to be input. The number of elements of the array is equal to the sum of the number of elements of the waveform data 72a to 72e of the forward scattered light, the first/second side scattered light, and the first/second side fluorescent light corresponding to one component. In the example of FIG. 40, each of the waveform data 72a to 72e includes 1024 elements. Therefore, the number of nodes of the input layer 50a is 1024×5=5120.

Each of the waveform data 72a to 72e is input to the input layer 50a of the neural network 50. The label value 77 of each waveform data of the training data 75 is input to an output layer 50b of the neural network to train the neural network 50. Reference numeral 50c in FIG. 40 denotes an intermediate layer.

<Method for Analyzing Waveform Data>

Figure 42:
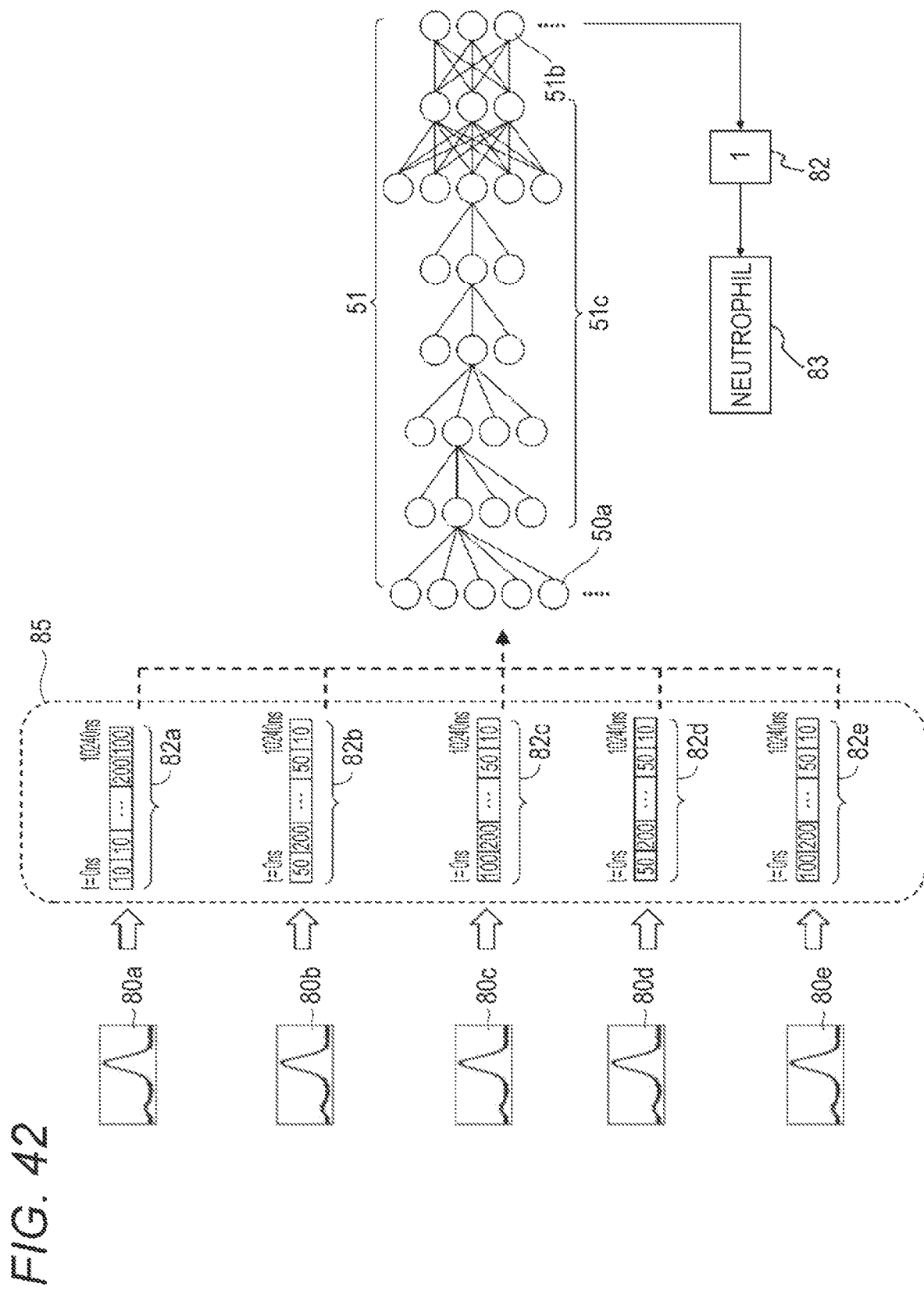
FIG. 42 is a schematic diagram showing an example of a method for analyzing waveform data of the component in a specimen in the analysis method of the fourth embodiment.

FIG. 42 shows an example of a method for analyzing waveform data of a component in a specimen. In the method for analyzing waveform data shown in FIG. 42, analysis data 85 including waveform data obtained by the above-described method is generated from an analog signal 80a of forward scattered light, an analog signal 80b of the first side scattered light, an analog signal 80c of the first side fluorescent light, an analog signal 80d of the second side scattered light, and an analog signal 80e of the second side fluorescent light acquired by a flow cytometer (measurement unit 400, see FIG. 7) from the component to be analyzed. Since waveform data is acquired by irradiating the flow cell 4113 (see FIG. 37) with light of a plurality of wavelengths, a plurality of pieces of waveform data corresponding to each wavelength is acquired. For example, waveform data each corresponding to the first side scattered light and the first side fluorescent light corresponding to the light of the first wavelength (for example, 405 nm), and waveform data each corresponding to the forward scattered light, the second side scattered light and the second side fluorescent light corresponding to the light of the second wavelength (for example, 638 nm) are acquired. Side fluorescent light corresponding to the light of the first wavelength is acquired based on the first fluorescent dye, and side fluorescent light corresponding to the light of the second wavelength is acquired based on the second fluorescent dye.

It is preferable to make acquisition conditions of the analysis data 85 and the training data 75 the same. The acquisition conditions include conditions for measuring the component in the specimen by the flow cytometer, for example, preparation conditions of the measurement sample, a flow rate when the measurement sample is flown through a flow cell, intensity of light irradiated to the flow cell, an amplification factor (gain) of a light receiving element that receives scattered light and fluorescence, and the like. The acquisition conditions further include a sampling rate when the analog signal is A/D converted.

When the component to be analyzed flows through the flow cell 4113, the analog signal 80a of forward scattered light, the analog signal 80b of first side scattered light, the analog signal 80c of first side fluorescent light, the analog signal 80d of second side scattered light, and the analog signal 80e of second side fluorescent light are obtained. When these analog signals 80a to 80e are A/D-converted as described above, a time point at which the signal intensity is acquired is synchronized for each component, and waveform data 82a of the forward scattered light signal, waveform data 82b of the first side scattered light signal, waveform data 82c of the first side fluorescence signal, waveform data 82d of the second side scattered light signal, and waveform data 82e of the second side fluorescence signal are obtained. Each of the waveform data 82a to 82e is combined such that signal intensity (signal intensity of forward scattered light, signal intensities of first/second side scattered light, and signal intensities of first/second side fluorescent light) data of each component forms a set, and is input to the deep learning algorithm 51 as the analysis data 85. In the example of FIG. 42, a data set including five waveform data of waveform data 82a, 82b, 82c, 82d, and 82e is input.

When the analysis data 85 is input to an input layer 51*a* of the neural network 50 constituting the trained deep learning algorithm 51, an analysis result 83 is output from an output layer 51*b* as classification information regarding the type of the component corresponding to the analysis data 85. Reference numeral 51*c* in FIG. 42 denotes an intermediate layer. The classification information regarding the type of the component is, for example, a probability that each component belongs to each of a plurality of cell types. It is determined that the component of the analysis target for which the analysis data 85 is acquired belongs to a classification having the highest value among the probabilities, and a label value 82 or the like that is an identifier indicating the type may be included in the analysis result 83. The analysis result 83 may be data in which the label value is replaced with information (for example, a character string) indicating the type, in addition to the label value itself. FIG. 42 shows an example in which, on the basis of the analysis data 85, the deep learning algorithm 51 outputs a label value "1" to which a probability that the component to be analyzed for which the analysis data 85 is acquired belongs was the highest, and character data "neutrophil" corresponding to the label value is further output as the analysis result 83. The output of the label value may be performed by the deep learning algorithm 51, but another computer program may output the most preferable label value on the basis of the probability calculated by the deep learning algorithm 51.

Figure 43:
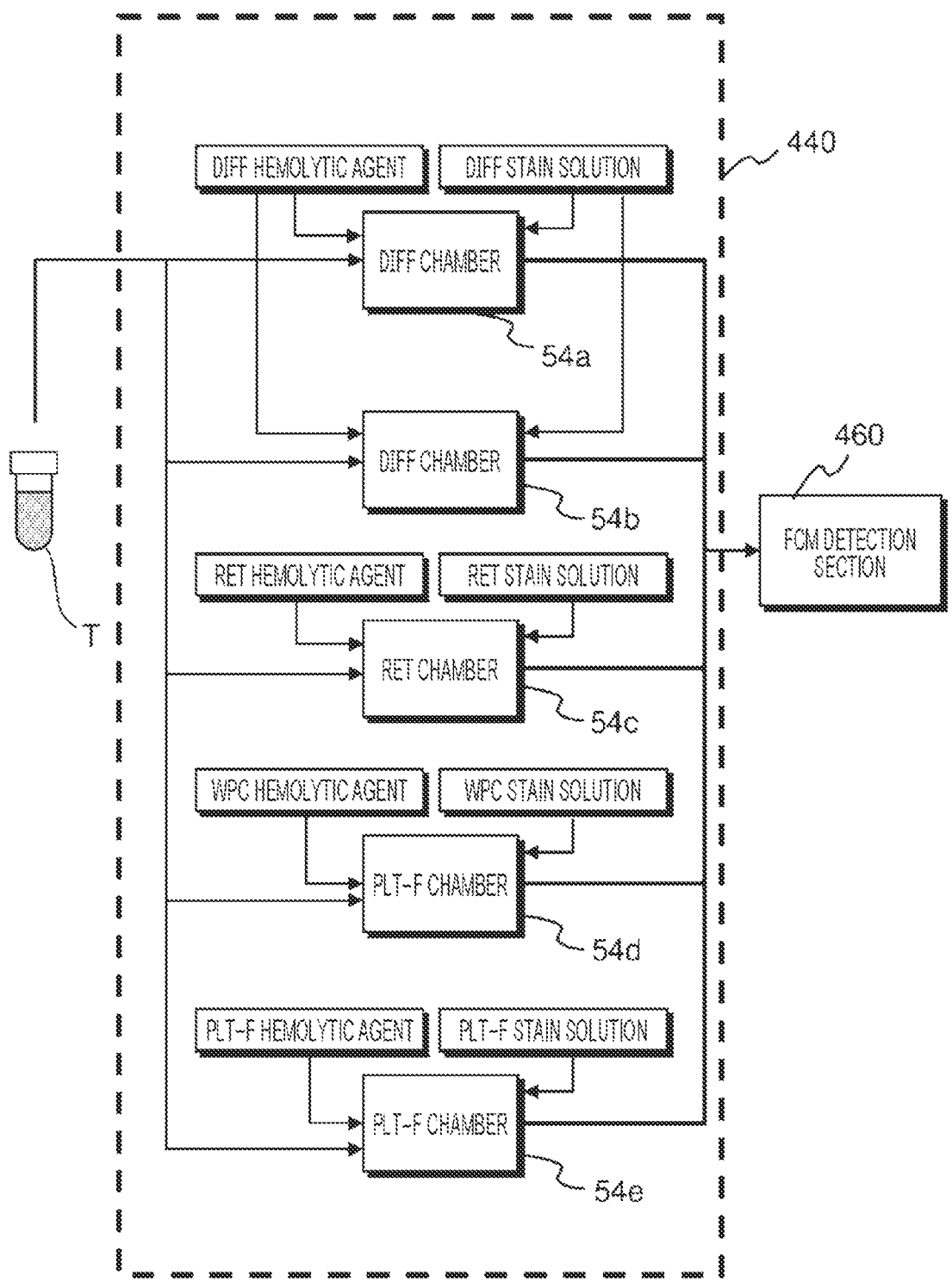
FIG. 43 is a block diagram showing a configuration example of another sample preparation section having a configuration different from that of the sample preparation section shown in FIG. 12.

FIG. 43 shows a configuration example of another sample preparation section 441 different from the sample preparation section 440 shown in FIG. 12. In FIG. 43, the same elements as those in FIG. 12 are denoted by the same reference numerals.

The example of FIG. 43 shows that the configuration of the measurement channel of the sample preparation section 440 can be changed by executing analysis using the deep learning algorithm (AI algorithm). In the example of FIG. 43, the measurement channel (WNR) for counting white blood cells, counting nucleated red blood cells, and counting basophils is replaced with a measurement channel (WDF) for performing classification of white blood cells. That is, in the example of FIG. 43, the WNR channel is replaced with the WDF channel, so that the measurement unit 400 (see FIG. 7) includes a plurality of WDF channels. In the case of this example, counting of white blood cells, counting of nucleated red blood cells, and counting of basophils, which are measurement items of the WNR channel, are obtained by analyzing waveform data obtained by measurement using the WDF channel by the AI algorithm 51. For example, as white blood cells, nucleated red blood cells, and basophils can be classified from the waveform data obtained by measurement using the WDF channel, white blood cells, nucleated red blood cells, and basophils can be classified from the waveform data of the WDF channel by causing the AI algorithm 51 to learn. For example, by causing the AI algorithm 51 to learn data corresponding to white blood cells, nucleated red blood cells, and basophils among the waveform data obtained by the measurement of the WDF channel as the training data, the AI algorithm 51 capable of classifying white blood cells, nucleated red blood cells, and basophils is generated from the waveform data measured by the WDF channel. In the configuration example of FIG. 43, for example, measurements for different specimens are performed in parallel in a plurality of WDF channels. For example, sample preparation of different specimens is performed in parallel in each chamber of the plurality of WDF channels.

As shown in FIG. 43, by substituting the analysis of the predetermined measurement channel with the AI analysis of data by another measurement channel, the predetermined measurement channel can be replaced with another measurement channel. As a result, the number of measurement channels to be added can be increased without increasing the total number of measurement channels provided in the analysis system 4002 (see FIG. 7). In the example of FIG. 43, by replacing the WNR channel with the WDF channel, it is possible to increase the number of WDF channels without increasing the total number of measurement channels provided in the analysis system 4002. As the number of WDF channels increases, different specimens can be measured in parallel in each of the plurality of WDF channels. Parallel measurement improves throughput of measurement using the WDF channel. According to the example of FIG. 43, a remarkable effect that throughput of specimen processing can also be improved is obtained.

For an example of replacing a measurement channel with another measurement channel by utilizing an AI algorithm, it is required to analyze measurement items (in the example of FIG. 12, nucleated red blood cells and basophils in the WNR channel) of a measurement channel to be replaced based on data measured with another measurement channel (in the example of FIG. 12, the WDF channel). By analyzing the data measured by another measurement channel by the AI algorithm, the measurement items of the measurement channel to be replaced can be classified. In the present embodiment, a plurality of types of optical signals each corresponding to light of a plurality of wavelengths is analyzed by the AI algorithm. By increasing the amount of information using data each corresponding to light of a plurality of wavelengths, analysis accuracy by AI is improved. With the improvement of analysis accuracy, it is possible to classify the measurement items (in the example of FIG. 12, nucleated red blood cells and basophils in the WNR channel) of the measurement channel to be replaced even if the data is of another measurement channel (for example, the WDF channel).

In the analysis method (first example) in the example of FIG. 43, for example, not only classification and counting of nucleated red blood cells (NRBCs) and classification and counting of basophils (BASOs) but also classification (eosinophils, neutrophils, lymphocytes, monocytes) and counting of white blood cells other than BASOs are performed by AI analysis of waveform data obtained by measurement using the WDF channel. In the case of this example, the AI algorithm 51 is learned so that white blood cells other than NRBCs, BASOs and BASOs (eosinophils, neutrophils, lymphocytes, monocytes) can be classified by waveform data. By using the AI algorithm 51, the WNR channel can be replaced with the WDF channel. These analyses are performed by the analysis unit 302X (see FIG. 7) as follows.

Figure 44:
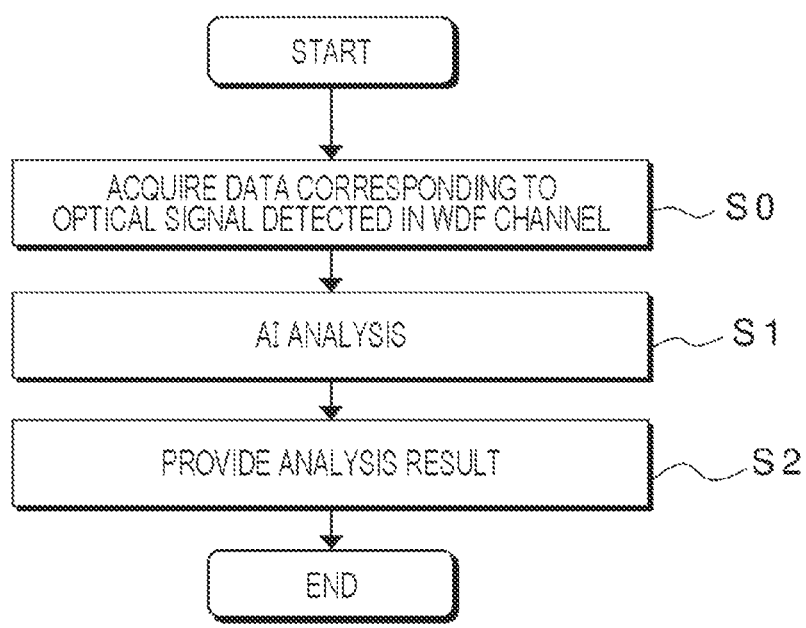
FIG. 44 is a flowchart showing a first operation example of the present analysis method.

FIG. 44 is a flowchart showing an operation example (first operation example) of the present analysis method. As shown in FIG. 44, in the first operation example, the analysis unit 302X (see FIG. 7) acquires data corresponding to the optical signal detected in the WDF channel (step S0). Next, the analysis unit 302X analyzes the present data by the AI algorithm 51 (step S1). The analysis unit 302X also classifies basophils and nucleated red blood cells analyzed in the WDF channel in addition to the classification of monocytes, lymphocytes, neutrophils, and eosinophils by analyzing data obtained by measurement using the WDF channel by the AI algorithm 51. Next, the analysis unit 302X provides an analysis result of the data of the WDF channel (step S2).

Figure 45:
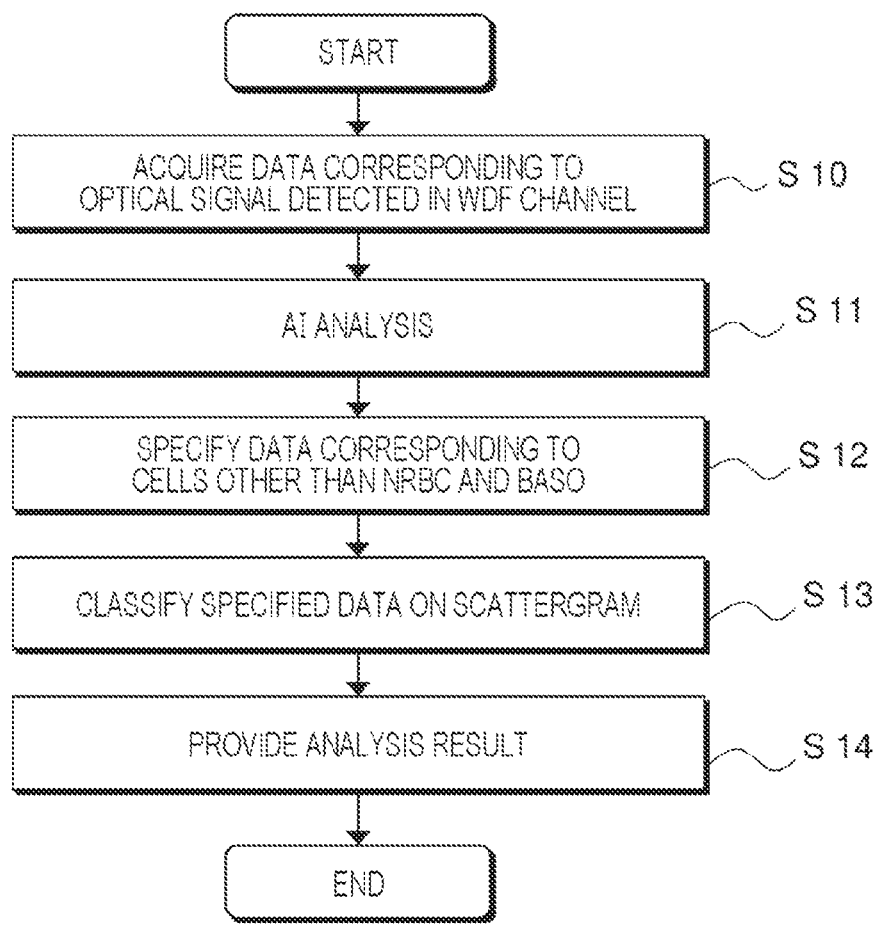
FIG. 45 is a flowchart showing a second operation example of the present analysis method.

In another example (second operation example) of the analysis method shown in FIG. 45, for example, classification and counting of NRBCs and classification and counting of BASOs are performed by AI analysis of waveform data obtained by measurement using the WDF channel. In the AI algorithm 51, waveform data corresponding to cells that have not been classified into NRBCs or BASOs is analyzed by scattergram, and classification and counting of eosinophils, neutrophils, lymphocytes, and monocytes are performed. In the case of this example, the AI algorithm 51 is learned, for example, to perform classification of NRBCs, BASOs, and others from the waveform data. By the AI algorithm 51 of this example, waveform data corresponding to cells classified other than NRBCs and BASOs is analyzed by the scattergram. For example, peak values of waveform data corresponding to cells classified as other than NRBCs and BASOs are extracted, and the cell type is classified based on a two-dimensional graph generated from a peak value corresponding to the side fluorescence signal and a peak value corresponding to the side scattered light. For example, the cells are classified into eosinophils, neutrophils, lymphocytes, monocytes, or others, based on the scattergram. Cells classified as other than eosinophils, neutrophils, lymphocytes, and monocytes in the analysis based on the scattergram are classified, for example, as "debris". These analyses are performed by the analysis unit 302X (see FIG. 7) as follows.

FIG. 45 is another flowchart showing an operation example (second operation example) of the present analysis method. As shown in FIG. 45, the analysis unit 302X acquires data corresponding to the optical signal detected in the WDF channel (step S10). Next, the analysis unit 302X analyzes the present data by the AI algorithm 51 (step S11). Next, the analysis unit 302X specifies data corresponding to cells other than NRBCs and BASOs (step S12). Next, the analysis unit 302X analyzes the specified data on the scattergram (step S13). Next, the analysis unit 302X provides an analysis result of the data of the WDF channel (step S14).

Figure 46:
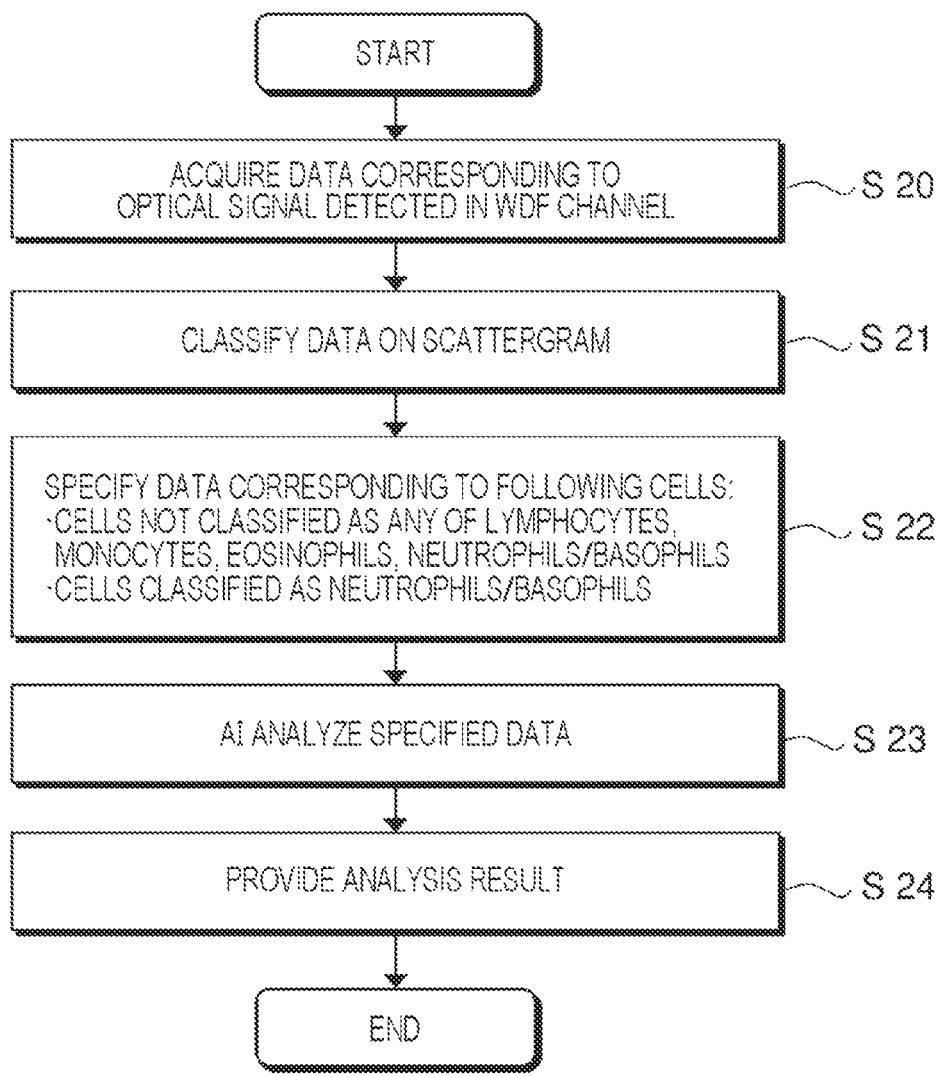
FIG. 46 is a flowchart showing a third operation example of the present analysis method.

In still another example (third example) of the analysis method shown in FIG. 46, for example, classification and counting of lymphocytes, classification and counting of monocytes, classification and counting of eosinophils, and classification and counting of neutrophils/basophils are executed by scattergram analysis of waveform data obtained by measurement using the WDF channel. In the classification and counting of neutrophils/basophils, for example, cells classified as either neutrophils or basophils are counted. Waveform data corresponding to cells that were not classified as any of lymphocytes, monocytes, eosinophils, neutrophils/basophils, and cells classified as any of neutrophils and basophils is analyzed by the AI algorithm 51 (see FIG. 42). For example, waveform data is classified by the AI algorithm 51 into NRBCs, basophils (BASOs), and others. For example, the counting of cells classified as BASOs by an AI algorithm 60 is subtracted from the counting result of cells classified as either neutrophils or basophils by the scattergram analysis, and each of the counting of neutrophils and the counting of basophils is calculated. Cells that are not classified as either NRBCs or BASOs by the AI analysis are classified, for example, as "debris". These analyses are performed by the analysis unit 302X (see FIG. 7) as follows.

FIG. 46 is a flowchart showing an operation example (third operation example) of the present analysis method. As shown in FIG. 46, the analysis unit 302X acquires data corresponding to the optical signal detected in the WDF channel (step S20). Next, the analysis unit 302X analyzes the present data on the scattergram (step S21). Next, the analysis unit 302X specifies data corresponding to (1) cells that were not classified as any of lymphocytes, monocytes, eosinophils, neutrophils/basophils, and (2) cells that were classified as neutrophils/basophils (step S22). Next, the analysis unit 302X analyzes the specified data by the AI algorithm 60 (step S23). Next, the analysis unit 302X provides an analysis result of the data of the WDF channel (step S24).

Fifth Embodiment

A fifth embodiment discloses a specimen analysis method including, in a specimen analysis system (including the analysis systems of the first to fourth embodiments) including a host processor and a parallel processing processor, acquiring data on each of components in a specimen under control of the host processor, executing parallel processing on the data by the parallel processing processor, and generating information on a type of each of the components based on the result of the parallel processing.

According to the present embodiment, even when a huge volume of data ranging from several hundred megabytes to several gigabytes per specimen is analyzed, processing related to measured data can be executed in parallel by a parallel processing processor provided separately from the host processor. Therefore, for example, even when the huge volume of data is processed by the deep learning algorithm, the processing of the data is completed in the specimen analysis system. For example, it is not necessary to transmit data to the analysis server storing the deep learning algorithm via the Internet or an intranet. Therefore, according to the present embodiment, it is not necessary to transmit a large volume of data from the specimen analysis system to the analysis server and acquire the analysis result returned from the analysis server, and it is possible to maintain the processing capacity of the specimen analysis system while improving classification accuracy of the component in the specimen.

Figure 47:
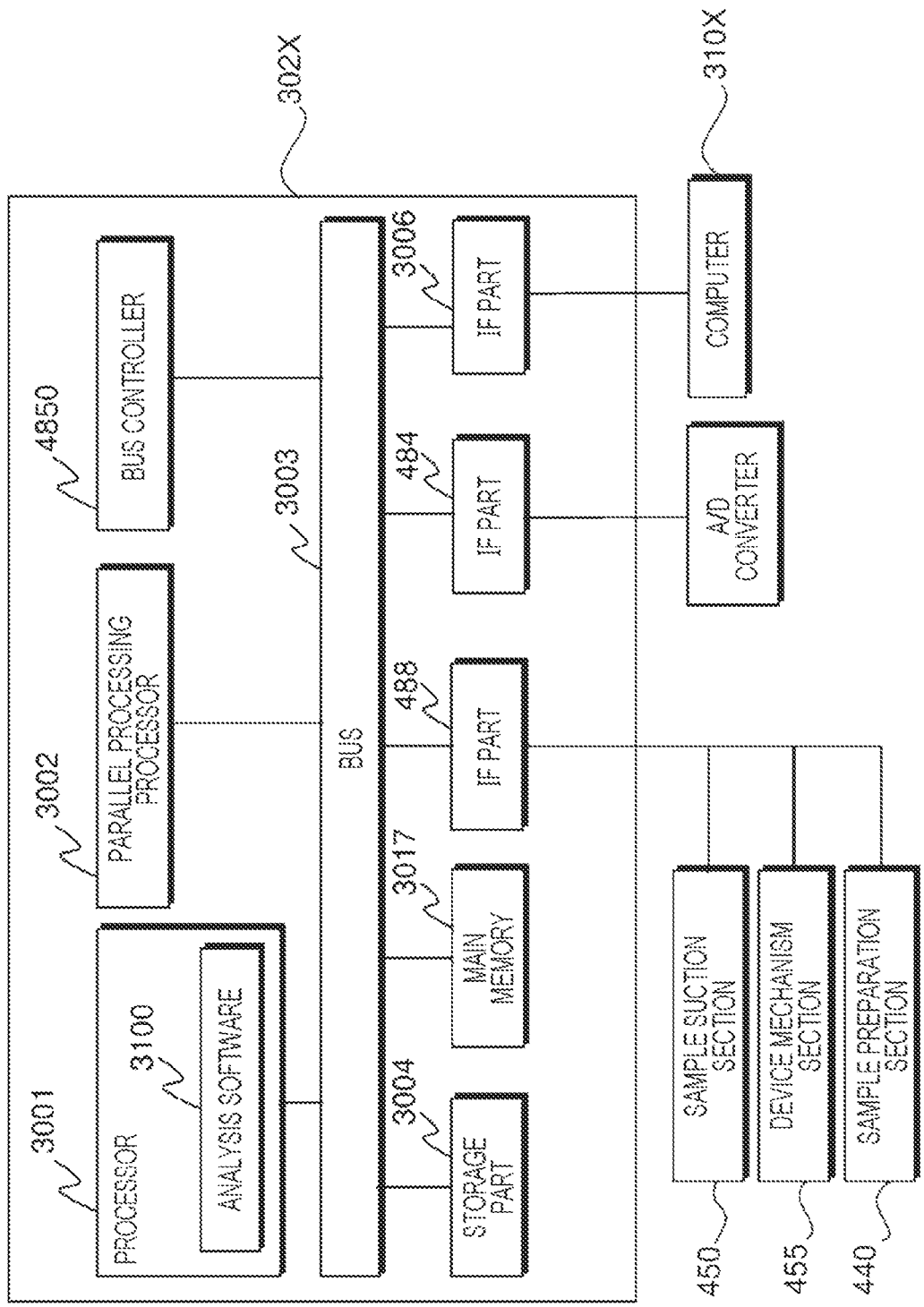
FIG. 47 is a block diagram showing a configuration example of a fifth embodiment.

FIG. 47 shows a configuration example of the present embodiment. In FIG. 47, the same elements as those in FIG. 10 are denoted by the same reference numerals. The analysis unit 303X in FIG. 47 includes a parallel processing processor capable of processing arithmetic processing by the AI algorithm instead of a master processor. By using a parallel processing processor suitable for processing of a matrix operation executed by the AI algorithm (for example, deep learning algorithm), a turn around time (TAT) required for AI analysis is improved. In the following description, description of configurations and functions similar to those of the above-described embodiment will be omitted.

The analysis unit 302X shown in FIG. 47 may have a configuration in which the analysis section 301X is provided in the measurement unit 401 as shown in FIG. 11.

The processor 3001 executes analysis processing of waveform data by the deep learning algorithm 60 using a parallel processing processor 3002. That is, the processor 3001 is programmed to execute analysis processing of the waveform data according to the deep learning algorithm 60. An analysis software 3100 for analyzing data corresponding to the component in the specimen based on the deep learning algorithm 60 may be stored in the storage part 3004. In this case, the processor 3001 executes analysis processing of data based on the deep learning algorithm 60 by executing the analysis software 3100 stored in the storage part 3004. In the present embodiment, for example, the AI analysis is executed by the processor 3001 and the parallel processing processor 3002, and a calculation processing analysis is performed by the processor 3001 without using the parallel processing processor 3002. The processor 3001 is, for example, a central processing unit (CPU). For example, Core i9, Core i7 or Core i5 manufactured by Intel Corporation, Ryzen 9, Ryzen 7, Ryzen 5 or Ryzen 3 manufactured by Advanced Micro Devices, Inc or the like may be used as the processor 3001.

The processor 3001 controls the parallel processing processor 3002. The parallel processing processor 3002 executes, for example, parallel processing related to matrix operation according to control by the processor 3001. That is, the processor 3001 is a master processor of the parallel processing processor 3002, and the parallel processing processor 3002 is a slave processor of the processor 3001. The processor 3001 is also referred to as a host processor or a main processor.

The parallel processing processor 3002 executes a plurality of arithmetic processing that is at least a part of processing related to analysis of waveform data in parallel. The parallel processing processor 3002 is, for example, a graphics processing unit (GPU), a field programmable gate array (FPGA), or an application specific integrated circuit (ASIC). When the parallel processing processor 3002 is an FPGA, the parallel processing processor 3002 may be pre-programmed with, for example, arithmetic processing for the trained deep learning algorithm 60. In a case where the parallel processing processor 3002 is an ASIC, the parallel processing processor 3002 may incorporate, for example, a circuit for executing arithmetic processing related to the trained deep learning algorithm 60 in advance, or may include a programmable module in addition to such an embedded circuit. For example, GeForce, Quadro, TITAN or Jetson manufactured by NVIDIA Corporation or the like may be used as the parallel processing processor 3002. In the case of the Jetson series, for example, Jetson Nano, Jetson Tx2, Jetson Xavier or Jetson AGX Xavier is used.

The processor 3001 executes, for example, calculation processing related to control of the measurement unit 402 (see FIG. 7). The processor 3001 executes, for example, calculation processing related to a control signal transmitted and received between the device mechanism section 455, the sample preparation section 440, and the specimen suction mechanism 450. The processor 3001 executes, for example, calculation processing related to transmission and reception of information to and from the computer 310X. The computer 310X has, for example, a function of displaying the analysis result transmitted from the analysis unit 303X based on the processing of the processor 3001. The computer 310X transmits, for example, a measurement order to the analysis unit 303X. The measurement order is input, for example, by the user via an input device of the computer 310X. The measurement order is transmitted, for example, from a host computer to the computer 310X. The processor 3001 executes, for example, processing related to reading of program data from the storage part 3004, expansion of a program to the main memory 3017, and transmission and reception of data to and from the main memory 3017. Each of the above-described processes executed by the processor 3001 is required to be executed, for example, in a predetermined order. For example, when processing required to control the device mechanism section 455, the sample preparation section 440, and the specimen suction mechanism 450 is defined as A, B, and C, it may be required to execute B, A, and C in this order. Since the processor 3001 often executes such sequential processing depending on the order, even if the number of arithmetic units (may be referred to as "processor cores," "cores," or the like) is increased, the processing speed is not necessarily increased.

On the other hand, the parallel processing processor 3002 executes typical and large amount of calculation processing, for example, calculation of matrix data including a large amount of elements. In the present embodiment, the parallel processing processor 3002 executes parallel processing obtained by parallelizing at least a part of processing of analyzing waveform data according to the deep learning algorithm 60. The deep learning algorithm 60 includes, for example, a large number of matrix operations. The deep learning algorithm 60 may include, for example, at least 100 matrix operations and at least 1000 matrix operations. The parallel processing processor 3002 has a plurality of arithmetic units, and each of these arithmetic units can simultaneously perform a matrix operation. That is, the parallel processing processor 3002 can perform the matrix operation by each of the plurality of arithmetic units in parallel as parallel processing. For example, the matrix operation included in the deep learning algorithm 60 can be divided into a plurality of arithmetic processing having no order dependency. The arithmetic processing divided in this manner can be executed in parallel by each of the plurality of arithmetic units. These arithmetic units may be referred to as "processor cores," "cores," or the like.

By executing such parallel processing, the arithmetic processing of the entire measurement unit 402 can be speeded up. Processing such as matrix operation included in the deep learning algorithm 60 may be referred to as, for example, "single instruction multiple data processing (SIMD)". The parallel processing processor 3002 is suitable, for example, for the SIMD operation. Such a parallel processing processor 3002 may be referred to as a vector processor.

As described above, the processor 3001 is suitable for executing diverse and complex processing. Meanwhile, the parallel processing processor 3002 is suitable for executing a standardized large amount of processing in parallel. By executing a standardized large amount of processing in parallel, turn around time (TAT) required for calculation processing is shortened. The target of the parallel processing executed by the parallel processing processor 3002 is not limited to the matrix operation. For example, when the parallel processing processor 3002 executes learning processing according to the deep learning algorithm 50, a differential operation or the like related to the learning processing can be a target of parallel processing.

The number of arithmetic units of the processor 3001 is, for example, dual core (the number of cores: 2), quad core (the number of cores: 4), or octa core (the number of cores: 8). On the other hand, the parallel processing processor 3002 has, for example, at least 10 arithmetic units (the number of cores: 10), and can execute 10 matrix operations in parallel. Some parallel processing processors 3002 include, for example, several tens of arithmetic units. Some parallel processing processors 3002 have at least 100 arithmetic units (the number of cores: 100), for example, and can perform 100 matrix operations in parallel. Some parallel processing processors 3002 have at least 1000 arithmetic units (the number of cores: 1000), for example, and can perform 1000 matrix operations in parallel. Some parallel processing processors 3002 have, for example, several 1000 arithmetic units.

Figure 48:
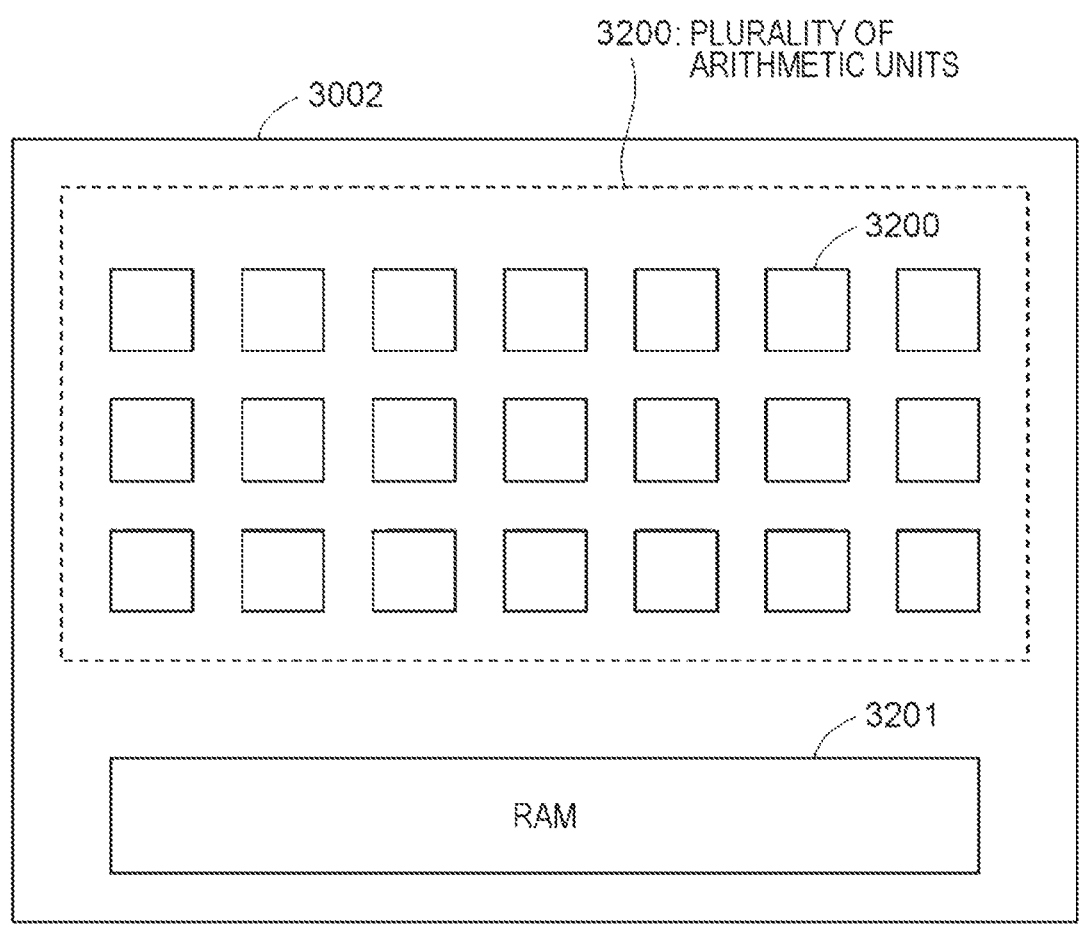
FIG. 48 is a schematic diagram showing a configuration example of a parallel processing processor.

FIG. 48 shows a configuration example of the parallel processing processor 3002. The parallel processing processor 3002 includes a plurality of arithmetic units 3200 and a RAM 3201. Each of the arithmetic units 3200 executes arithmetic processing of matrix data in parallel. The RAM 3201 stores data related to arithmetic processing executed by the arithmetic unit 3200. The RAM 3201 is a memory having a capacity of at least 1 gigabyte. The RAM 3201 may be a memory having a capacity of 2 gigabytes, 4 gigabytes, 6 gigabytes, 8 gigabytes, or 10 gigabytes or more. The arithmetic unit 3200 acquires data from the RAM 3201. The arithmetic unit 3200 executes arithmetic processing. The arithmetic unit 3200 may be referred to as a "processor core", a "core", or the like.

Figure 49:
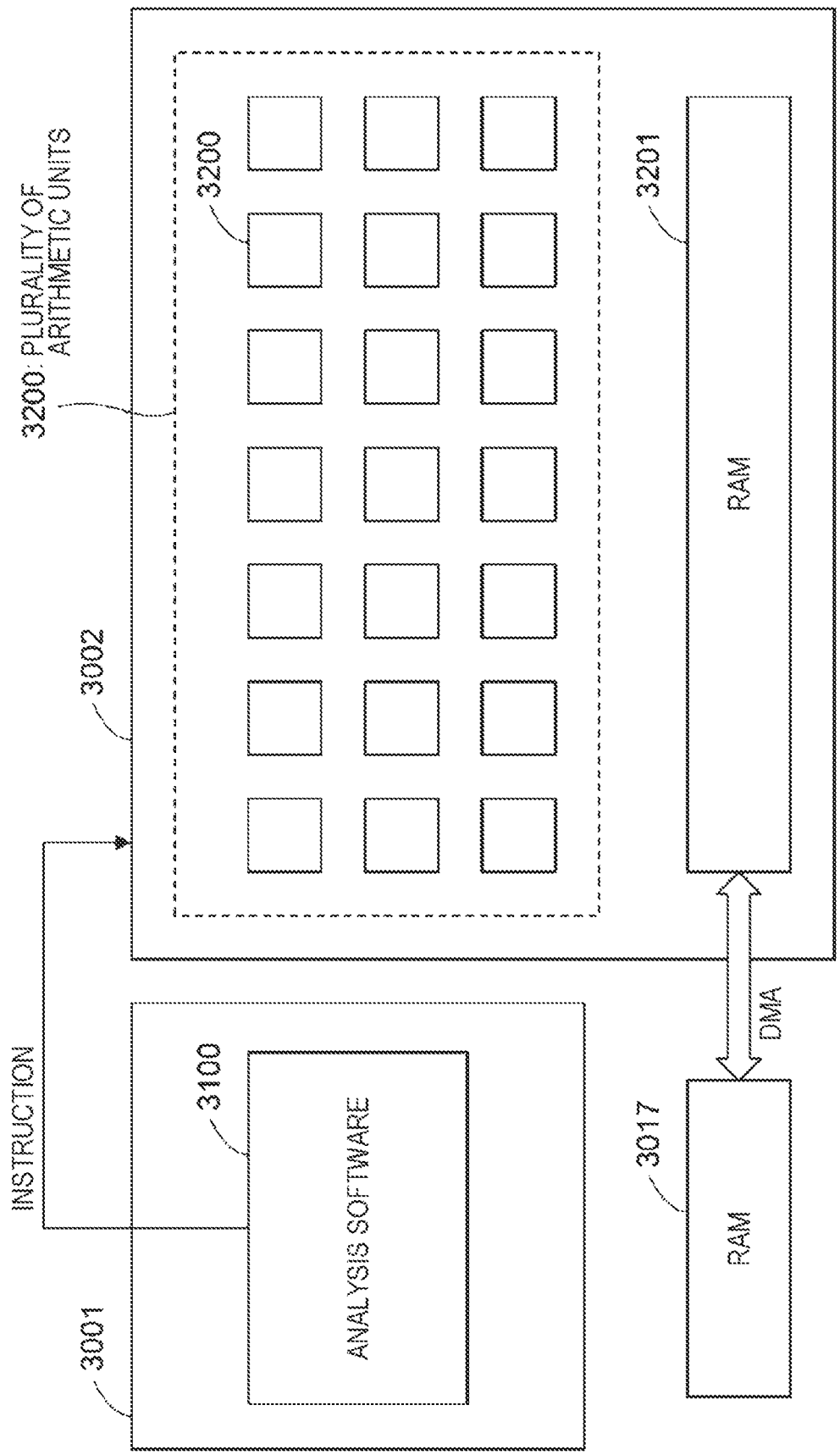
FIG. 49 is a first diagram showing an outline of arithmetic processing executed by the parallel processing processor under control of analysis software operating on the processor.
Figure 51:
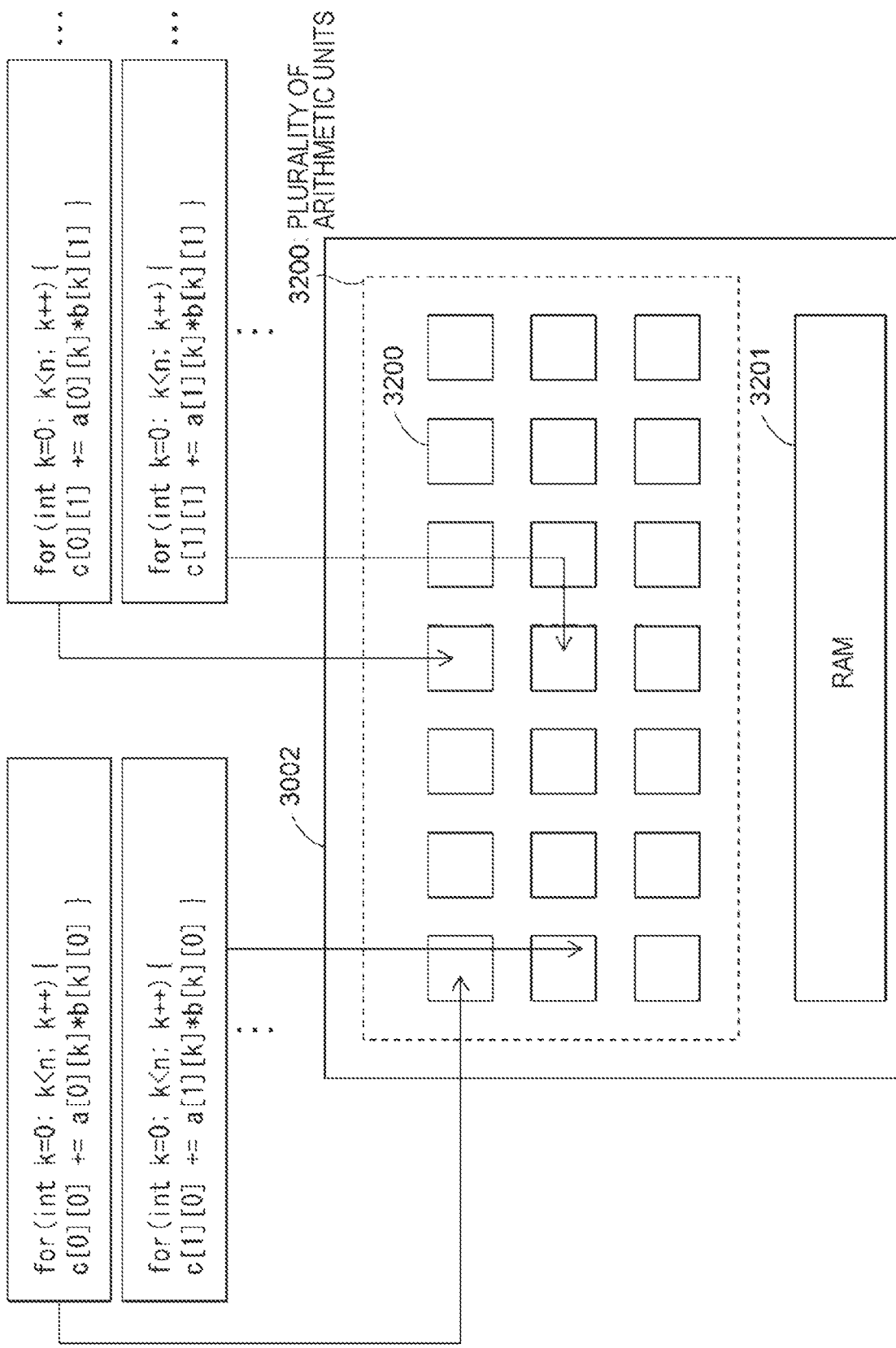
FIG. 51 is a third diagram following FIG. 50.

FIGS. 49, 50, and 51 show an outline of arithmetic processing executed by the parallel processing processor 3002 under control of the analysis software 3100 operating on the processor 3001. FIG. 49 shows a configuration example of the parallel processing processor 3002 that executes arithmetic processing. The parallel processing processor 3002 has the plurality of arithmetic units 3200 and the RAM 3201. The processor 3001 executing the analysis software 3100 instructs the parallel processing processor 3002 to cause the parallel processing processor 3002 to execute at least part of arithmetic processing required when the waveform data is analyzed by the deep learning algorithm 60. The processor 3001 instructs the parallel processing processor 3002 to execute arithmetic processing related to analysis of waveform data based on the deep learning algorithm 60. All or at least a part of the waveform data corresponding to the signal detected by the FCM detection section 460 (see FIG. 4) is stored in the main memory 3017. The data stored in the main memory 3017 is transferred to the RAM 3201 of the parallel processing processor 3002. The data stored in the main memory 3017 is transferred to the RAM 3201 by, for example, a direct memory access (DMA) method. Each of the plurality of arithmetic units 3200 of the parallel processing processor 3002 executes arithmetic processing on the data stored in the RAM 3201 in parallel. Each of the plurality of arithmetic units 3200 acquires necessary data from the RAM 3201 to execute arithmetic processing. Data corresponding to the arithmetic result is stored in the RAM 3201 of the parallel processing processor 3002. The data corresponding to the arithmetic result is transferred from the RAM 3201 to the main memory 3017, for example, by DMA method.

FIG. 50 shows an outline of the matrix operation executed by the parallel processing processor 3002. When the waveform data is analyzed according to the deep learning algorithm 60, matrix product calculation (matrix operation) is performed. The parallel processing processor 3002 executes, for example, a plurality of arithmetic processing related to matrix operation in parallel. FIG. 50A shows a calculation formula of matrix product. In the calculation formula shown in FIG. 50A, matrix c is obtained by a product of matrix a of n rows and n columns and matrix b of n rows and n columns. As shown in FIG. 50, the calculation formula is described in a multi-level loop syntax. FIG. 50B shows an example of arithmetic processing executed in parallel by the parallel processing processor 3002. The calculation formula shown in FIG. 50A can be divided into, for example, n×n pieces of arithmetic processing that are the number of combinations of loop variable i of a first layer and loop variable j of a second layer. Each of the arithmetic processing divided in this manner is arithmetic processing that does not depend on each other, and thus can be executed in parallel.

FIG. 51 is a conceptual diagram showing that the plurality of arithmetic processing shown in FIG. 50B is executed in parallel by the parallel processing processor 3002. As shown in FIG. 51, each of the plurality of arithmetic processing is allocated to any one of the plurality of arithmetic units 3200 included in the parallel processing processor 3002. Each of the arithmetic units 3200 executes the allocated arithmetic processing in parallel with each other. That is, each of the arithmetic units 3200 simultaneously executes the divided arithmetic processing.

By the calculation by the parallel processing processor 3002 shown in FIG. 51, for example, information regarding the probability that the cell corresponding to the waveform data belongs to each of the plurality of cell types is obtained. Based on the result of the operation, the processor 3001 that executes the analysis software 3100 performs analysis on the cell type of the cell corresponding to the waveform data. The arithmetic result is stored in the RAM 3201 of the parallel processing processor 3002, and the arithmetic result is transferred from the RAM 3201 to the main memory 3017. The processor 3001 acquires a result analyzed based on the arithmetic result stored in the main memory 3017, and the processor 3001 stores the analysis result in the storage part 3004.

The operation of the probability that the component in the specimen belongs to each of the plurality of classification types may be performed by a processor different from the parallel processing processor 3002. For example, the arithmetic result by the parallel processing processor 3002 may be transferred from the RAM 3201 to the main memory 3017, and the processor 3001 may calculate information related to the probability that the component corresponding to each waveform data belongs to each of the plurality of classification types based on the arithmetic result read from the main memory 3017. The arithmetic result by the parallel processing processor 3002 may be transferred from the RAM 3201 to the analysis unit 303X (see FIG. 47), and a processor mounted in the analysis unit 303X may calculate information related to a probability that a component corresponding to each waveform data belongs to each of the plurality of classification types.

<Method for Classifying White Blood Cells>

1. First Fluorescent Dye and Second Fluorescent Dye

Next, examples of the first fluorescent dye and the second fluorescent dye will be described. In this example, an example will be described in which two types of fluorescent dyes, a first fluorescent dye and a second fluorescent dye, are used to stain white blood cells in a specimen. In the following, in particular, a combination of the first fluorescent dye and the second fluorescent dye suitable for accurately counting basophils even in a blood specimen in which time has elapsed from blood collection will be described.

The second fluorescent dye is a fluorescent dye having maximum absorption in a wavelength range different from that of the first fluorescent dye. That is, the second fluorescent dye is a fluorescent dye that emits fluorescence of a detectable wavelength separately from the fluorescence from the first fluorescent dye. Each of the first fluorescent dye and the second fluorescent dye can be appropriately selected from known fluorescent dyes having a property of binding to nucleic acid of blood cells such as white blood cells.

The first fluorescent dye and the second fluorescent dye are excited by light emitted from a light source included in the flow cytometer. The light may be emitted from one light source or may be emitted from two light sources. When the light is emitted from one light source, the light emitted from the light source may be light capable of exciting both the first fluorescent dye and the second fluorescent dye. As such light, light including a plurality of wavelengths is preferable, and examples thereof include white light. Alternatively, when the first fluorescent dye and the second fluorescent dye have maximum absorption in a wavelength range close to an extent that they can be excited by light of one wavelength, the light emitted from the light source may be the light of one wavelength. For example, when one of the first fluorescent dye and the second fluorescent dye has a maximum absorption in a wavelength range of 400 to 520 nm and the other has a maximum absorption in a wavelength range of 300 to 420 nm, both fluorescent dyes can be excited by light having a central wavelength at 400 to 420 nm, for example, light of 455 nm. Alternatively, for example, when the maximum absorption of the first fluorescent dye and the second fluorescent dye is within a wavelength range of 630 to 660 nm, one of the first fluorescent dye and the second fluorescent dye emits fluorescence having a peak in a wavelength range of 660 to 670 nm, and the other emits fluorescence having a peak in a wavelength range longer than 670 nm, both fluorescent dyes can be excited by light having a central wavelength at 630 to 655 nm, for example, light of 633 nm, and light generated from each fluorescent dye can be detected separately.

When light is emitted from two light sources, the emitted light may be two types of light: light of a first wavelength capable of exciting the first fluorescent dye and light of a second wavelength capable of exciting the second fluorescent dye. The second wavelength is different from the first wavelength. The wavelength can be appropriately determined according to the type of fluorescent dye. For example, the first wavelength is 315 to 490 nm, preferably 400 to 450 nm, and more preferably 400 to 410 nm. The second wavelength is 610 to 750 nm, preferably 620 to 700 nm, and more preferably 633 to 643 nm.

When two excitation lights are used, the first fluorescent dye is a dye having a maximum absorption in a wavelength range of 400 to 490 nm and emitting fluorescence by being excited by absorbing light in the wavelength range, and the first fluorescent dye is preferably a dye having a property of binding to nucleic acid (particularly DNA) of blood cells. Examples thereof include fluorescent dyes having an acridine skeleton, 4',6-diamidino-2-phenylindole dihydrochloride (DAPI), Hoechst 3342, Hoechst 33258, and Hoechst 334580 of Hoechst series, and the like.

Examples of the fluorescent dye having an acridine skeleton include proflavin, 9-aminoacridine, acridine orange, Acridine Yellow G, acriflavin, Basic Yellow 9, lactic acid ethacridine, Euchrysine GG (Euchrysine GGNX), proflavin hemisulfate, 3,6-bis(dimethylamino)acridine (Rhoduline Orange), and 3,6-diamino-2,7,10-trimethyl-acridinium chloride. Among them, Acridine Yellow G is preferable. Alternatively, a commercially available fluorescent dye may be used as the second fluorescent dye.

When two excitation lights are used, as the second fluorescent dye, a dye having a maximum absorption in a wavelength range of 610 to 750 nm and emitting fluorescence by being excited by absorbing light in the wavelength range, and a dye having a property of binding to nucleic acid (particularly RNA) of blood cells is preferable. Examples thereof include propidium iodide, ethidium bromide, ethidium-acridine heterodimer, ethidium diazide, ethidium homodimer-1, ethidium homodimer-2, ethidium monoazide, trimethylenebis[[3-[[4-[[(3-methylbenzothiazol-3-ium)-2-yl]methylene]-1,4-dihydroquinolin]-1-yl]propyl]dimethyl-aminium] tetraiodide (TOTO-1), 4-[(3-methylbenzothiazol-2(3H)-ylidene)methyl]-1-[3-(trimethylaminio)propyl] quinolinium diiodide (TO-PRO-1), N,N,N',N'-tetramethyl-N,N'-bis[3-[4-[3-[(3-methylbenzothiazol-3-ium)-2-yl]-2-propenylidene]-1,4-dihydroquinolin-1-yl]propyl]-1,3-propanediaminium tetraiodide (TOTO-3), 2-[3-[[1-[3-(trimethylamino)propyl]-1,4-dihydroquinolin]-4-ylidene]-1-propenyl]-3-methylbenzothiazol-3-ium diiodide (TOPRO-3), fluorescent dyes represented by the following general formula (V), combinations thereof, and the like:

[Chemical Formula 1]

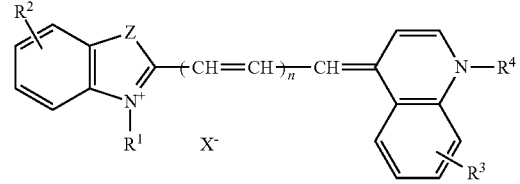

(V)

In the formula (V), $R^1$ and $R^4$ are a hydrogen atom, a methyl group, an ethyl group, or an alkyl group having 6 to 18 carbon atoms, and when one of $R^1$ and $R^4$ is an alkyl group having 6 to 18 carbon atoms, the other is a hydrogen atom, a methyl group, or an ethyl group. $R^2$ and $R^3$ are the same as or different from each other, and $R^2$ and $R^3$ are a methyl group, an ethyl group, a methoxy group, or an ethoxy group. Z is a sulfur atom, an oxygen atom, or a carbon atom having a methyl group. n is 0, 1, 2, or 3. $X^-$ is an anion.

In the formula (V), the alkyl group having 6 to 18 carbon atoms may be linear or branched. Among the alkyl groups having 6 to 18 carbon atoms, an alkyl group having 6, 8 or 10 carbon atoms is preferable.

In the formula (V), examples of the substituent of the benzyl group of $R^1$ and $R^4$ include alkyl groups having 1 to 20 carbon atoms, alkenyl groups having 2 to 20 carbon atoms, and alkynyl groups having 2 to 20 carbon atoms. Among them, a methyl group or an ethyl group is particularly preferable.

In the formula (V), examples of the alkenyl group of $R^2$ and $R^3$ include alkenyl groups having 2 to 20 carbon atoms. Examples of the alkoxy group of $R^2$ and $R^3$ include alkoxy groups having 1 to 20 carbon atoms. Among them, a methoxy group or an ethoxy group is particularly preferable.

In the formula (V), examples of anion $X^-$ include halogen ions such as $F^-$, $Cl^-$, $Br^-$ and $I^-$, $CF_3SO_3^-$, $BF_4^-$, $ClO_4^-$, and the like.

As the fluorescent dye represented by the formula (V), a fluorescent dye represented by the following formula is preferable:

[Chemical Formula 2]

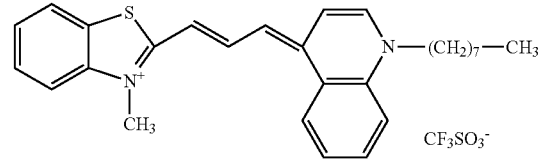

A commercially available staining reagent containing the second fluorescent dye alone may be used. Examples thereof include Fluorocell WDF (Sysmex Corporation), Stromatolyzer 4DS (Sysmex Corporation), and the like.

When one excitation light is used, a preferable combination of the first fluorescent dye and the second fluorescent dye may be different. For example, when light having a wavelength of 633 nm is used as excitation light, a combination is considered in which the maximum absorption of the first fluorescent dye and the second fluorescent dye is within a wavelength range of 630 to 660 nm, the second fluorescent dye emits fluorescence having a peak in a wavelength range of 660 to 670 nm, and the first fluorescent dye emits fluorescence having a peak in a wavelength range longer than 670 nm. As such a combination, for example, DRAQ5, DRAQ7 or DRAQ9 (BioStatus Limited) can be used as the first fluorescent dye, and the fluorescent dye represented by the above formula V can be used as the second fluorescent dye.

The first fluorescent dye and the second fluorescent dye are preferably used as solutions. The solvent is not particularly limited as long as it can dissolve each of the fluorescent dyes described above. Examples thereof include water, organic solvents, and mixtures thereof. The organic solvent is preferably a solvent that can be mixed with water, and examples thereof include alcohols having 1 to 6 carbon atoms, ethylene glycol, diethylene glycol, polyethylene glycol, DMSO, and the like.

As described with reference to FIGS. 2 and 5, the first fluorescent dye and/or the second fluorescent dye may be contained in one reagent container 200, or alternatively, as described with reference to FIG. 6, the first fluorescent dye and/or the second fluorescent dye may be separately contained in different reagent containers 200A and 200B.

2. Hemolysis Reagent

The first fluorescent dye and the second fluorescent dye described above are used in combination with a hemolysis reagent, particularly preferably a hemolysis reagent containing a surfactant. The surfactant can hemolyze red blood cells in the specimen and damage a cell membrane of white blood cells to such an extent that the first fluorescent dye and the second fluorescent dye can transmit therethrough. Examples of the surfactant include nonionic surfactants, cationic surfactants, and combinations thereof. The hemolysis reagent preferably contains a nonionic surfactant.

Examples of the nonionic surfactant include those represented by the following formula (I):

wherein $R^1$ is an alkyl group, an alkenyl group or an alkynyl group having 8 or more and 25 or less carbon atoms; $R^2$ is an oxygen atom, —(COO)—, or a group represented by the following formula (II):

[Chemical Formula 3]

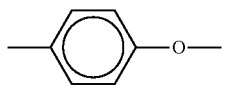

and; n is 23 or more and 25 or less, or 30.

In the formula (I), n is preferably 23 or 25, and more preferably n is 23. When n is 23 or more and 25 or less, the concentration of the nonionic surfactant represented by the formula (I) in the hemolysis reagent is 1700 ppm or more, and preferably 1750 ppm or more. When n is 23 or more and 25 or less, the concentration of the nonionic surfactant represented by the formula (I) in the measurement sample is 2300 ppm or less, and preferably 2200 ppm or less.

When n is 30, the concentration of the nonionic surfactant represented by the formula (I) in the hemolysis reagent is 1900 ppm or more, preferably 2000 ppm or more, and more preferably 2100 ppm or more. When n is 30, the concentration of the nonionic surfactant represented by the formula (I) in the measurement sample is 2300 ppm or less, and preferably 2200 ppm.

Specific examples of the nonionic surfactant represented by the formula (I) include polyoxyethylene alkyl ethers, polyoxyethylene sterol, polyoxyethylene castor oil, polyoxyethylene sorbitol fatty acid esters, polyoxyethylene alkyl amines, polyoxyethylene polyoxypropylene alkyl ethers, combinations thereof, and the like. Among them, polyoxyethylene alkyl ethers are preferable. The polyoxyethylene alkyl ether is preferably at least one selected from polyoxyethylene (23) cetyl ether, polyoxyethylene (25) cetyl ether, polyoxyethylene (30) cetyl ether, and a group thereof. Polyoxyethylene (23) cetyl ether, polyoxyethylene (25) cetyl ether, and a combination thereof are more preferable, and polyoxyethylene (23) cetyl ether is further preferable. The nonionic surfactant contained in the hemolysis reagent may be one kind or two or more kinds. The hemolysis reagent may further contain a nonionic surfactant other than the nonionic surfactant represented by the formula (I).

The hemolysis reagent may further include a cationic surfactant. Examples of the cationic surfactant include quaternary ammonium salt type surfactants, pyridium salt type surfactants, and combinations thereof. As the quaternary ammonium salt type surfactant, for example, a surfactant having 9 to 30 carbon atoms in total represented by the following formula (III) is preferable. The cationic surfactant contained in the hemolysis reagent may be one kind or two or more kinds:

[Chemical Formula 4]

In the formula (III), $R^1$ is an alkyl group or alkenyl group having 6 to 18 carbon atoms; $R^2$ and $R^3$ are the same as or different from each other, and $R^2$ and $R^3$ are an alkyl group or alkenyl group having 1 to 4 carbon atoms; $R^4$ is an alkyl group or alkenyl group having 1 to 4 carbon atoms, or a benzyl group, and $X^-$ is a halogen ion.

In the formula (III), $R^1$ is preferably an alkyl group or alkenyl group having 6, 8, 10, 12 or 14 carbon atoms, and $R^1$ is particularly preferably a straight chain alkyl group. More specific examples of $R^1$ include an octyl group, a decyl group, and a dodecyl group. $R^2$ and $R^3$ are the same as or different from each other, and $R^2$ and $R^3$ are preferably a methyl group, an ethyl group, or a propyl group. $R^4$ is preferably a methyl group, an ethyl group, or a propyl group.

Examples of the pyridium salt type surfactant include surfactants represented by formula (IV):

[Chemical Formula 5]

In the formula (IV), $R^1$ is an alkyl group or alkenyl group having 6 to 18 carbon atoms; and $X^-$ is a halogen ion.

In the formula (IV), $R^1$ is preferably an alkyl group or alkenyl group having 6, 8, 10, 12 or 14 carbon atoms, and $R^1$ is particularly preferably a straight chain alkyl group. More specific examples of $R^1$ include an octyl group, a decyl group, and a dodecyl group.

The concentration of the cationic surfactant in the hemolysis reagent can be appropriately selected depending on the type of surfactant. The concentration of the cationic surfactant is 10 ppm or more. The concentration of the cationic surfactant is preferably 400 ppm or more, more preferably 500 ppm or more, and further preferably 600 ppm or more. The cationic surfactant concentration is 10000 ppm or less. The concentration of the cationic surfactant is preferably 1000 ppm or less, more preferably 800 ppm or less, and further preferably 700 ppm or less.

The hemolysis reagent may contain a buffer substance for keeping the pH constant. Examples thereof include inorganic acid salts, organic acid salts, Good's buffers, combinations thereof, and the like. Examples of the inorganic acid salt include phosphates, borates, combinations thereof, and the like. Examples of the organic acid salt include citrates, malates, combinations thereof, and the like. Examples of the Good's buffer include MES, Bis-Tris, ADA, PIPES, Bis-Tris-Propane, ACES, MOPS, MOPSO, BES, TES, HEPES, HEPPS, Tricine, Tris, Bicine, TAPS, combinations thereof, and the like.

The hemolysis reagent may further contain an aromatic organic acid. In the present specification, the aromatic organic acid means an acid having at least one aromatic ring in the molecule and a salt thereof. Examples of the aromatic organic acid include aromatic carboxylic acids, aromatic sulfonic acids, and the like. Examples of the aromatic carboxylic acid include phthalic acid, benzoic acid, salicylic acid, hippuric acid, salts thereof, combinations thereof, and the like. Examples of the aromatic sulfonic acid include p-aminobenzenesulfonic acid, benzenesulfonic acid, salts thereof, combinations thereof, and the like. The aromatic organic acid contained in the hemolysis reagent may be one kind or two or more kinds. The aromatic organic acid may exhibit a buffering action. When an aromatic organic acid exhibiting a buffering action is used, the addition of a buffering agent is optional, and the aromatic organic acid may be combined with the above buffering agent.

When the hemolysis reagent contains an aromatic organic acid, the concentration of the aromatic organic acid is not particularly limited, and is preferably 20 mM or more and more preferably 25 mM or more from the viewpoint of classification ability between monocytes and lymphocytes. The concentration of the aromatic organic acid contained in the hemolysis reagent is preferably 50 mM or less, and more preferably 45 mM or less.

The hemolysis reagent is preferably a liquid reagent. The solvent is not particularly limited as long as it can dissolve each component such as the surfactant. Examples of the solvent include water, organic solvents, and mixtures thereof. The organic solvent is preferably a solvent that can be mixed with water, and examples thereof include alcohols having 1 to 6 carbon atoms, ethylene glycol, diethylene glycol, polyethylene glycol, dimethyl sulfoxide (DMSO), and the like.

The pH of the hemolysis reagent is not particularly limited, and the pH is preferably 5.5 or more. The pH is more preferably 5.7 or more, and further preferably 5.9 or more. The pH is preferably 7.2 or less. The pH is more preferably 6.9 or less, and further preferably 6.6 or less. For adjusting the pH, a known base (such as sodium hydroxide) or acid (such as hydrochloric acid) can be used.

In the hemolysis reagent, the osmotic pressure is not particularly limited, and is preferably 150 mOsm/kg or less, more preferably 130 mOsm/kg or less, and most preferably 110 mOsm/kg or less from the viewpoint of hemolysis efficiency of red blood cells. An appropriate osmotic pressure regulator may be added to regulate the osmotic pressure. Examples of the osmotic pressure regulator include sugars, amino acids, organic solvents, sodium chloride, combinations thereof, and the like.

As the hemolysis reagent, a commercially available hemolysis reagent for measuring blood cells may be used. Examples thereof include Lysercell WDF (Sysmex Corporation), Lysercell WDFII (Sysmex Corporation), and the like.

The hemolysis reagent is contained in, for example, a reagent container R1 (see FIG. 5), fed to the chamber 420 by the above-described method, and mixed with the blood specimen.

(Sixth Embodiment) Suggested Location for Missing 6th Embodiment Subheading

3. White Blood Cell Classification Method

Figure 52:
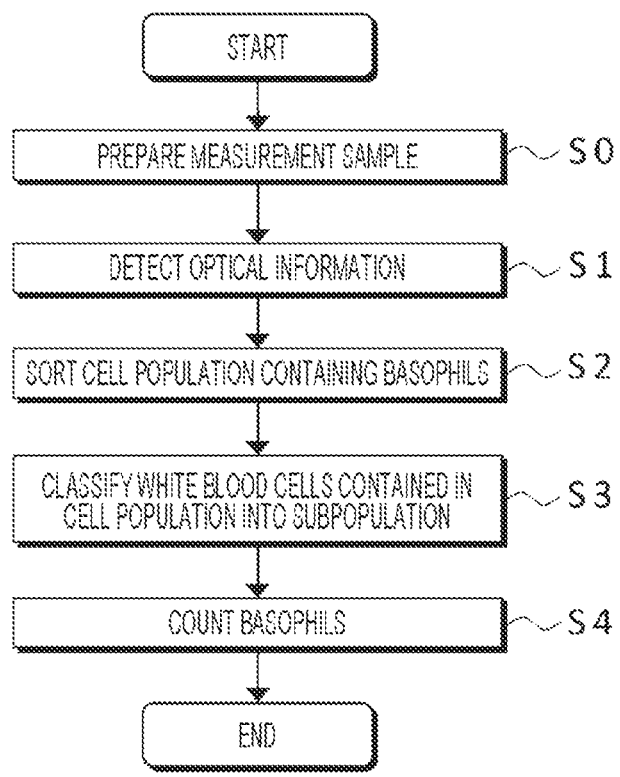
FIG. 52 is a flowchart showing steps of classifying white blood cells into subpopulations using a first fluorescent dye and a second fluorescent dye.
Figure 53:
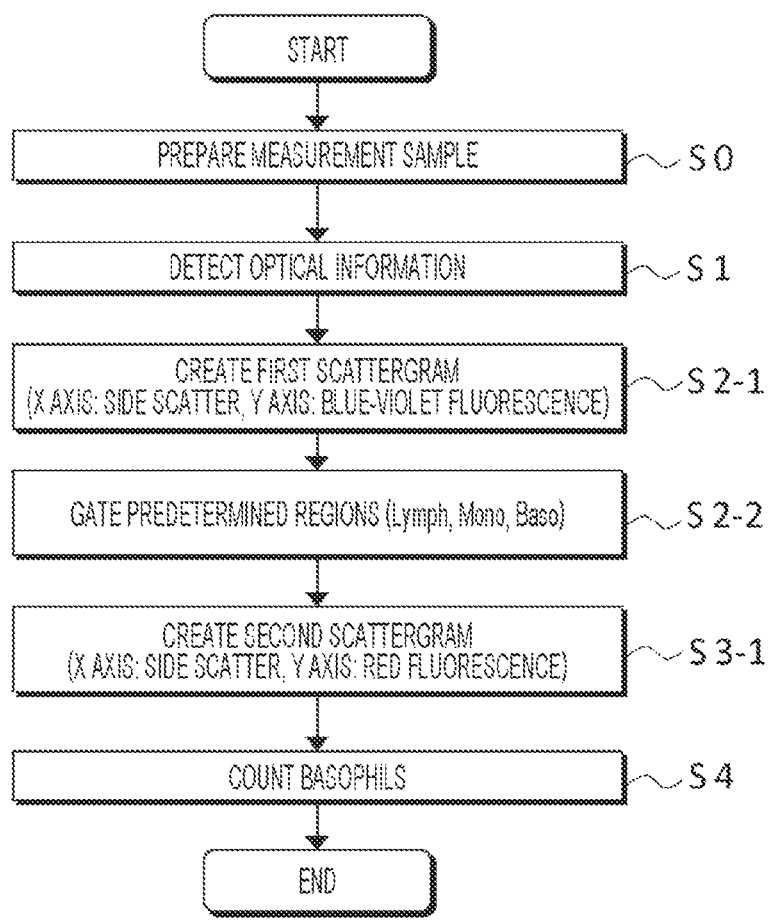
FIG. 53 is a flowchart showing steps of a sixth embodiment.

Next, as a sixth embodiment of the present invention, a method of classifying white blood cells into subpopulations using the first fluorescent dye and the second fluorescent dye described above will be described. This method is performed by, for example, steps shown in a flowchart of FIG. 52. Each step will be described below. FIG. 52 is an example of a flowchart of a method for classifying white blood cells into subpopulations, and FIG. 53 is a flowchart of a preferred embodiment that implements the method of FIG. 52.

[Step S0: Step of Preparing Measurement Sample]

In this step, a measurement sample is prepared by mixing a specimen containing white blood cells, a hemolysis reagent containing a surfactant, a first fluorescent dye, and a second fluorescent dye. As the hemolysis reagent, the first fluorescent dye and the second fluorescent dye, those described above are suitably used.

The specimen is not limited to whole blood as long as it is a sample containing white blood cells or having a possibly of containing blood cells. The blood cells refer to cells known to be contained in whole blood, such as white blood cells, red blood cells, and platelets. The sample containing white blood cells or having a possibly of containing blood cells is a body fluid sample collected from a mammal, preferably a human. Examples of the specimen include samples collected by whole blood, ascites, joint fluid, pleural effusion, cerebrospinal fluid, bone marrow fluid, bronchoalveolar lavage fluid, peritoneal lavage fluid, urine, apheresis and the like, and the like.

The first fluorescent dye and the second fluorescent dye are mixed with the specimen and the hemolysis reagent so that the concentrations (final concentrations) in the measurement sample are each within a predetermined range. The upper limit of the preferred final concentration of the first fluorescent dye in the measurement sample is 1000 ppm or less, preferably 100 ppm or less, and more preferably 10 ppm or less. The lower limit of the preferred final concentration of the first fluorescent dye in the measurement sample is 0.001 ppm or more, preferably 0.01 ppm or more, and more preferably 0.1 ppm or more. The upper limit of the preferred final concentration of the second fluorescent dye in the measurement sample is 1000 ppm or less, preferably 100 ppm or less, and more preferably 10 ppm or less. The lower limit of the preferred final concentration of the second fluorescent dye in the measurement sample is 0.001 ppm or more, preferably 0.01 ppm or more, and more preferably 0.1 ppm or more.

The mixing ratio of the hemolysis reagent, the staining reagent and the specimen is, for example, preferably 1000:1 or more: 1 or more in volume ratio. The mixing ratio is more preferably 1000:10 or more: 10 or more, and further preferably 1000:15 or more: 15 or more. The mixing ratio of the hemolysis reagent, the staining reagent and the specimen is preferably, for example, 1000:50 or less: 50 or less in volume ratio. The mixing ratio is more preferably 1000:30 or less: 30 or less, and further preferably 1000:25 or less: 25 or less. The mixing ratio of the fluorescent dye and the specimen may be the same or different.

[Step S1: Step of Detecting Optical Information]

In this step, the particles in the prepared measurement sample are irradiated with light, and optical information including first fluorescence information based on fluorescence from the first fluorescent dye, second fluorescence information based on fluorescence from the second fluorescent dye, and scattered light information is detected. The optical information is preferably detected by the FCM detection section 460 (see FIG. 2). The "particles in the measurement sample" refers to a granular object contained in the measurement sample that can be individually measured by the FCM detection section 460. Specifically, first, the measurement sample is introduced into the flow cell 4113 of the FCM detection section 460, and when each particle in the measurement sample passes through the flow cell, the particle is irradiated with light. Then, scattered light and fluorescence emitted from the particle are measured to detect optical information. The particles in the measurement sample may include not only cells such as white blood cells but also non-cellular particles such as remnants of hemolyzed red blood cells (red blood cell ghost), aggregates of platelets, and lipid particles.

The detected optical information is scattered light information and fluorescence information. Since two types of fluorescent dyes are used in this method, fluorescence information corresponding to fluorescence emitted from each fluorescent dye is detected. That is, the first fluorescence information based on fluorescence from the first fluorescent dye and the second fluorescence information based on fluorescence from the second fluorescent dye are detected. When light is emitted from one light source, scattered light information detected by the emission of light is detected as the scattered light information. When the light of the first wavelength and the light of the second wavelength are each emitted from the two light sources, the first scattered light information detected by the emission of light of the first wavelength and the second scattered light information detected by the emission of light of the second wavelength are detected as the scattered light information.

Examples of the scattered light include forward scattered light (for example, scattered light having a light receiving angle of 0 degree to about 20 degrees) and side scattered light (for example, scattered light having a light receiving angle of about 20 degrees to about 90 degrees). Examples of the scattered light information and the fluorescence information include a peak value (height of a pulse peak), pulse area, pulse width, transmittance, Stokes shift, ratio, temporal change of the scattered light and the fluorescence, values correlated thereto, and the like. The forward scattered light information is not particularly limited as long as it is information reflecting cell size. The side scattered light information is not particularly limited as long as the side scattered light information is information reflecting internal information such as complexity of cell structure, granule characteristics, nuclear structure, and degree of lobulation. The scattered light information is preferably a forward scattered light peak value or a side scattered light peak value, and more preferably side scattered light peak height. The fluorescence information is preferably fluorescence peak height.

The first scattered light information is preferably a side scattered light peak value detected by irradiation with light of the first wavelength (hereinafter, also referred to as "first side scattered light intensity"). The second scattered light information is preferably a side scattered light peak value detected by irradiation with light of the second wavelength (hereinafter, also referred to as "second side scattered light intensity"). The first fluorescence information is preferably a fluorescence peak value of the first fluorescent dye (hereinafter, also referred to as "first fluorescence intensity"). The second fluorescence information is preferably a fluorescence peak value of the second fluorescent dye (hereinafter, also referred to as "second fluorescence intensity").

For the detection of the optical information, for example, FCM capable of detecting the first fluorescence information based on fluorescence from the first fluorescent dye, the second fluorescence information based on fluorescence from the second fluorescent dye, and the scattered light information can be used. As such an FCM detection section, for example, FCM including an optical system and a detection system shown in FIGS. 7 and 8 is used.

[Step S2: Step of Sorting Cell Population Containing Basophils]

Figure 56A:
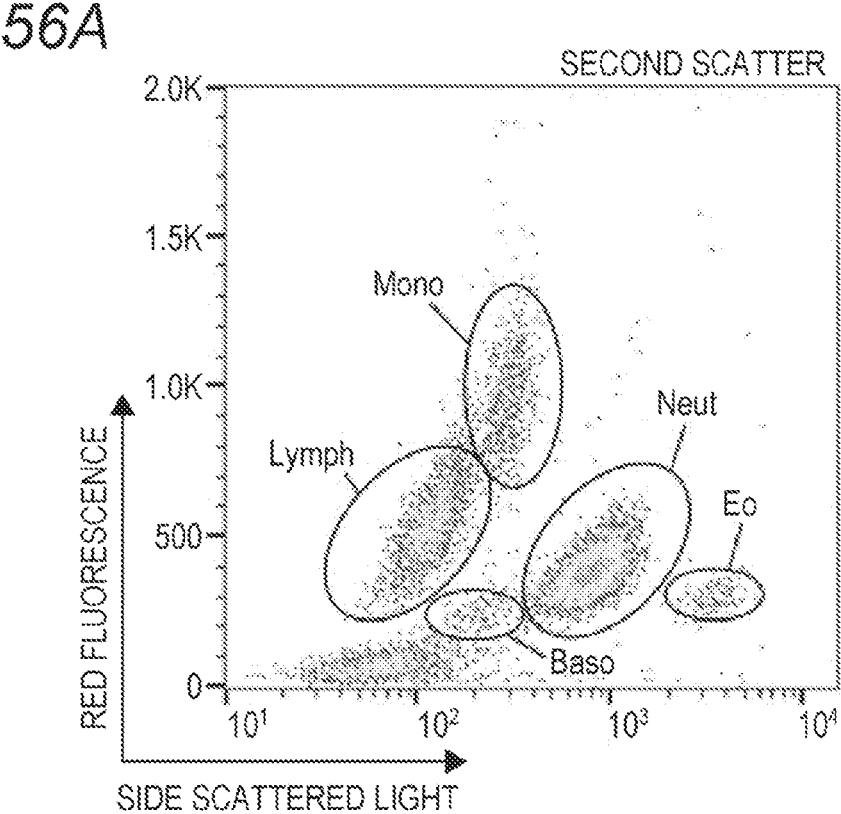
FIG. 56A is a side scattering-red fluorescence scattergram when a specimen before basophil separation was measured in Reference Example 1.
Figure 56B:
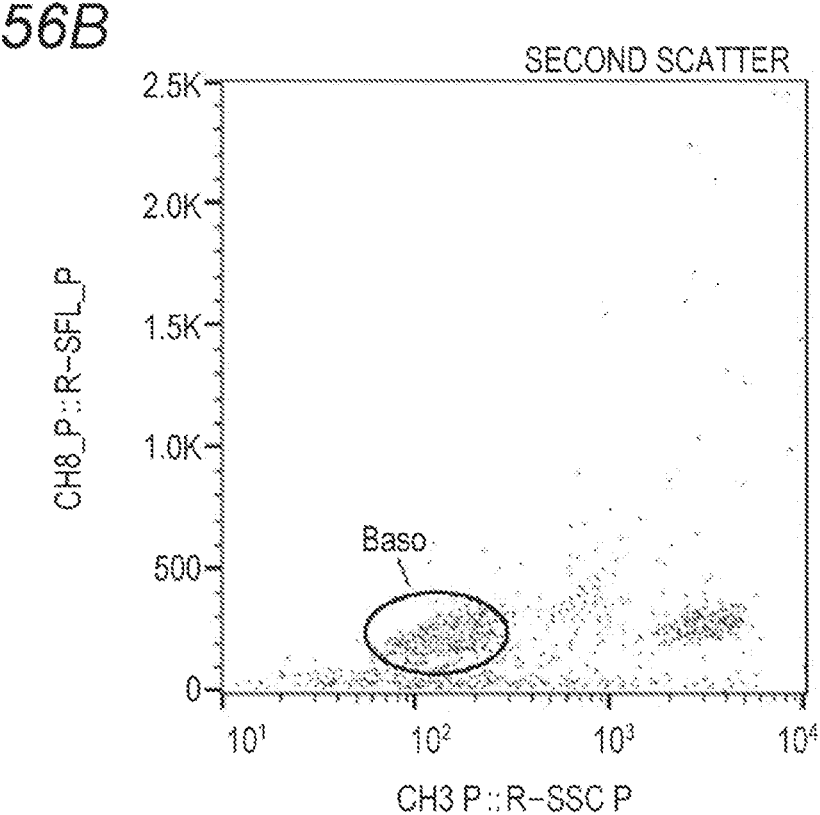
FIG. 56B is a side scattering-red fluorescence scattergram when a specimen after basophil separation was measured in Reference Example 1.
Figure 56C:
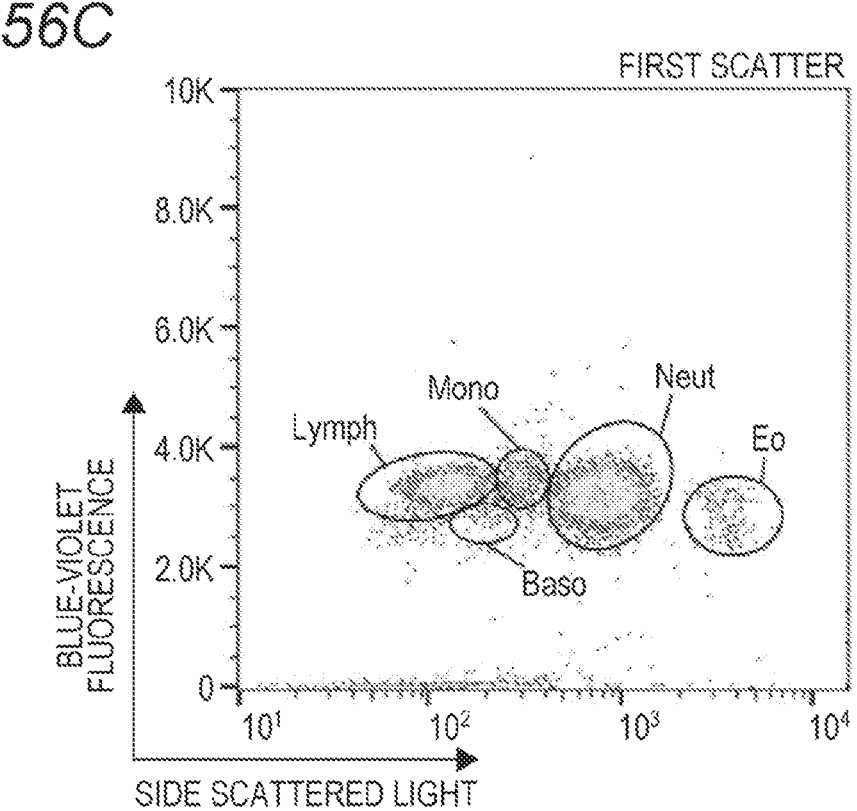
FIG. 56C is a side scattering-blue-violet fluorescence scattergram when a specimen before basophil separation was measured in Reference Example 1.
Figure 56D:
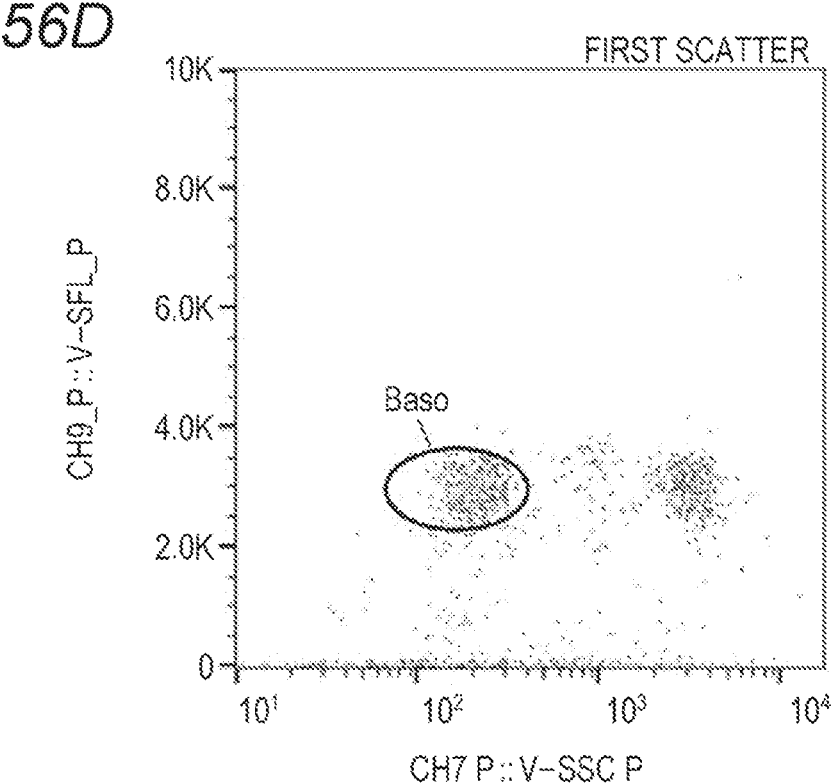
FIG. 56D shows a side scattering-blue-violet fluorescence scattergram when a specimen after basophil separation was measured in Reference Example 1.
Figure 57A:
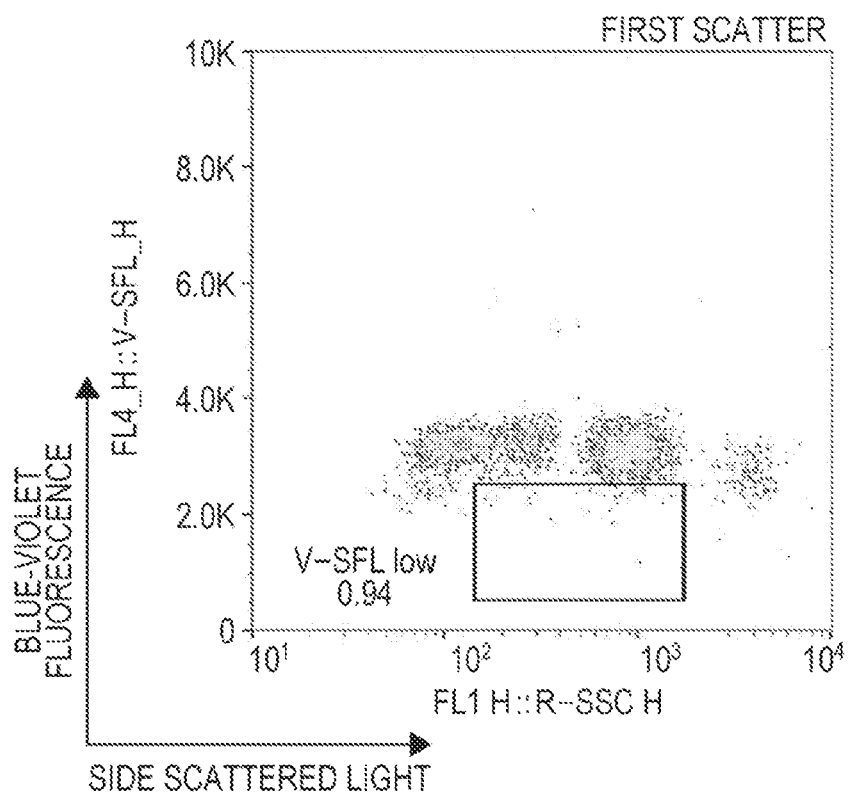
FIG. 57A is a side scattering-blue-violet fluorescence scattergram when a specimen was measured 4 hours after blood collection in Reference Example 2.
Figure 57B:
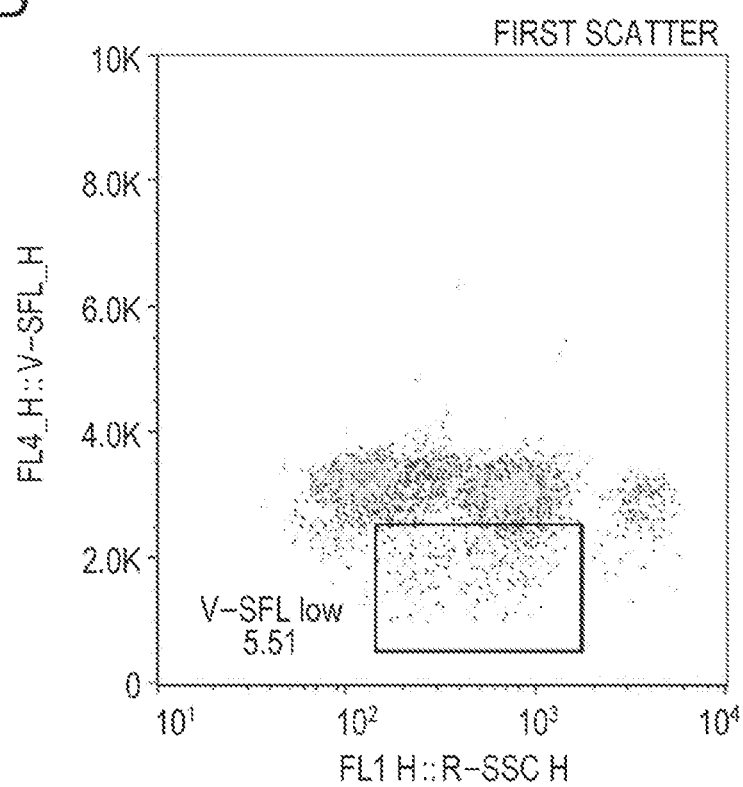
FIG. 57B is a side scattering-blue-violet fluorescence scattergram when a specimen was measured 48 hours after blood collection in Reference Example 2.
Figure 57C:
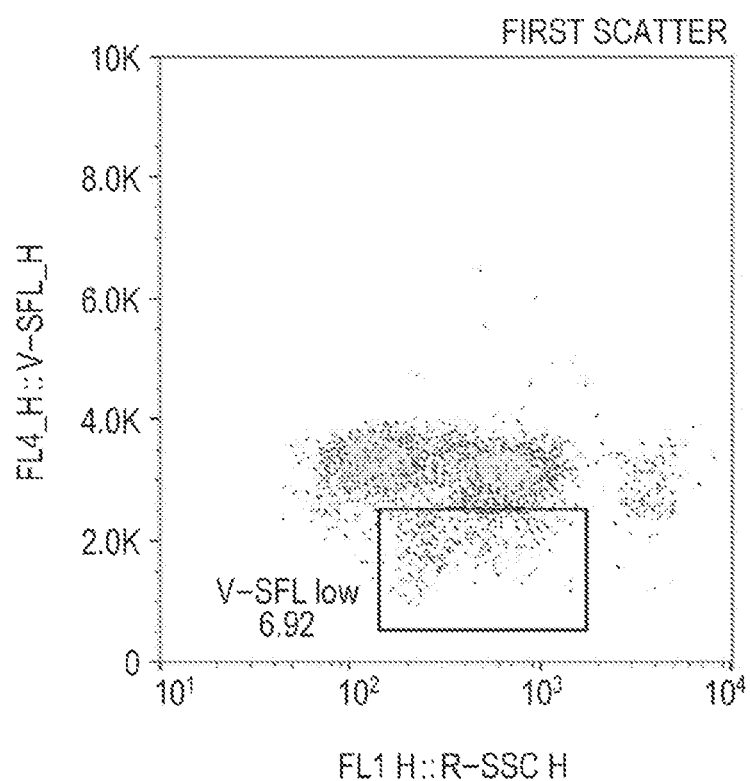
FIG. 57C is a side scattering-blue-violet fluorescence scattergram when a specimen was measured 72 hours after blood collection in Reference Example 2.

In this step, a cell population containing basophils is sorted from the particles in the measurement sample based on the optical information including the first fluorescence information. It is considered that the population affecting fractionation of basophils can be removed in advance by this step. As described above, the population affecting fractionation of basophils may occur in a specimen in which time has elapsed from collection. The present inventor has found that there is a distinguishable difference in the first fluorescence information between such a population and normal basophils. For example, as shown in FIG. 56C of Reference Example 1 described later, each subpopulation of normal white blood cells usually has almost the same fluorescence intensity on a scattergram having the first fluorescence intensity (blue-violet) and the second side scattered light intensity (red) as two axes. Dots on the scattergram represent individual particles measured with FCM. The side scattered light may be first side scattered light (blue-violet). On the other hand, as shown in FIGS. 57A to 57C of Reference Example 2, in the specimen in which time has elapsed from collection, a population in which the first fluorescence intensity is lower than that in the subpopulation of normal white blood cells appears. This population is also observed in a region where normal basophils appear on a scattergram having the second fluorescence intensity and the side scattered light intensity as two axes, and thus this population prevents the fractionation of basophils. Therefore, by sorting a cell population containing basophils based on the optical information including the first fluorescence information, it is possible to remove the population affecting the fractionation of basophils from the measured particles. In the sixth embodiment, the cell population containing basophils is preferably a population of white blood cells containing basophils.

When normal white blood cells are stained with the hemolysis reagent and the first fluorescent dye, as described above, each subpopulation of the white blood cells has approximately the same first fluorescence intensity. Therefore, the cell population containing basophils can be sorted by the first fluorescence information. Specifically, when the optical information including the first fluorescence information is the first fluorescence intensity, a population of particles having the first fluorescence intensity larger than a predetermined threshold value is sorted from the particles in the measurement sample. In this case, it is considered that a cell population containing lymphocytes, monocytes, neutrophils, eosinophils, and basophils is sorted as a cell population containing basophils.

Alternatively, as shown in steps S2-1 and S2-2 of the flowchart of FIG. 53, a scattergram based on the first fluorescence information and the scattered light information (also referred to as a first scattergram) may be created, and a cell population containing basophils may be sorted based on the scattergram. The scattered light information may be first scattered light information. For example, when the optical information including the first fluorescence information is the first fluorescence intensity and the side scattered light intensity, it is possible to sort a population of particles having appeared in a predetermined region where the first fluorescence intensity is larger than a predetermined threshold value in a scattergram having the first fluorescence intensity and the side scattered light intensity as two axes. As the side scattered light intensity, either the first side scattered light intensity or the second side scattered light intensity may be used. For example, as shown in FIG. 56C, in a scattergram in which the first fluorescence intensity is taken on a vertical axis and the second side scattered light intensity is taken on a horizontal axis, each subpopulation of white blood cells is distributed substantially in a row. That is, a region where each subpopulation appears in the scattergram is also known. The predetermined region in which the first fluorescence intensity is larger than the predetermined threshold value can be set in advance as a region in which a subpopulation of white blood cells containing basophils appears. Such a region can be, for example, a region in which five subpopulations of lymphocytes, monocytes, neutrophils, eosinophils and basophils appear, a region in which four subpopulations of lymphocytes, monocytes, neutrophils and basophils appear, or a region in which three subpopulations of lymphocytes, monocytes and basophils appear. It is considered that the cell population of white blood cells containing basophils is sorted by sorting the population of particles appearing in such a region by gating.

The predetermined threshold value corresponding to the first fluorescence intensity is not particularly limited, and can be appropriately determined. For example, blood known to contain basophils or blood after a lapse of time from collection may be measured in advance by FCM using the hemolysis reagent and the first fluorescent dye, the first fluorescence intensity for white blood cells may be acquired, and the obtained value may be used as the predetermined threshold value. By accumulating data on a region where each subpopulation of white blood cells appears from the first scattergram created based on such measurement, the threshold value and the region where the cell population containing basophils appears may be set in advance.

[Step S3: Step of Classifying White Blood Cells Contained in Cell Population into Subpopulations]

In this step, white blood cells contained in the cell population containing basophils are classified into subpopulations based on the second fluorescence information and the scattered light information. The scattered light information may be second scattered light information. Since the population affecting the fractionation of basophils is removed by the step of sorting the cell population, it is considered that white blood cells contained in the sorted cell population can be accurately classified into each subpopulation containing basophils. In this step, for example, as shown in S3-1 and S3-2 of the flowchart of FIG. 53, a scattergram based on the second fluorescence information and the scattered light information (also referred to as a second scattergram) may be created, and white blood cells contained in the cell population containing basophils may be classified into subpopulations based on the scattergram. The scattered light information may be second scattered light information. Specifically, a scattergram having the second fluorescence intensity and the side scattered light intensity as two axes is created. The side scattered light intensity may be a second side scattered light intensity. When the sorted cell population is a population of white blood cells containing basophils, that is, a cell population containing lymphocytes, monocytes, neutrophils, eosinophils and basophils, each subpopulation may appear in a different region and be classified into five in the scattergram, for example, as shown in FIG. 56A. Since the cell size, the amount of nucleic acid, the internal structure and the like are different for each subpopulation, the second fluorescence intensity and the side scattered light intensity detected for each subpopulation are different, and as a result, the sorted cell populations are classified in this way. Accordingly, the sorted cell populations can be classified into a lymphocyte population, a monocyte population, a neutrophil population, an eosinophil population, and a basophil population.

Alternatively, when the sorted cell population is a cell population containing lymphocytes, monocytes, neutrophils and basophils, each subpopulation may appear in different regions and be classified into four in the scattergram having the second fluorescence intensity and the side scattered light intensity as two axes. That is, the sorted cell populations can be classified into a lymphocyte population, a monocyte population, a neutrophil population, and a basophil population.

Figure 59A:
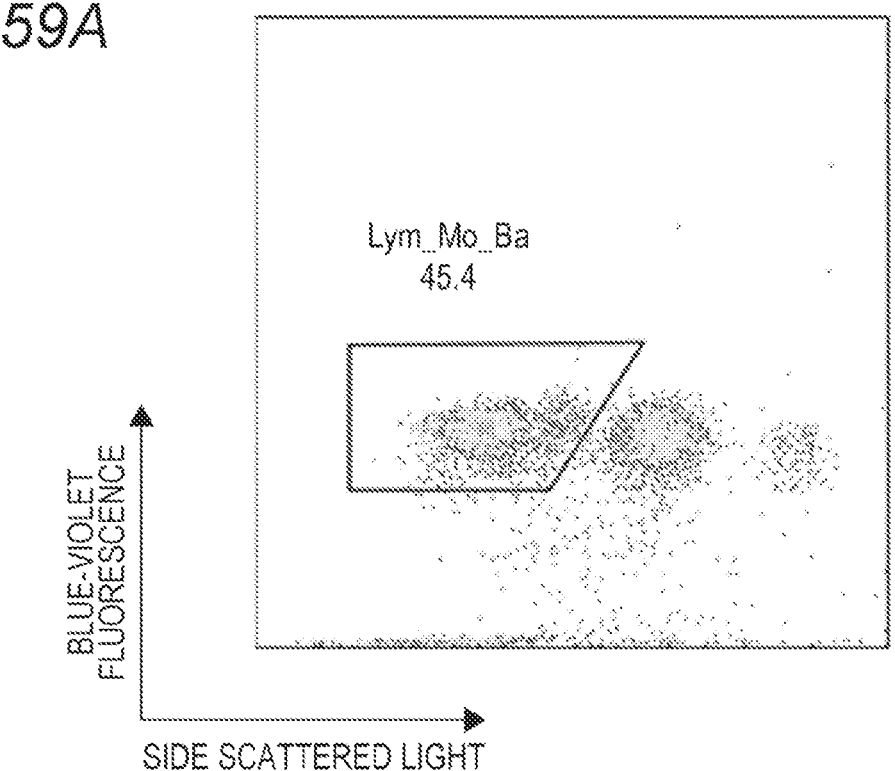
FIG. 59A is a side scattering-blue-violet fluorescence scattergram of Example 1.
Figure 59B:
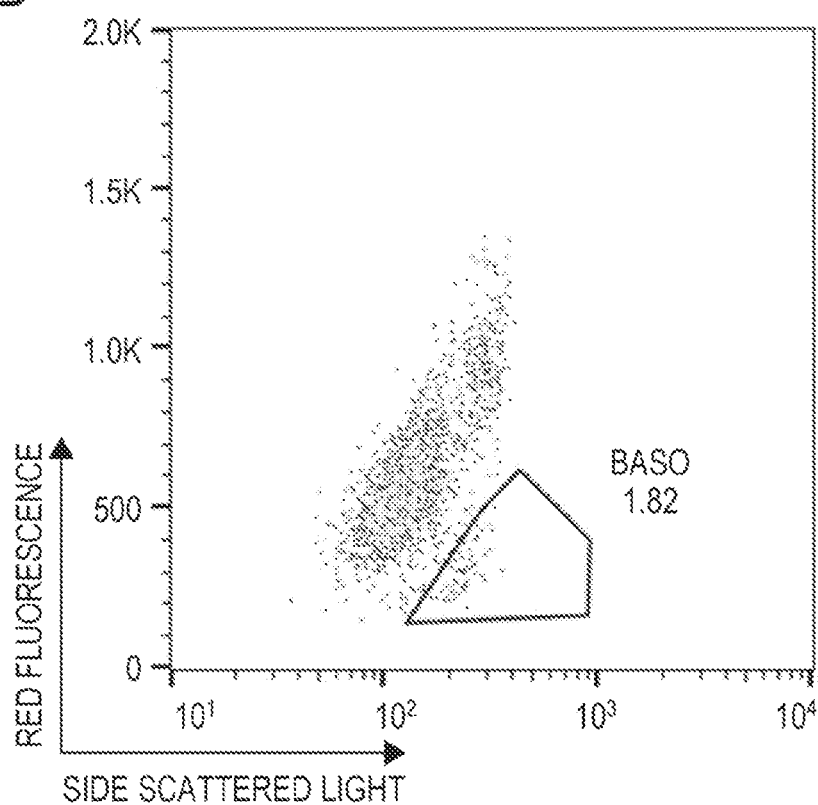
FIG. 59B is a side scattering-red fluorescence scattergram of Example 1.

Alternatively, when the sorted cell population is a cell population containing lymphocytes, monocytes and basophils, each subpopulation may appear in different regions and be classified into three in the scattergram having the second fluorescence intensity and the side scattered light intensity as two axes, for example, as shown in FIG. 59B of Example 1. That is, the sorted cell populations can be classified into a lymphocyte population, a monocyte population, and a basophil population.

[Step S4: Step of Counting Cells Classified into Basophil Population]

In this step, among the subpopulations of white blood cells classified as described above, cells classified as the basophil population are counted. In the step of sorting the cell population containing basophils, since the population affecting the fractionation of basophils is excluded, it is considered that the cells classified as the basophil population do not substantially contain cells other than basophils (for example, degraded neutrophils, lymphocytes, and the like). Accordingly, basophils in the measurement sample can be counted more accurately by the counting step. For counting, it is preferable to obtain the number of cells classified as the basophil population by analyzing the second scattergram with appropriate analysis software.

Seventh Embodiment

Figure 54:
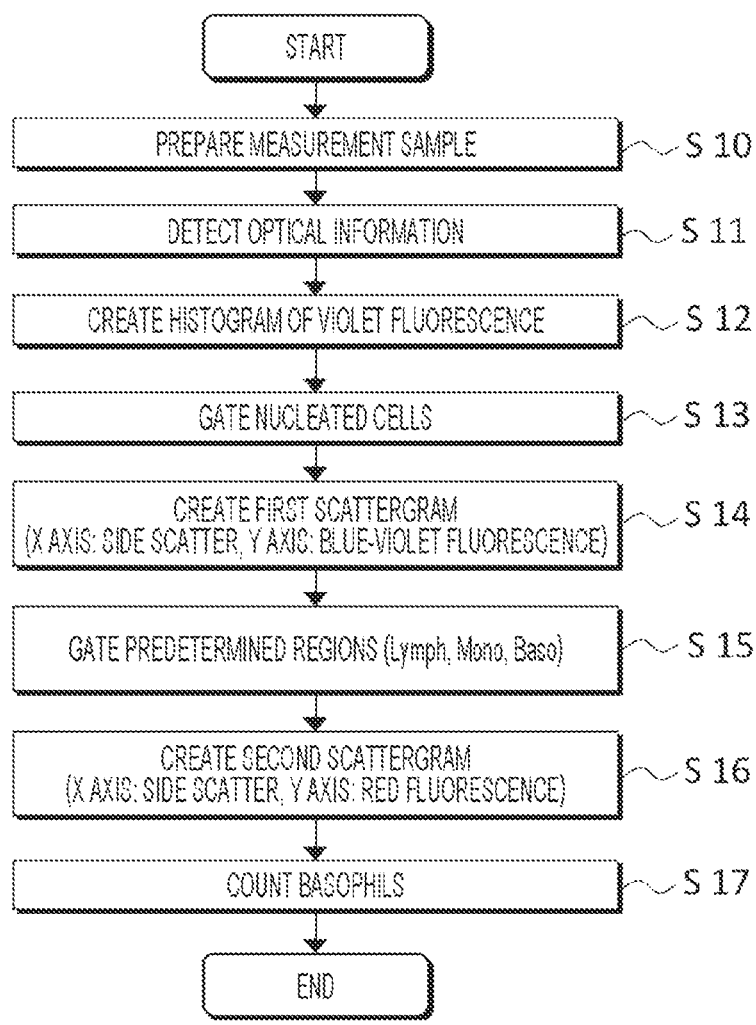
FIG. 54 is a flowchart showing steps of a seventh embodiment.

The method for classifying white blood cells into subpopulations of a seventh embodiment is performed by, for example, steps shown in the flowchart of FIG. 54. Preparation of a measurement sample (step S10) and detection of optical information (step S11) can be performed in the same manner as in the sixth embodiment. In the seventh embodiment, between a step of detecting optical information (step S11) and a step of sorting a cell population containing basophils (steps S14 and S15), a step of sorting a cell population containing nucleated cells from particles in a measurement sample is performed based on the first fluorescence information (steps S12 and S13). The first fluorescence information is preferably the first fluorescence intensity. Specifically, for the particles in the measurement sample, a histogram in which the number of particles is taken on a vertical axis and the first fluorescence intensity is taken on a horizontal axis is created (step S12). Since the first fluorescent dye has a property of binding to nucleic acid of cells as described above, when the particle is a nucleated cell, the first fluorescence intensity is higher than that of a particle having no nucleic acid. By using this, particles having the first fluorescence intensity equal to or greater than a predetermined threshold value or within a predetermined range in the histogram are sorted as nucleated cells (step S13). By such sorting, particles having no nucleus such as red blood cell ghosts can be removed from the particles in the measurement sample. The predetermined threshold value and the lower limit of the predetermined range may be values to the extent that particles having a very low first fluorescence intensity such as red blood cell ghosts are excluded. In the seventh embodiment, the cell population containing basophils may be sorted from the cell population containing nucleated cells. The step of sorting a cell population containing basophils and the subsequent steps can be performed in the same manner as in the sixth embodiment.

Eighth Embodiment

Figure 55:
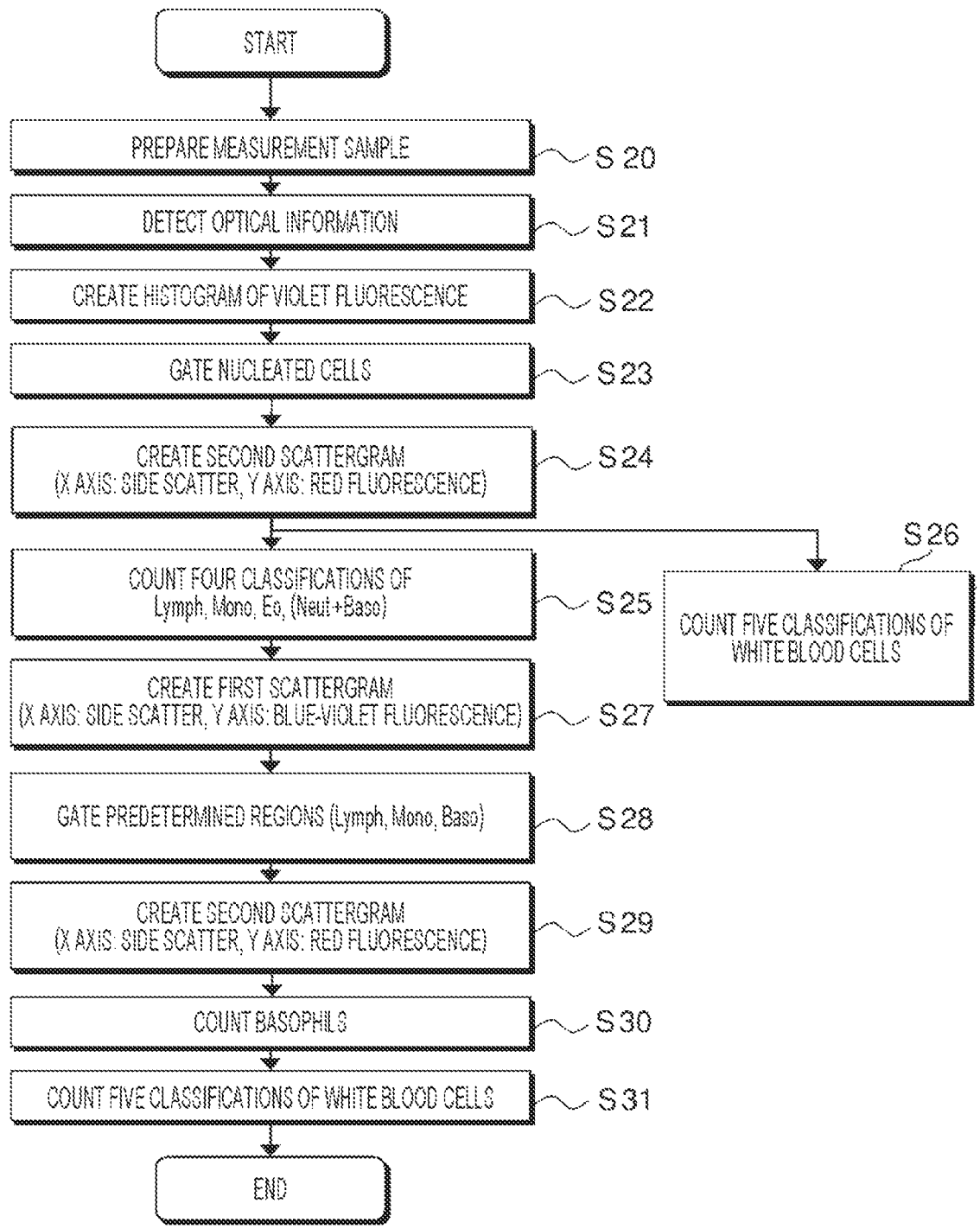
FIG. 55 is a flowchart showing steps of an eighth embodiment.

The method for classifying white blood cells into subpopulations of an eighth embodiment is performed by, for example, steps shown in the flowchart of FIG. 55. Preparation of a measurement sample (step S20) and detection of optical information (step S21) can be performed in the same manner as in the sixth embodiment. The sorting of the cell population containing nucleated cells (steps S22 and S23) can be performed in the same manner as in the seventh embodiment. Whether or not to sort the cell population containing nucleated cells can be arbitrarily determined. In the eighth embodiment, between a step of detecting optical information (step S21) and a step of sorting a cell population containing basophils (steps S27 and S28), a step of classifying a cell population containing particles or nucleated cells in the measurement sample into four subpopulations of a lymphocyte population, a monocyte population, an eosinophil population, and a population containing both neutrophils and basophils is performed based on the second fluorescence information and the scattered light information (steps S24 and S25). This classification itself can be performed in the same manner as the step of classifying white blood cells contained in the cell population into subpopulations in the sixth embodiment. Specifically, a second scattergram is created based on the second fluorescence information and the scattered light information (step S24), and white blood cells contained in the cell population containing particles or nucleated cells in the measurement sample are classified into subpopulations based on the scattergram (step S25). When time has elapsed from collection of a specimen, white blood cells in the specimen have poor fractionation, and it is particularly difficult to fractionate from basophils and neutrophils. When the measured specimen is such a specimen with poor fractionation, in the classification step, the cell population containing particles or nucleated cells in the measurement sample is classified into four subpopulations of a lymphocyte population, a monocyte population, an eosinophil population, and a population containing both neutrophils and basophils. For example, particles classified into the population containing both neutrophils and basophils are counted. When the measured specimen is a specimen with good fractionation, in the classification step, the cell population containing particles or nucleated cells in the measurement sample may be classified into five subpopulations of a lymphocyte population, a monocyte population, an eosinophil population, a neutrophil population, and a basophil population (step S26).

In the eighth embodiment, after the cell population containing particles or nucleated cells in the measurement sample is classified into four subpopulations, the step of sorting a cell population containing basophils (steps S27 and S28), a step of classifying white blood cells contained in the cell population into subpopulations (step S29), and a step of counting the cells classified into the basophil population (step S30) are performed as in the sixth embodiment. Then, the step of classifying the particles in the measurement sample into five subpopulations of a lymphocyte population, a monocyte population, an eosinophil population, a neutrophil population, and a basophil population (step S31) based on the result obtained by the step of classifying into four subpopulations and the result obtained by the step of counting the cells classified into the basophil population is further performed. For example, the number of particles classified into the neutrophil population can be obtained by subtracting the number of particles obtained by the step of counting cells classified into the basophil population (step S30) from the number of particles of the population containing both neutrophils and basophils obtained by the step of classifying into four subpopulations (step S25). As a result, in the eighth embodiment, the particles in the measurement sample can be classified into five subpopulations of a lymphocyte population, a monocyte population, an eosinophil population, a neutrophil population, and a basophil population. When the particles in the measurement sample can be classified into five subpopulations of white blood cells in the step of classifying into four subpopulations, the classification result can be compared with the classification result finally obtained in the eighth embodiment.

Hereinbelow, the white blood cell classification method according to the present invention will be described in detail by examples, but the present invention is not limited to these examples.

EXAMPLES

A specimen containing white blood cells, a hemolysis reagent, a staining dye, an analyzer, and a measurement method used in the following examples will be described.
[Specimen Containing White Blood Cells]
(Whole Blood Specimen)
5 mL of whole blood collected from a healthy volunteer in an EDTA-2K blood collection tube was used. Specimens stored at room temperature (25±2° C.) after blood collection and separated from the blood collection tube after 4 hours, 24 hours, 42 hours, and 72 hours were used as specimen samples.
(Specimens Before and After Basophil Separation)
1 mL of a specimen with a high level of basophils (>2% or more) was prepared, and 0.5 mL of the specimen was used as a specimen before basophil separation. Red blood cells were removed from the rest using HetaSep (SCT ST-07906), and white blood cells were collected. Thereafter, basophil cells were recovered using Basophil Isolation Kit II, human (Miltenyi Biotec 130-092-662), and the recovered basophil cells were used as a specimen after basophil separation.
[Hemolysis Reagent]
Lysercell WDFII (Sysmex Corporation) was used.
[Staining Reagent]
(First Fluorescent Dye)
Acridine Yellow G (Kanto Chemical Co., Inc.) was used.
(Second Fluorescent Dye)
As the second fluorescent dye, Dye Compound A described in U.S. Pat. No. 6,004,816 was used. U.S. Pat. No. 6,004,816 is incorporated herein by reference. Dye Compound A was a compound in which $R^1$ is a methyl group, $R^2$ and $R^3$ are a hydrogen atom, $R^4$ is n-octyl, n is 1, Z is a sulfur atom, and $X^-$ is $CF_3SO_3^-$ in the above formula (V), and the structural formula was as follows:

[Chemical Formula 6]

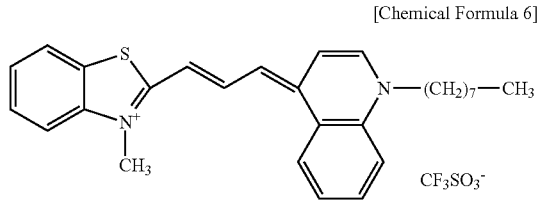

As described in U.S. Pat. No. 6,004,816, Dye Compound A could be obtained by the following steps. One equivalent of 3-methyl-2-methylbenzothiazolium methanesulfate and three equivalents of N,N-diphenylformamidine were heated in acetic acid, with stirring, for 1.5 hours on an oil bath at 90° C. The reaction solution was poured into hexane, and a red oily matter was further suspended in and washed with hexane to remove acetic acid. The crude product was recrystallized with ethyl acetate-hexane (yield 48%). To the recrystallized product, one equivalent of 1-octyl lepidinium trifluorate and pyridine were added, and the mixture was heated, with stirring, for 3 hours on an oil bath at 90° C. The reaction solution was concentrated, and the remaining blue crude product was purified with methanol-chloroform by flash chromatography to obtain Dye Compound A as a dark blue powder (yield: 62%). The results of physical property tests (TLC, 1H-NMR, MASS, and the like) of Dye Compound A of this dark blue powder are described in U.S. Pat. No. 6,004,816. Maximum absorption spectrum of Dye Compound A was 629 nm.

Dye Compound A (27.5 mg) and Acridine Yellow G (25 mg) were dissolved in special grade ethylene glycol (1 L) to prepare a staining reagent.
[Analyzer]
A modified machine of the multi-item automatic blood cell analyzer XN-1000 (Sysmex Corporation) was prepared. The XN-1000 includes a semiconductor laser light source that emits red (633 nm) light, a detector for red forward scattered light, a detector for red side scattered light, and a detector that receives fluorescence (light of 660 nm or more) excited by the red light. The XN-1000 was modified by adding a semiconductor laser light source that emits blue-violet (405 nm) light, a detector for blue-violet scattered light, and a fluorescence detector that detects fluorescence (450 to 600 nm) excited by blue light. For the analyzer, measurement data detected for information of red and blue-violet scattered light and information of fluorescence generated from the first fluorescent dye and the second fluorescent dye was analyzed, and a desired scattergram was displayed. Measurement was performed with the analyzer thus prepared.
[Measurement Method]
Preparation of a measurement sample and measurement of the sample were performed according to a manual attached to XN-1000 (Sysmex Corporation) except that the staining reagent containing the first fluorescent dye and the second fluorescent dye prepared as described above was used in place of Fluorocell WDF (Sysmex Corporation) which is a staining reagent for XN-1000. Data analysis was performed with FCS reanalysis software (Flowjo). The prepared measurement sample contained 1000 µL of Lysercell WDFII as a hemolysis reagent, 17 µL of whole blood, and 20 µL of the staining reagent. The dilution ratio of the staining reagent at this time was 51.85, and the final concentrations of the first fluorescent dye and the second fluorescent dye in the measurement sample were 0.53 ppm and 0.48 ppm, respectively.

Reference Example 1: Appearance Position of Basophils

The specimen before basophil separation and the specimen after basophil separation described above were measured. For the obtained optical information, a scattergram in which the horizontal axis represents the side scattered light intensity of the second wavelength (red wavelength) and the vertical axis represents the first wavelength (blue-violet fluorescence) (first scattergram) and a scattergram in which the horizontal axis represents the side scattered light intensity of the second wavelength (red wavelength) and the vertical axis represents the second wavelength (red fluorescence) (second scattergram) were created.

The obtained scattergrams are shown in FIGS. 56A to 56D. In the second scattergram for the specimen before basophil separation (FIG. 56A), it can be seen that five types of populations of white blood cells are distributed apart in the biaxial direction, and fractionation is good. On the other hand, in the first scattergram for the specimen before basophil separation (FIG. 56C), it was found that five populations of white blood cells were distributed apart in the horizontal axis (side scattering) direction, but all appeared in a region having substantially the same fluorescence intensity in the vertical axis (blue-violet fluorescence) direction. Also in the result of measuring the specimen after basophil separation, basophils appeared in a region where the fluorescence intensity was lower than that of lymphocytes in the second scattergram (FIG. 56B), and basophils appeared in the same fluorescence intensity position as lymphocytes and monocytes in the first scattergram (FIG. 56D), and the fractionation situation in the whole blood specimen could be confirmed.

Reference Example 2: Appearance Positions of Clusters that Change with Time

Whole blood specimens 4 hours after blood collection, 48 hours after blood collection, and 72 hours after blood collection were measured, and optical information was detected. Thereafter, a population included in the low value region of the vertical axis (blue-violet fluorescence) increasing with time in the first scattergram was sorted (gated), and the population was plotted on the second scattergram.

Figure 58A:
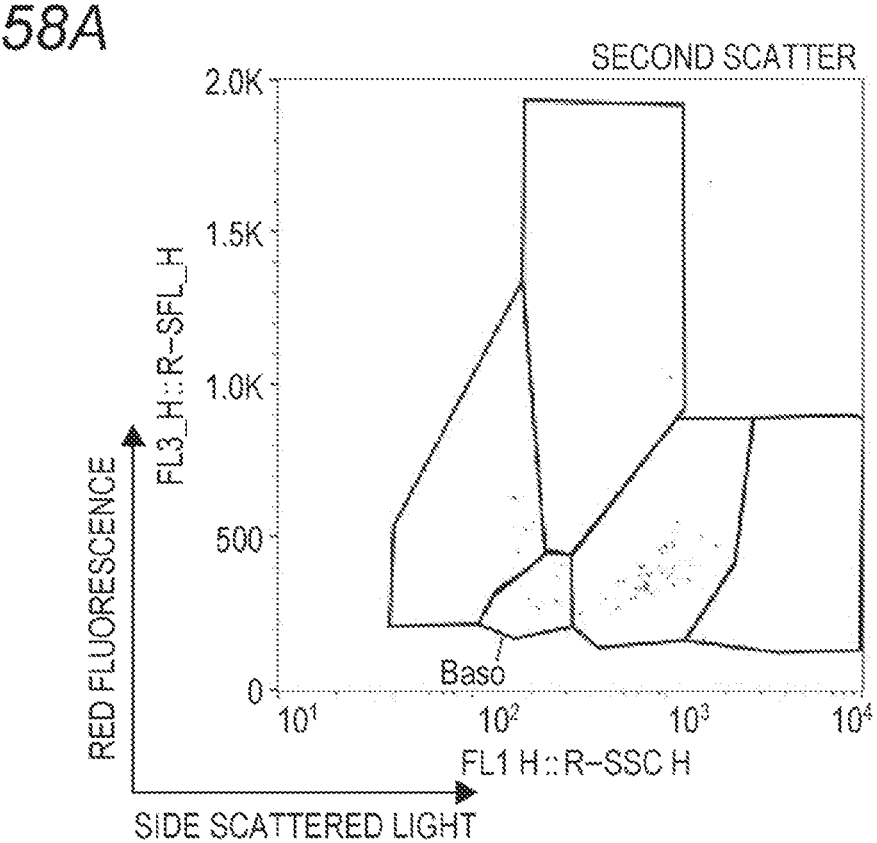
FIG. 58A is a side scattering-red fluorescence scattergram in which cells gated on the scattergram of FIG. 57A are plotted in Reference Example 2.
Figure 58B:
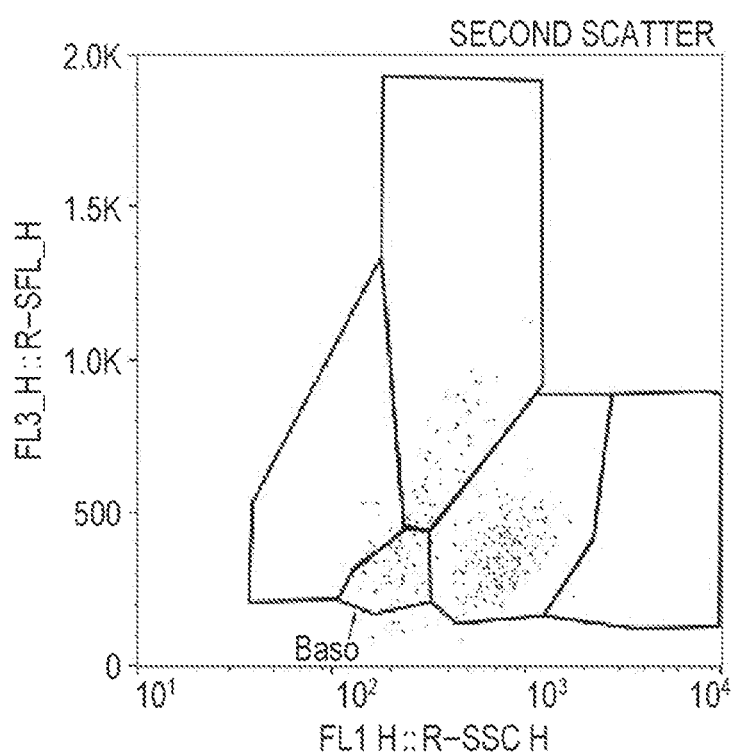
FIG. 58B is a side scattering-red fluorescence scattergram in which cells gated on the scattergram of FIG. 57B are plotted in Reference Example 2.
Figure 58C:
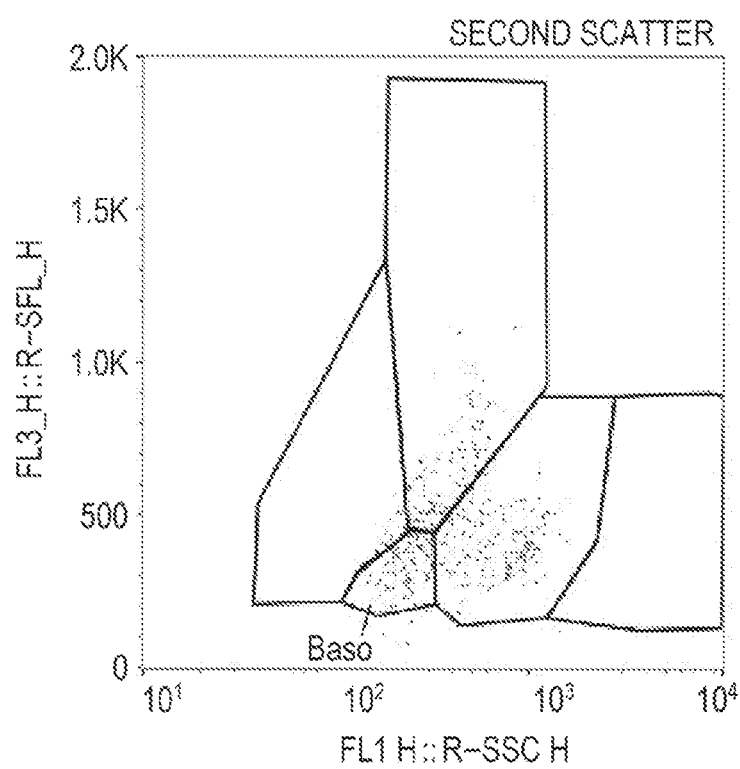
FIG. 58C is a side scattering-red fluorescence scattergram in which cells gated on the scattergram of FIG. 57C are plotted in Reference Example 2.

The results of the first scattergrams are shown in FIGS. 57A to 57D, and the results of the second scattergrams are shown in FIGS. 58A to 58C. From FIGS. 58A to 58C, it can be seen that the number of cells included in the appearance region of basophils increases with the lapse of time after blood collection. Then, it was found that the cause of this increase was the cells gated on the first scattergrams (appeared in regions surrounded by quadrangles in FIGS. 57A to 57C). That is, in the second scattergram, the neutrophils shifted to the low value side of the scattered light with the lapse of time after the blood collection, and the population considered to be derived from neutrophils overlapping the appearance region of basophils was revealed to be a population in which blue-violet fluorescence appeared on the low value side in the first scattergram.

Example 1: Basophil Count 1 (One-Step Gating (No Gating of Nucleated Cells by Blue-Violet Fluorescence))

Whole blood specimens 4 hours after blood collection, 24 hours after blood collection, 48 hours after blood collection, and 72 hours after blood collection were measured, and optical information was detected. Thereafter, first, a first scattergram was created, and a population included in a preset region (see FIG. 59A) where blue-violet fluorescence was larger than a predetermined value was sorted. The population appearing in this region includes lymphocytes, monocytes, and basophils, but does not include cells derived from neutrophils that shift to the appearance region of basophils with the lapse of time after the blood collection. FIG. 59A shows the first scattergram for the specimen 24 hours after blood collection at this time.

Thereafter, a second scattergram was created for the sorted population. The population included in the appearance region of basophils set in advance in the second scattergram was counted. FIG. 59B shows the second scattergram for the specimen 24 hours after blood collection at this time.

Example 2: Basophil Count 2 (Two-Step Gating (with Gating of Nucleated Cells by Blue-Violet Fluorescence) Corresponding to Second Embodiment) and Comparative Example 1

Figure 60A:
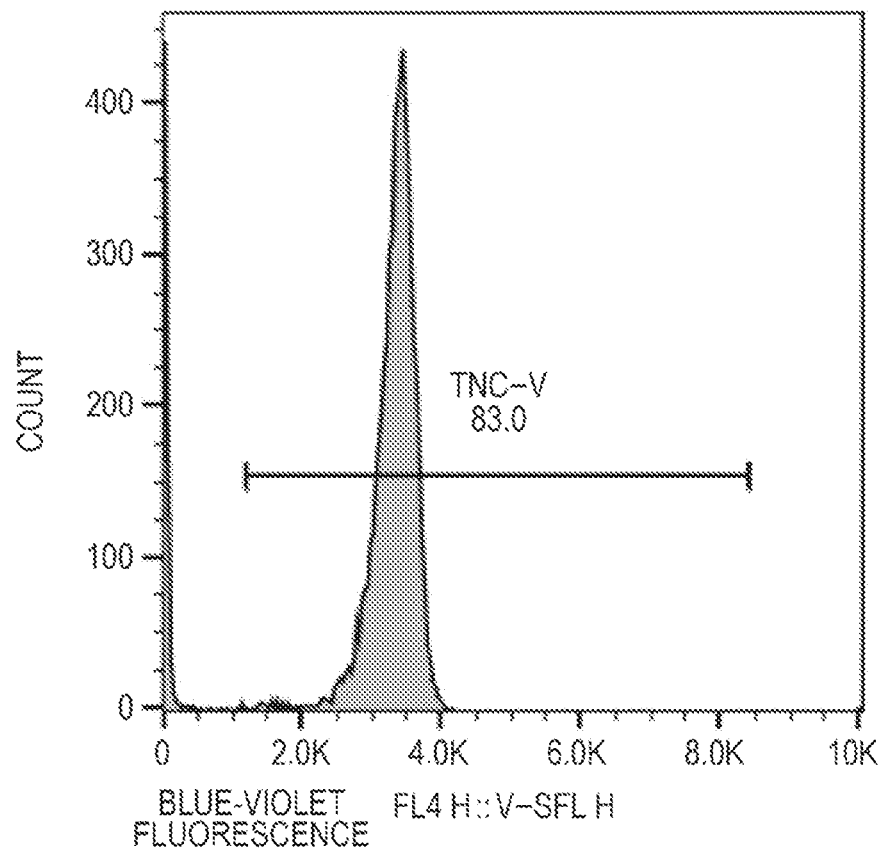
FIG. 60A is a blue-violet fluorescence histogram of Example 2.
Figure 60B:
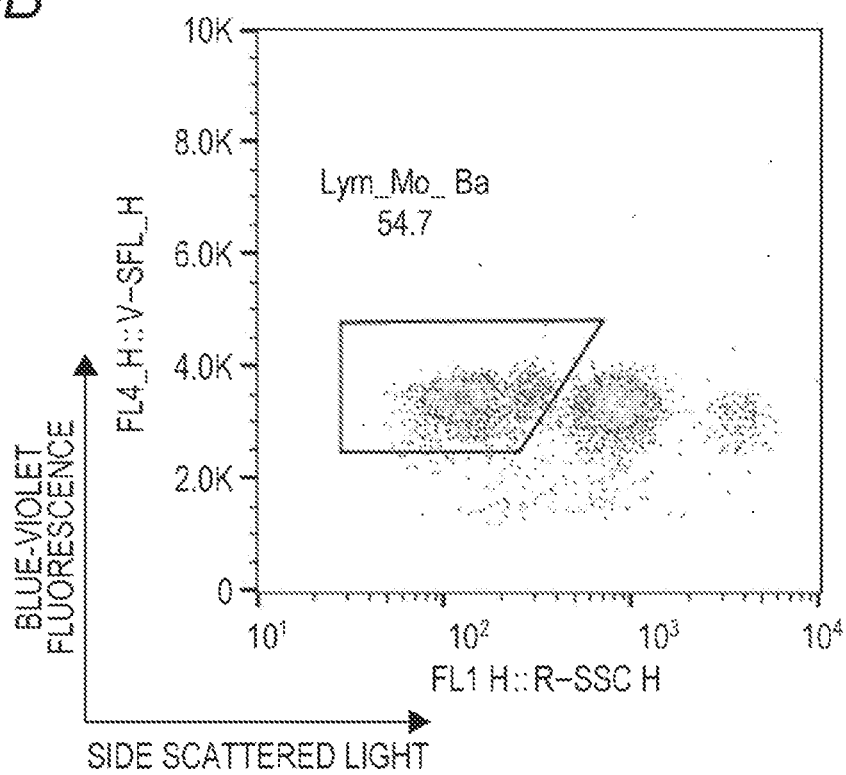
FIG. 60B is a side scattering-blue-violet fluorescence scattergram of Example 2.
Figure 60C:
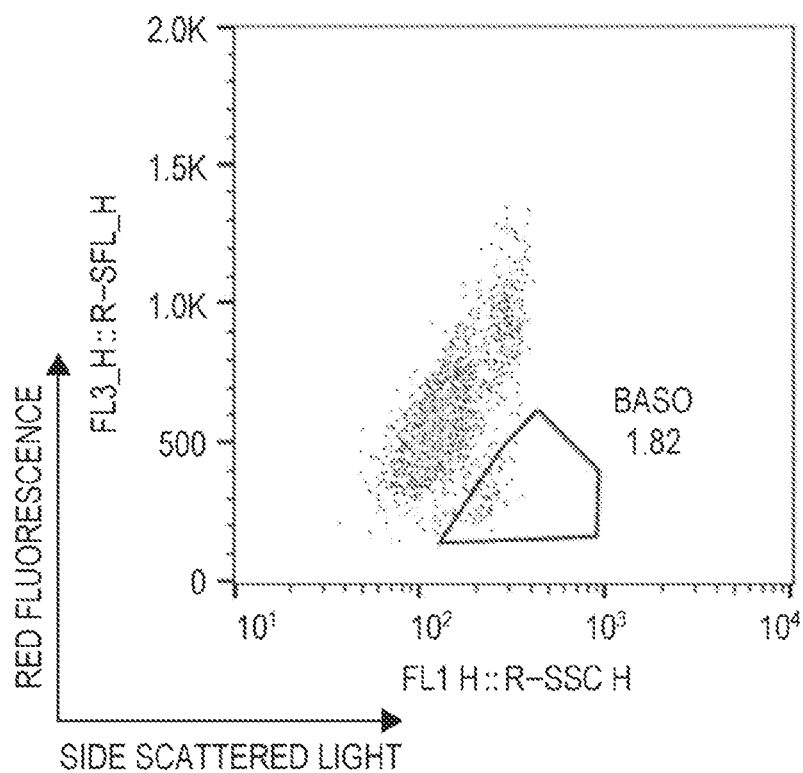
FIG. 60C is a side scattering-red fluorescence scattergram of Example 2.

The following analysis was performed using the optical information obtained in Example 1. First, cells whose obtained blue-violet fluorescence exceeded a predetermined threshold value (nucleated cells) were sorted. FIG. 60A shows a histogram for the specimen 24 hours after the blood collection at this time. Thereafter, the same analysis as in Example 1 was performed, and basophils were counted. The first scattergram and the second scattergram are shown in FIGS. 60B and 60C.

On the other hand, among the acquired optical information, basophils were counted based on the second scattergram created by the red side scattered light intensity and the red fluorescence intensity (Comparative Example 1).

For the specimens at each elapsed time after the blood collection, the count value of basophils obtained in Example 2 and the count value of basophils obtained in Comparative Example 1 are shown in FIG. 61. As can be seen from FIG. 61, by adopting the method of the present invention, the increase in the count value of basophils was suppressed even in the specimen in which time has elapsed after the blood collection, as compared with the comparative example.

Figure 62:
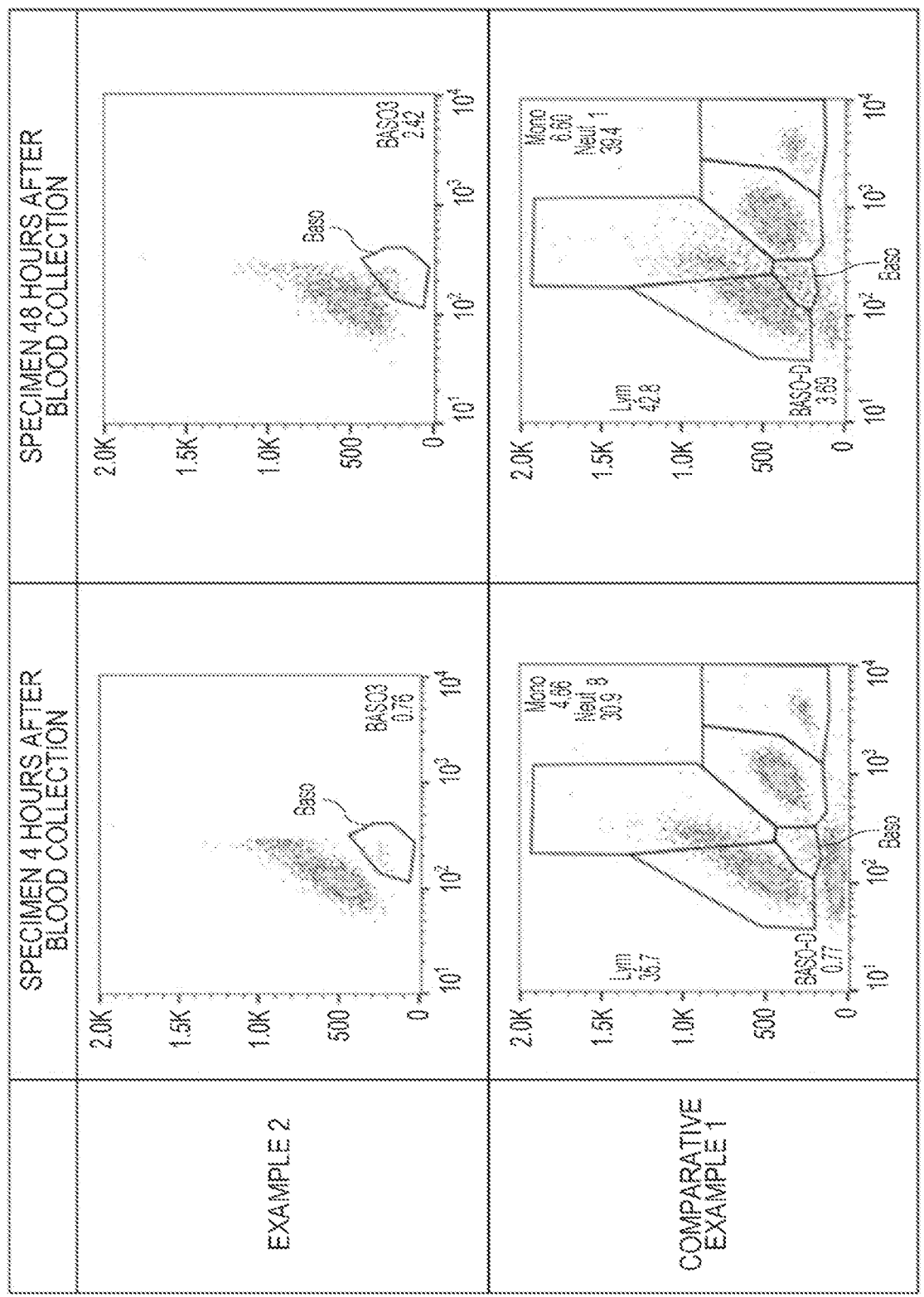
FIG. 62 shows side scattering-red fluorescence scattergrams in Example 2 and Comparative Example 1.

FIG. 62 shows second scattergrams obtained by the methods of Example 2 and Comparative Example 1 for specimens 4 hours after blood collection and specimens 48 hours after blood collection. As is apparent from the scattergram, it can be seen that the increase in basophils is suppressed in the method of the present invention.

Example 3: Five Classifications of White Blood Cells

White blood cells were classified into five subpopulations based on the optical information obtained in Example 1. Among the optical information, a second scattergram was created using the red side scattered light intensity and red fluorescence, and cells included in each of the appearance region of lymphocytes, the appearance region of monocytes, the appearance region of eosinophils, and the appearance region combining neutrophils and basophils set in advance were counted. That is, at this stage, the white blood cells were classified into four types of populations and counted.

Thereafter, similarly to Example 1, the population containing lymphocytes, monocytes, and basophils on the first scattergram with the horizontal axis representing blue-violet side scattered light and the vertical axis representing blue-violet fluorescence was sorted, and basophils on the second scattergram with the horizontal axis representing red side scattered light intensity and the vertical axis representing red fluorescence were counted with respect to the sorted population. The neutrophil population was counted by subtracting the count of basophils obtained here from the count of the population combining neutrophils and basophils among the four types obtained previously, and five types of subpopulations of white blood cells were counted together with the above results.

Table 2 shows the count of five classifications of white blood cells for each elapsed time after the blood collection thus obtained. On the other hand, among the acquired optical information, a second scattergram created by the red side scattered light intensity and the red fluorescence was created, and cells included in each of the appearance regions of lymphocytes, monocytes, eosinophils, neutrophils, and basophils set in advance were counted (Comparative Example 2). That is, the white blood cells were classified into five subpopulations according to the second scattergram created first. The obtained results are also shown in Table 2.

TABLE 2

|  | Example 3 | | | Comparative Example 2 | | |
| --- | --- | --- | --- | --- | --- | --- |
|  | After 4 hours | After 24 hours | After 48 hours | After 4 hours | After 24 hours | After 48 hours |
| Lymphocytes | 2540 | 2473 | 2516 | 2519 | 2459 | 2543 |
| Monocytes | 622 | 559 | 464 | 624 | 590 | 498 |
| Eosinophils | 135 | 122 | 143 | 141 | 134 | 147 |
| Neutrophils | 5184 | 5215 | 5377 | 5179 | 5076 | 5087 |
| Basophils | 13 | 47 | 101 | 53 | 170 | 371 |

As is apparent from Table 2, it can be seen that according to the present invention, the increase in the number of basophils due to the lapse of time after the blood collection is suppressed. It can be seen that five classifications of white blood cells can be also accurately performed simultaneously by one measurement.

What is claimed is:

1. A measurement apparatus operable to analyze a plurality of blood cells contained in a blood specimen, comprising:

at least one reagent container configured to store at least one type of reagent that contains first and second fluorescent dyes, wherein the first and second fluorescent dyes are optically interrogated to respectively emit first and second fluorescent lights at different peak wavelengths;

a mixing chamber configured for mixing therein of the blood specimen with the at least one type of reagent for preparation of a measurement sample, wherein the measurement sample includes blood cells including first and second cellular components stained, respectively, with the first and second fluorescent dyes;

a reagent feeder configured to feed the at least one type of reagent from the at least one reagent container to the mixing chamber via a reagent feeding tube provided between the at least one reagent container and the mixing chamber;

a detector formed with a plurality of light detectors configured to measure non-fluorescent and fluorescent lights from optically interrogated blood cells in the measurement sample, wherein measuring fluorescent lights comprises measuring the first and second fluorescent lights excited out at the different peak wavelengths from the stained first and second cellular components of the optically interrogated blood cells, and wherein the measured first and second fluorescent lights respectively carry first and second sets of fluorescence information indicative of cellular features of the stained first and second cellular components, respectively, of the optically interrogated blood cells; and an analyzer programmed to analyze the first and second sets of fluorescence information to perform CBC (Complete Blood Count) and/or a white blood cell classification that classifies white blood cells in the optically interrogated blood cells into multiple subpopulations, including lymphocyte, monocyte, eosinophil, neutrophil and basophil, of the white blood cells.

2. The measurement apparatus according to claim 1, wherein the reagent feeding tube comprises a first end disposed in the at least one reagent container and a second end connected to the mixing chamber.

3. The measurement apparatus according to claim 2, wherein the first end of the reagent feeding tube is fixed at a predetermined position in the at least one reagent container.

4. The measurement apparatus according to claim 3, wherein the mixing chamber is configured for preparation of a plurality of measurement samples, and the first end of the reagent feeding tube is fixed at the predetermined position throughout preparation of the plurality of measurement samples.

5. The measurement apparatus according to claim 2, further comprising a tube insertion mechanism operable to insert the first end of the reagent feeding tube into the at least one reagent container at the predetermined position in the at least one reagent container.

6. The measurement apparatus according to claim 2, wherein the reagent feeder further comprises a metering dispenser configured to feed a constant amount of the first and second dyes from the at least one reagent container to the mixing chamber via the reagent feeding tube.

7. The measurement apparatus according to claim 1, wherein the at least one reagent container contains 20 mL or more and 100 mL or less of the at least one type of reagent.

8. The measurement apparatus according to claim 1, wherein the at least one type of reagent has a storage period of 60 days or more and 90 days or less at an operating temperature of the measurement apparatus.

9. The measurement apparatus according to claim 8, wherein the storage period of the at least one type of reagent contained is 60 days or more and 90 days or less at a temperature of 15° C. to 30° C.

10. The measurement apparatus according to claim 1, wherein the at least one reagent container includes a bag-shaped reagent storage portion containing the at least one type of reagent.

11. The measurement apparatus according to claim 10, wherein the at least one reagent container contains 200 mL or more and 500 mL or less of the at least one type of reagent.

12. The measurement apparatus according to claim 10, wherein the storage period of the at least one type of reagent is 75 days or more and 1 year or less at an operating temperature of the measurement apparatus.

13. The measurement apparatus according to claim 12, wherein the storage period of the at least one type of reagent is 75 days or more and 1 year or less at a temperature of 15° C. to 30° C.

14. The measurement apparatus according to claim 1, wherein the first and second cellular components of the optically interrogated blood cells are stained, respectively, with a first compound including the first fluorescent dye and a second compound including the second fluorescent dye.

15. The measurement apparatus according to claim 1, wherein the at least one type of reagent does not contain an antibody.

16. The measurement apparatus according to claim 1, wherein the at least one type of reagent includes a hemolytic agent to be reacted with the blood cells to damage cell membranes of the blood cells so that the first and second fluorescent dyes permeate into the blood cells.

17. The measurement apparatus according to claim 1, wherein the analyzer is programmed to analyze the first and second sets of fluorescence information to classify the plurality of blood cells.

18. The measurement apparatus according to claim 1, wherein the analyzer is programmed with an artificial intelligence algorithm to analyze the first and second sets of fluorescence information and a third set of non-fluorescence information obtained from a scattered light generated in response to irradiation of the measurement sample.

19. The measurement apparatus according to claim 18, wherein the analyzer comprises a parallel processing processor programmed with the artificial intelligence algorithm to perform a matrix operation.

20. The measurement apparatus according to claim 18, wherein the artificial intelligence algorithm is a deep learning algorithm.

21. The measurement apparatus according to claim 1, wherein the plurality of light detectors comprises first and second fluorescent light detectors configured to respectively measure the first and second fluorescent lights.

22. An analysis method for analyzing a plurality of blood cells contained in a blood specimen, comprising:

feeding at least one type of reagent from at least one reagent container to a mixing chamber, wherein the first and second fluorescent dyes are optically interrogated to emit first and second fluorescent lights, respectively, at different peak wavelengths;

mixing in the mixing chamber the blood specimen with the at least one type of reagent for preparation of a measurement sample, wherein the measurement sample includes blood cells including first and second cellular components stained, respectively, with the first and second fluorescent dyes;

measuring non-fluorescent and fluorescent lights from optically interrogated blood cells in the measurement sample, wherein measuring fluorescent lights comprises measuring the first and second fluorescent lights excited out at the different peak wavelengths from the stained first and second cellular components of the optically interrogated blood cells, and wherein the measured first and second fluorescent light respectively carry first and second sets of fluorescence information indicative of cellular features of the stained first and second cellular components, respectively, of the optically interrogated blood cells; and analyzing the first and second sets of fluorescence information to perform CBC (Complete Blood Count) and/or a white blood cell classification that classifies white blood cells of the optically interrogated blood cells into multiple subpopulations, including lymphocyte, monocyte, eosinophil, neutrophil and basophil, of the white blood cells.

* * * * *